(12) United States Patent
Sawa et al.

(10) Patent No.: US 12,315,883 B2
(45) Date of Patent: May 27, 2025

(54) NON-AQUEOUS ELECTROLYTE SOLUTION AND NON-AQUEOUS ELECTROLYTE SECONDARY BATTERY EMPLOYING THE SAME

(71) Applicants: MITSUBISHI CHEMICAL CORPORATION, Tokyo (JP); MU IONIC SOLUTIONS CORPORATION, Tokyo (JP)

(72) Inventors: Shuhei Sawa, Inashiki-gun (JP); Minoru Kotato, Yokkaichi (JP); Kunihisa Shima, Yokkaichi (JP); Yasuyuki Shigematsu, Yokohama (JP); Masamichi Onuki, Yokohama (JP); Kanako Takiguchi, Inashiki-gun (JP)

(73) Assignees: MITSUBISHI CHEMICAL CORPORATION, Tokyo (JP); MU IONIC SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 18/450,793

(22) Filed: Aug. 16, 2023

(65) Prior Publication Data
US 2023/0395857 A1 Dec. 7, 2023

Related U.S. Application Data

(60) Continuation of application No. 17/454,738, filed on Nov. 12, 2021, now Pat. No. 11,791,499, which is a continuation of application No. 16/590,623, filed on Oct. 2, 2019, now Pat. No. 11,205,802, which is a division of application No. 14/991,185, filed on Jan. 8, 2016, now Pat. No. 10,476,106, which is a division of application No. 13/964,195, filed on Aug. 12, 2013, now Pat. No. 9,923,238, which is a continuation of application No. PCT/JP2012/051635, filed on Jan. 26, 2012.

(30) Foreign Application Priority Data

| Feb. 10, 2011 | (JP) | ................................ | 2011-027671 |
| Feb. 16, 2011 | (JP) | ................................ | 2011-031074 |
| Aug. 2, 2011 | (JP) | ................................ | 2011-169549 |
| Sep. 2, 2011 | (JP) | ................................ | 2011-192138 |

(51) Int. Cl.
| *H01M 10/0567* | (2010.01) |
| *H01M 4/587* | (2010.01) |
| *H01M 10/0525* | (2010.01) |
| *H01M 10/0568* | (2010.01) |
| *H01M 10/42* | (2006.01) |
| *H01M 10/0569* | (2010.01) |

(52) U.S. Cl.
CPC ....... *H01M 10/0567* (2013.01); *H01M 4/587* (2013.01); *H01M 10/0525* (2013.01); *H01M 10/0568* (2013.01); *H01M 10/4235* (2013.01); *H01M 10/0569* (2013.01); *H01M 2300/0025* (2013.01)

(58) Field of Classification Search
CPC ......... H01M 10/0525; H01M 10/0567; H01M 10/0568; H01M 10/0569; H01M 10/4235; H01M 2300/0025; H01M 4/587; Y02E 60/10
See application file for complete search history.

(56) References Cited

U.S. PATENT DOCUMENTS

| 2002/0012850 A1 | 1/2002 | Schmidt et al. |
| 2003/0059681 A1 | 3/2003 | Noh |
| 2004/0106047 A1 | 6/2004 | Mie et al. |
| 2006/0024584 A1 | 2/2006 | Kim et al. |
| 2007/0059588 A1 | 3/2007 | Lee et al. |
| 2007/0212615 A1 | 9/2007 | Jost et al. |
| 2008/0102369 A1 | 5/2008 | Sakata et al. |
| 2009/0061303 A1 | 3/2009 | Inagaki et al. |
| 2009/0226819 A1 | 9/2009 | Ihara et al. |
| 2010/0015514 A1 | 1/2010 | Miyagi et al. |
| 2010/0119956 A1 | 5/2010 | Tokuda et al. |
| 2011/0081583 A1 | 4/2011 | Sugimoto et al. |
| 2011/0091768 A1 | 4/2011 | Ohashi et al. |
| 2011/0151338 A1 | 6/2011 | Yamamoto et al. |
| 2011/0256458 A1 | 10/2011 | Tani |

(Continued)

FOREIGN PATENT DOCUMENTS

| CN | 1328355 A | 12/2001 |
| CN | 1497765 A | 5/2004 |

(Continued)

OTHER PUBLICATIONS

International Search Report issued Mar. 13, 2012 in PCT/JP2012/051635, filed Jan. 26, 2012.

(Continued)

*Primary Examiner* — Victoria H Lynch
(74) *Attorney, Agent, or Firm* — Oblon, McClelland, Maier & Neustadt, L.L.P.

(57) ABSTRACT

An object is to provide a non-aqueous electrolyte solution that can improve the capacity deterioration and gas generation associated with the high-temperature storage of non-aqueous electrolyte batteries. A further object is to provide a non-aqueous electrolyte battery that uses this non-aqueous electrolyte solution. These objects can be achieved by using a non-aqueous electrolyte solution that incorporates, in prescribed contents, (A) a compound having at least two isocyanate groups per molecule and (B) a compound of formula (3):

$$LiC_nF_{2n+1}SO_3 \qquad (3)$$

wherein n is an integer from 0 to 4.

9 Claims, No Drawings

(56) References Cited

U.S. PATENT DOCUMENTS

| | | |
|---|---|---|
| 2011/0274986 A1 | 11/2011 | Yamamoto et al. |
| 2011/0300450 A1 | 12/2011 | Balaji |
| 2012/0009486 A1 | 1/2012 | Hayakawa et al. |
| 2012/0060360 A1 | 3/2012 | Liu |
| 2012/0251893 A1 | 10/2012 | Sakata et al. |
| 2013/0011728 A1 | 1/2013 | Tokuda et al. |
| 2013/0029219 A1 | 1/2013 | Inagaki et al. |
| 2013/0216919 A1 | 8/2013 | Tokuda et al. |
| 2013/0316229 A1 | 11/2013 | Sawa et al. |
| 2014/0178757 A1 | 6/2014 | Sakata et al. |
| 2014/0377668 A1 | 12/2014 | Abe et al. |

FOREIGN PATENT DOCUMENTS

| | | |
|---|---|---|
| CN | 101164187 A | 4/2008 |
| CN | 101263628 | 9/2008 |
| CN | 101280104 A | 10/2008 |
| CN | 101292389 A | 10/2008 |
| CN | 101533929 A | 9/2009 |
| CN | 101548425 A | 9/2009 |
| CN | 101652894 A | 2/2010 |
| CN | 101662030 A | 3/2010 |
| CN | 101685880 | 3/2010 |
| CN | 101826635 A | 9/2010 |
| CN | 101894974 A | 11/2010 |
| CN | 101924242 A | 12/2010 |
| CN | 102263292 A | 11/2011 |
| CN | 102484282 A | 5/2012 |
| EP | 2 618 418 A1 | 7/2013 |
| JP | 07-176322 | 7/1995 |
| JP | 7-296849 | 11/1995 |
| JP | 2000-195545 | 7/2000 |
| JP | 2002-008719 | 1/2002 |
| JP | 2002-33127 | 1/2002 |
| JP | 2002-083628 | 3/2002 |
| JP | 2003-151633 | 5/2003 |
| JP | 2005-259641 | 9/2005 |
| JP | 2006-164759 | 6/2006 |
| JP | 2006-310071 A | 11/2006 |
| JP | 2007-242411 | 9/2007 |
| JP | 2008-277004 | 11/2008 |
| JP | 2009-54319 | 3/2009 |
| JP | 2009-87934 | 4/2009 |
| JP | 2009-110943 | 5/2009 |
| JP | 2009-129541 A | 6/2009 |
| JP | 2010-225522 | 10/2010 |
| JP | 2011-014379 | 1/2011 |
| JP | 2011-028860 | 2/2011 |
| JP | 2011-044339 | 3/2011 |
| KR | 10-2008-0037574 A | 4/2008 |
| KR | 10-2009-0097124 A | 9/2009 |
| WO | WO 2006/115681 A2 | 11/2006 |
| WO | 2010/021236 | 2/2010 |
| WO | WO 2010/079565 A1 | 7/2010 |
| WO | WO 2010/110159 A1 | 9/2010 |
| WO | WO 2011/125180 A1 | 10/2011 |
| WO | WO 2013/099680 A1 | 7/2013 |

OTHER PUBLICATIONS

Office Action issued Apr. 8, 2014 in Korean Patent Application No. 10-2013-7023656 (with English translation).
Decision for Grant issued Aug. 7, 2014 in Korean Patent Application No. 10-2013-7023656.
Chinese Office Action dated Nov. 18, 2015, in Chinese Patent Application No. 201280008556.4 with its English Translation (7 pages).
Search Report dated Feb. 2, 2015, in corresponding Chinese Application No. 201280008556.4, with English translation.
Office Action and Search Report dated Jun. 26, 2015, in corresponding Chinese Application No. 201410061840.9 with English translation.
Office Action and Search Report dated Jul. 13, 2015, in corresponding Chinese Application No. 201280008556.4 with English translation.
Korean Office Action dated Sep. 14, 2015 in connection with corresponding Korean Patent Application No. 2014-7015243, filed Jan. 26, 2012.
Korean Office Action issued Sep. 10, 2015 in connection with corresponding Korean Patent Application No. 2014-7005652, filed Jan. 26, 2012.
Japanese Office Action issued Oct. 20, 2015 in Patent Application No. 2012-067875, (with English Translation).
Japanese Office Action issued Oct. 20, 2015 in Patent Application No. 2012-026184, (with English Translation).
Japanese Office Action issued Oct. 20, 2015 in Patent Application No. 2012-026185, (with English Translation).
Japanese Office Action issued Nov. 4, 2015 in Patent Application No. 2012-026186 (with English Translation).
Combined Office Action and Search Report issued Apr. 25, 2016 in Chinese Patent Application No. 201410061840.9, (with English language translation).
Yuping Wu, et al., "Materials for Green Power Sources" Beijing: Chemical Industry Press, Jul. 2008, 7 Pages (with English language translation).
Office Action issued Jul. 15, 2016 in Korean Patent Application No. 10-2014-7005652 (with unedited computer generated English translation).
Chinese Office Action issued on Oct. 14, 2016 in Patent Application No. 201410061840.9 (with English Translation).
Partial Supplementary European Search Report issued Jun. 2, 2017 in European Patent Application No. 12745336.3.
Extended European Search Report issued May 29, 2017 in European Patent Application No. 12745284.5.
Chinese Office Action issued Jun. 13, 2017 in Chinese Patent Application 201410061840.9 (with unedited computer generated English translation).
Combined Office Action and Search Report issued Jun. 26, 2017 in Chinese Patent Application No. 201610011420.9 (with unedited computer generated English translation).
Combined Office Action and Search Report issued Jun. 26, 2017 in Chinese Patent Application No. 201610011436.X, (with unedited computer generated English translation).
Final Office Action mailed Jul. 27, 2017 in U.S. Appl. No. 13/964,195.
Office Action issued Mar. 21, 2018 in Chinese Patent Application No. 20161001436.X1499118 (with English translation).
Office Action issued Apr. 4, 2018 in Chinese Patent Application No. 201410061840.9 (with English translation).
Rejection Decision issued Oct. 16, 2018 in Chinese Patent Application No. 201410061840.9 (with English translation).
European Office Action issued Jan. 22, 2019 in European Patent Application No. 12745336.3, 6 pages.
Burnette, "Scientific and Technical Information Center (STIC) Search Results", 2019.
Fraind, "Scientific and Technical Information Center (STIC) Results", Jul. 12, 2017.
Extended European Search Report issued Oct. 6, 2020 in European Patent Application No. 20188638.9, 6 pages.
Office Action and search report dated Aug. 18, 2021, in corresponding Chinese Patent Application No. 201910057979.9 (with machine English translation).
Chinese Office Action issued on Aug. 3, 2022 in Chinese Patent Application No. 201910057979.9 (with English translation). 8 pages.
Final Chinese Office Action issued Feb. 9, 2023 in Chinese Patent Application No. 201910057979.9 (with unedited computer-generated English Translation), 11 pages.
Combined Chinese Office Action and Search Report issued Apr. 6, 2022, in corresponding Chinese Patent Application No. 201910057979.9 (with English Translation and English Translation of Category of Cited Documents), 15 pages.
European Office Action issued Apr. 4, 2024 in European Patent Application No. 20 188 638.9, 4 pages.

NON-AQUEOUS ELECTROLYTE SOLUTION AND NON-AQUEOUS ELECTROLYTE SECONDARY BATTERY EMPLOYING THE SAME

CROSS-REFERENCE TO RELATED APPLICATIONS

This application is a continuation application of prior U.S. application Ser. No. 17/454,738, filed Nov. 12, 2021, the disclosure of which is incorporated herein by reference in its entirety. U.S. application Ser. No. 17/454,738 is a continuation of U.S. Non-Provisional application Ser. No. 16/590,623, filed on Oct. 2, 2019, issued as U.S. Pat. No. 11,205,802 on Dec. 21, 2021, which is a divisional of U.S. Non-Provisional application Ser. No. 14/991,185, filed Jan. 8, 2016, issued as U.S. Pat. No. 10,476,106 on Nov. 12, 2019, which is a continuation of U.S. Non-Provisional application Ser. No. 13/964,195, filed on Aug. 12, 2013, now U.S. Pat. No. 9,923,238, patented Mar. 20, 2018, which is a continuation of International Application PCT/JP2012/051635, filed on Jan. 26, 2012, and designated the U.S., (and claims priority from Japanese Patent Application 2011-027671 which was filed on Feb. 10, 2011, Japanese Patent Application 2011-031074 which was filed on Feb. 16, 2011, Japanese Patent Application 2011-169549 which was filed on Aug. 2, 2011 and Japanese Patent Application 2011-192138 which was filed on Sep. 2, 2011) the entire contents of which are incorporated herein by reference.

TECHNICAL FIELD

The present invention relates to a non-aqueous electrolyte solution and to a non-aqueous electrolyte secondary battery that uses this non-aqueous electrolyte solution.

BACKGROUND ART

The rapid advances in portable electronic devices such as cell phones, notebook personal computers, and so forth have been accompanied by increased demand for higher capacities from the batteries used in these devices as the main or back-up power source. The focus here is on non-aqueous electrolyte batteries such as lithium ion secondary batteries, which have higher energy densities than nickel/cadmium batteries and nickel/hydride batteries.

Typical examples of the electrolyte solutions in lithium ion secondary batteries are the non-aqueous electrolyte solutions obtained by dissolving an electrolyte, e.g., $LiPF_6$, $LiBF_4$, $LiN(CF_3SO_2)_2$, or $LiCF_3(CF_2)_3SO_3$, in a solvent provided by mixing a high dielectric constant solvent, e.g., ethylene carbonate or propylene carbonate, with a low-viscosity solvent, e.g., dimethyl carbonate, diethyl carbonate, or ethyl methyl carbonate.

A carbonaceous material capable of the insertion/extraction of the lithium ion is primarily used as the negative electrode active material of lithium ion secondary batteries, and typical examples here are natural graphite, artificial graphite, amorphous carbon and so forth. Metal- and alloy-based negative electrodes that use, e.g., silicon or tin, are also known with the goal of further increasing the capacity. Transition metal composite oxides capable of the insertion/extraction of the lithium ion are mainly used as the positive electrode active material, and cobalt, nickel, manganese, iron, and so forth are typical examples of the transition metal.

It is known that the charge/discharge capacity is reduced by secondary reactions that occur between the electrodes and the electrolyte solution due to the fact that these lithium ion secondary batteries use a very active positive electrode and a very active negative electrode, and various investigations have been carried out on the non-aqueous solvent and the electrolyte in order to improve the battery characteristics.

An improvement in the battery characteristics is proposed in Patent Document 1 through the use of an electrolyte solution that incorporates an organic compound having at least two cyano groups. The battery characteristics are improved because the large dipole moment due to the polarity of the cyano group results in an inhibition of oxidative degradation of the electrolyte solution at the positive electrode during high-voltage charging.

Patent Documents 2 and 3 propose an improvement in the battery cycle characteristics through the addition of an isocyanate group-containing compound to the non-aqueous electrolyte solution, thereby inhibiting solvent degradation reactions.

Patent Document 4 proposes an improvement in the battery cycle characteristics through the addition to the non-aqueous electrolyte solution of an isocyanate compound and a prescribed sulfonic acid anhydride.

Patent Document 5 proposes an improvement in the battery characteristics by inhibiting $LiPF_6$ degradation through the addition to the non-aqueous electrolyte solution of a phosphazene derivative.

Patent Document 6 proposes that the charge/discharge cycle life be improved by the formation of a passivation film on the surface of the carbon negative electrode; this is achieved by using a non-aqueous electrolyte solution that contains an alkynyl alkanesulfonate compound.

In Patent Document 7, it is reported that the cycle characteristics and rate characteristics are improved by using a silicon alloy negative electrode and an electrolyte solution that incorporates a diisocyanate and a fluorinated cyclic carbonate.

Patent Document 1: Japanese Patent Application Laid-open No. H 7-176322
Patent Document 2: Japanese Patent Application Laid-open No. 2005-259641
Patent Document 3: Japanese Patent Application Laid-open No. 2006-164759
Patent Document 4: Japanese Patent Application Laid-open No. 2010-225522
Patent Document 5: Japanese Patent Application Laid-open No. 2002-83628
Patent Document 6: Japanese Patent Application Laid-open No. 2000-195545
Patent Document 7: WO 2010/021236

DISCLOSURE OF THE INVENTION

However, the demand for higher battery performance has been constantly increasing in recent years, and there is demand that various battery characteristics, e.g., high capacity, the high-temperature storage characteristics, the cycle characteristics, and so forth, be brought to even higher levels.

Within the realm of methods for raising the capacity, investigations are being carried out, for example, into methods in which the active material layer of the electrode is densified by the application of pressure in order to reduce the volume taken up in the battery interior by non-active materials to the greatest extent possible, and into methods the range of use of the positive electrode is expanded in order to bring about use at higher potentials. However, when the active material layer of an electrode is densified by the application of pressure, it becomes difficult to uniformly use the active material and the problem then readily appears of being unable to obtain satisfactory characteristics due to the promotion of active material deterioration and the precipitation of a portion of the lithium as induced by heterogeneous reactions. In addition, when the range of use of the positive electrode is expanded in order to bring about use at higher potentials, the activity of the positive electrode is then increased even further and the problem readily occurs of an accelerated deterioration brought about by reactions between the positive electrode and the electrolyte solution. When, in particular, storage in a charged state is carried out under high-temperature conditions, it is known that the battery capacity is reduced due to secondary reactions between the electrode and the electrolyte solution, and various investigations have been carried out into the non-aqueous solvent and the electrolyte in order to improve the storage characteristics.

In addition, when the voids in the interior of the battery are reduced by the effort to increase the capacity, the problem also appears of the pressure within the battery undergoing a substantial rise even when a small amount of gas has been produced by degradation of the electrolyte solution.

While an inhibition of the aforementioned deterioration in battery characteristics is required, when the isocyanate compounds described in Patent Documents 1 to 3 are incorporated in the non-aqueous electrolyte solution, secondary reactions by the additive also develop at the positive electrode at the same time. Moreover, even the incorporation of the prescribed sulfonic acid anhydride described in Patent Document 4 cannot completely inhibit these secondary reactions. The result has been a reduction in the initial capacity and/or in the high-temperature storage characteristics. While in particular an inhibition of gas generation is required with regard to the high-temperature storage characteristics, it has not been possible to simultaneously provide, depending on the prior art, both an inhibition of gas generation and an inhibition of the deterioration in battery characteristics.

Secondary reaction-induced deterioration at the negative electrode also develops even when the additive described in Patent Document 5 is incorporated in the non-aqueous electrolyte. As a result, satisfactory initial battery characteristics, high-temperature storage characteristics, and cycle characteristics still cannot be provided.

The reactions of the electrolyte solution at the negative electrode cannot be completely inhibited even when the additive described in Patent Document 6 is incorporated in the non-aqueous electrolyte, and as a result satisfactory cycle characteristics still cannot be provided.

Proposals as typified by Patent Document 7 attempt to improve the extended stability of a battery by using a compound that contains the isocyanate group per molecule. However, a satisfactory durability is not obtained depending on the type of isocyanate compound, the type of additive combined therewith, or their amounts of incorporation, and as a result satisfactory battery characteristics still cannot be provided.

The present invention was therefore pursued in view of the problems described in the foregoing and takes as an object the introduction of a non-aqueous electrolyte solution that, when used in a non-aqueous electrolyte battery, prevents the characteristics from deteriorating during high-temperature storage and prevents gas generation during high-temperature storage. A further object of the present invention is to provide a battery that uses this non-aqueous electrolyte solution.

As a result of varied and extensive investigations in order to achieve the aforementioned objects, the present inventors discovered that these objects could be achieved by incorporating a compound having at least two isocyanate groups per molecule and a compound having at least two cyano groups per molecule in the non-aqueous electrolyte solution at a particular prescribed ratio and achieved the present invention described below based on this discovery.

The present inventors also discovered that the aforementioned objects could be achieved by incorporating a compound having at least two isocyanate groups per molecule and a prescribed additive in the non-aqueous electrolyte solution and achieved the present invention described below based on this discovery.

The present inventors also discovered that the aforementioned objects could be achieved by incorporating a compound having at least two isocyanate groups per molecule and a prescribed amount of a prescribed additive in the non-aqueous electrolyte solution and achieved the present invention described below based on this discovery.

The present inventors also discovered that the aforementioned objects could be achieved by incorporating a compound having at least two isocyanate groups per molecule and a prescribed amount of a monofluorophosphate salt or a difluorophosphate salt in the non-aqueous electrolyte solution and using this in combination with a prescribed negative electrode and achieved the present invention below based on this discovery.

The gist of a first aspect of the present invention is as follows.

(i) A non-aqueous electrolyte solution for a non-aqueous electrolyte battery that has a positive electrode and a negative electrode that are capable of the absorbing and releasing of a metal ion, wherein
the non-aqueous electrolyte solution comprises: in addition to an electrolyte and a non-aqueous solvent,
(A) a compound having at least two isocyanate groups per molecule and a compound having at least two cyano groups per molecule; and
(B) a content ratio (mass ratio) between the compound having at least two isocyanate groups per molecule and the compound having at least two cyano groups per molecule is from 50:50 to 1:99.

(ii) The non-aqueous electrolyte solution according to (i), wherein the compound having at least two cyano groups per molecule comprises a compound represented by the following general formula (1):

[Chem. 1]

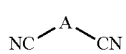

(1)

(In formula (1), A is an organic group having from 1 to 10 carbons and that contains at least one atom selected from the group consisting of a hydrogen atom, carbon atom, nitrogen atom, oxygen atom, sulfur atom, phosphorus atom, and halogen atoms.).

(iii) The non-aqueous electrolyte solution according to (i), wherein the compound having at least two isocyanate groups per molecule and the compound having at least two cyano groups per molecule are each present in the non-aqueous electrolyte solution at from 0.001 or more mass % to 10 mass % or less.

(iv) The non-aqueous electrolyte solution according to (i), wherein the compound having at least two isocyanate groups per molecule comprises at least one compound selected from the group consisting of hexamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, 2,4,4-trimethylhexamethylene diisocyanate, and polyisocyanate compounds derived therefrom.

(v) The non-aqueous electrolyte solution according to (i), wherein the compound having at least two cyano groups per molecule comprises at least one compound selected from the group consisting of glutaronitrile, adiponitrile, pimelonitrile, and suberonitrile.

(vi) The non-aqueous electrolyte solution according to (i), that further contains at least one compound selected from the group consisting of fluorine atom-containing cyclic carbonates, cyclic carbonates having a carbon-carbon unsaturated bond, monofluorophosphate salts, and difluorophosphate salts.

(vii) The non-aqueous electrolyte solution according to (vi), wherein the fluorine atom-containing cyclic carbonate comprises at least one compound selected from the group consisting of monofluoroethylene carbonate, 4,4-difluoroethylene carbonate, and 4,5-difluoroethylene carbonate, and the cyclic carbonate having a carbon-carbon unsaturated bond comprises at least one compound selected from the group consisting of vinylene carbonate, vinylethylene carbonate, and ethynylethylene carbonate.

(viii) A non-aqueous electrolyte secondary battery comprising a non-aqueous electrolyte solution, and a positive electrode and a negative electrode that are capable of the absorbing and releasing of a lithium ion, wherein the non-aqueous electrolyte solution is the non-aqueous electrolyte solution according to (i).

The gist of a second aspect of the present invention is as follows.

(ix) A non-aqueous electrolyte solution for a non-aqueous electrolyte battery that has a positive electrode and a negative electrode that are capable of the absorbing and releasing of a metal ion, wherein the non-aqueous electrolyte solution comprises: in addition to an electrolyte and a non-aqueous solvent, (A) a compound having at least two isocyanate groups per molecule; and (B) at least one selection from the group consisting of compounds represented by the following formulas (2) to (6):

[Chem. 2]

(In formula (2), 1 and m are both integers from 0 to 4.)

[Chem. 3]

(In formula (3), n is an integer from 0 to 4.)

[Chem. 4]

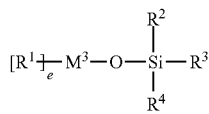

(In formula (4), $M^3$ represents a metal atom, a phosphorus atom, a boron atom, or P=O; $R^1$ represents an alkyloxy group having 1 to 11 carbons, a silyloxy group, or an alkylsilyloxy group having 1 to 11 carbons; e represents the number of $R^1$ groups bonded to $M^3$; when e is two or more, the $R^1$ groups may be the same as each other or may differ from one another; and $R^2$ to $R^4$ each independently represent an alkyl group having 1 to 11 carbons, alkenyl group having 1 to 11 carbons, alkyloxy group having 1 to 11 carbons, or aryl group having 6 to 11 carbons.)

[Chem. 5]

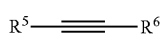

(In formula (5), $R^5$ and $R^6$ are each independently a hydrogen atom, a halogen atom, or a possibly substituted organic group and may be the same as each other or may differ from one another.)

[Chem. 6]

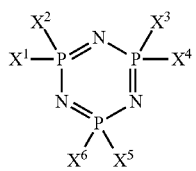

(In formula (6), $X^1$ to $X^6$ are each independently a halogen atom, alkyl group, aryl group, alkoxy group, or aryloxy group and may be the same as each other or may differ from one another.).

(x) The non-aqueous electrolyte solution according to (ix), wherein the non-aqueous electrolyte solution contains the compounds of general formulas (2) to (5) at from 0.01 mass % or more to 5 mass % or less and contains the compound of general formula (6) at from 0.01 mass % or more to 50 mass % or less.

(xi) The non-aqueous electrolyte solution according to (ix), wherein one of $R^5$ and RE in general formula (5) is, or both of $R^5$ and $R^6$ in general formula (5) are, an organic group having at least one S=O group.

(xii) The non-aqueous electrolyte solution according to (ix), wherein in general formula (6) at least one of $X^1$ to $X^6$ is a halogen atom and at least one of $X^1$ to $X^6$ is an alkoxy group or aryloxy group.

(xiii) The non-aqueous electrolyte solution according to (ix), wherein the compound having at least two isocyanate groups per molecule comprises at least one compound selected from the group consisting of hexamethylene diisocyanate, 1,3-bis(isocyanatomethyl)cyclohexane, dicyclohexylmethane-4,4'-diisocyanate, bicyclo[2.2.1] heptan-2,5-diylbis(methyl isocyanate), bicyclo[2.2.1] heptan-2,6-diylbis(methyl isocyanate), isophorone diisocyanate, 2,2,4-trimethylhexamethylene diisocyanate, 2,4,4-trimethylhexamethylene diisocyanate, and polyisocyanate compounds derived from therefrom.

(xiv) The non-aqueous electrolyte solution according to (ix), that further comprises at least one compound selected from the group consisting of fluorine atom-containing cyclic carbonates, cyclic carbonates having a carbon-carbon unsaturated bond, monofluorophosphate salts, and difluorophosphate salts.

(xv) The non-aqueous electrolyte solution according to (xiv), wherein the fluorine atom-containing cyclic carbonate comprises at least one compound selected from the group consisting of monofluoroethylene carbonate, 4,4-difluoroethylene carbonate, and 4,5-difluoroethylene carbonate, and the cyclic carbonate having a carbon-carbon unsaturated bond comprises at least one compound selected from the group consisting of vinylene carbonate, vinylethylene carbonate, and ethynylethylene carbonate.

(xvi) A non-aqueous electrolyte secondary battery comprising a non-aqueous electrolyte solution, and a positive electrode and a negative electrode that are capable of the absorbing and releasing of a lithium ion, wherein the non-aqueous electrolyte solution is the non-aqueous electrolyte solution according to (ix).

The gist of a third aspect of the present invention is as follows.

(xvii) A non-aqueous electrolyte solution for a non-aqueous electrolyte battery having a positive electrode and a negative electrode that are capable of the absorbing and releasing of a lithium ion, wherein the non-aqueous electrolyte solution comprises: in addition to an electrolyte and a non-aqueous solvent, (A) a compound having at least two isocyanate groups per molecule; and (B) a compound represented by the following formula (7), at from 0.01 mass % or more to 1.5 mass % or less in the non-aqueous electrolyte solution,

[Chem. 7]

$$M^1_a[M^2(C_2O_4)_bR_c]_d \quad (7)$$

(In formula (7), $M^1$ is an element selected from aluminum (Al) and Groups 1 and 2 of the Periodic Table, $M^2$ is an element selected from transition metals and Groups 13, 14, and 15 of the Periodic Table, R is a group selected from halogens, alkyl groups having 1 to 11 carbons, and halogen-substituted alkyl groups having 1 to 11 carbons, a and b are positive integers, c is 0 or a positive integer, and d is an integer from 1 to 3.).

(xviii) The non-aqueous electrolyte solution according to (xvii), wherein the compound having at least two isocyanate groups per molecule comprises at least one compound selected from the group consisting of hexamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, 2,4,4-trimethylhexamethylene diisocyanate, and polyisocyanate compounds derived therefrom.

(xix) A non-aqueous electrolyte secondary battery comprising a non-aqueous electrolyte solution, and a negative electrode and a positive electrode capable of the absorbing and releasing of a lithium ion, wherein the non-aqueous electrolyte solution is the non-aqueous electrolyte solution according to (xvii).

The gist of a fourth aspect of the present invention is as follows.

(xx) A non-aqueous electrolyte secondary battery comprising at least a positive electrode capable of the absorbing and releasing of a lithium ion, a negative electrode capable of the absorbing and releasing of the lithium ion, and a non-aqueous electrolyte solution containing a non-aqueous solvent and an electrolyte dissolved in the non-aqueous solvent, wherein the negative electrode comprises a carbonaceous material and the non-aqueous electrolyte solution comprises: in addition to an electrolyte and a non-aqueous solvent, (A) a compound having at least two isocyanate groups per molecule, (B) a monofluorophosphate salt or a difluorophosphate salt, at from 0.001 mass % or more to 5 mass % or less in the non-aqueous electrolyte solution.

(xxi) The non-aqueous electrolyte secondary battery according to (xx), wherein the compound having at least two isocyanate groups per molecule comprises at least one compound selected from the group consisting of hexamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, 2,4,4-trimethylhexamethylene diisocyanate, and polyisocyanate compounds derived therefrom.

The present invention can inhibit the capacity deterioration and gas generation that occur during the high-temperature storage of a non-aqueous electrolyte battery and is therefore able to provide a non-aqueous electrolyte battery that has both excellent cycle characteristics on an extended basis and excellent charge/discharge characteristics at high current densities.

The mechanisms and theory by which a non-aqueous electrolyte secondary battery fabricated using the non-aqueous electrolyte solution of the present invention and the non-aqueous electrolyte secondary battery of the present invention are able to provide an improved capacity deterioration and gas generation in the case of high-temperature storage are not clear, but the following is thought. However, the present invention is not limited to or by the mechanisms and theory described in the following.

A characteristic feature of the first present invention is the use in a non-aqueous electrolyte battery of a non-aqueous electrolyte solution that incorporates a compound having at least two isocyanate groups per molecule and a compound having at least two cyano groups per molecule in a certain prescribed ratio.

A characteristic feature of the second present invention is the use in a non-aqueous electrolyte battery of a non-aqueous electrolyte solution that incorporates a compound having at least two isocyanate groups per molecule and a prescribed additive.

A characteristic feature of the third present invention is the use in a non-aqueous electrolyte battery of a non-aqueous electrolyte solution that incorporates a compound having at least two isocyanate groups per molecule and a prescribed quantity of a prescribed additive.

A characteristic feature of the fourth present invention is the incorporation in a non-aqueous electrolyte solution of a compound having at least two isocyanate groups per molecule and a prescribed quantity of a monofluorophosphate salt or a difluorophosphate salt and the use thereof in combination with a prescribed negative electrode in a non-aqueous electrolyte battery.

Proposals as typified by Patent Document 1 generally bring about an improvement in battery characteristics through the reaction of a dicyano compound at the positive electrode. However, secondary reactions at the negative electrode also occur with dicyano compounds, and this causes a destabilization of the negative electrode film and as a consequence results in a decline in battery capacity. This decline also similarly progresses with compounds that have two or more cyano groups. In addition, with proposals as typified by Patent Documents 2 to 4, an improvement in the battery characteristics is brought about by the reaction of a diisocyanate compound at the negative electrode. However, secondary reactions at the positive electrode also occur with diisocyanate compounds, and this causes a decline in the battery capacity. This decline also similarly progresses with compounds that have two or more isocyanate groups. Moreover, in the case of proposals as typified by Patent Documents 5 and 6, while the additives act at the positive electrode, a decline in the battery characteristics similarly occur due to the adverse influence of secondary reactions at the negative electrode. Thus, the use of these additives alone has still not been able to provide satisfactory battery characteristics. In addition, while efforts are being made to improve the extended battery stability through the use of compounds that contain the isocyanate group per molecule, a satisfactory durability is not obtained depending on the type of isocyanate compound or the type of additive combined therewith or their amounts of incorporation, and these efforts have been unable to provide satisfactory battery characteristics.

Focusing on these points, the present inventors discovered that, by using the non-aqueous electrolyte solutions and non-aqueous electrolyte batteries according to the first to fourth inventions, the secondary reactions of those compounds are specifically inhibited and the battery characteristics are then quite substantially improved.

BEST MODE FOR CARRYING OUT THE INVENTION

Embodiments of the present invention are explained next, but the present invention is not limited to the following embodiments, and may be carried out in various ways without departing from the gist of the present invention. In addition, "weight", "weight-ppm", and "weight parts" are herein synonymous with "mass-", "mass-ppm", and "mass parts", respectively. When ppm is given by itself, this indicates "weight-ppm".

1. Non-Aqueous Electrolyte Solution
1-1. The Compound Having at Least Two Isocyanate Groups Per Molecule A characteristic feature of the first to fourth present inventions is the incorporation in the non-aqueous electrolyte solution of a compound having at least two isocyanate groups per molecule.

This compound having at least two isocyanate groups per molecule that is used in the present invention is a compound having at least two isocyanate groups per molecule but is not otherwise particularly limited as to type, and, for example, it may be a compound having a straight-chain or branched alkylene structure, a cycloalkylene structure, an aromatic hydrocarbon structure, an ether structure (—O—), or a structure provided by the halogenation of the foregoing. Additional examples are structures in which the carbonyl group (—C(═O)—) is connected or in which the carbonyl group is connected with an alkylene group and structures in which the sulfonyl group (—S(═O)—) is connected or in which the sulfonyl group is connected with an alkylene group.

The following compounds are specific examples of the compound having two isocyanate groups per molecule.

monomethylenediisocyanate, dimethylenediisocyanate, trimethylenediisocyanate, tetramethylenediisocyanate, pentamethylenediisocyanate, hexamethylenediisocyanate, heptamethylenediisocyanate, octamethylenediisocyanate, nonamethylenediisocyanate, decamethylenediisocyanate, dodecamethylenediisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluenediisocyanate, xylenediisocyanate, tolylenediisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, bicyclo[2.2.1]heptane-2,5-diylbis(methylisocyanate), bicyclo[2.2.1]heptane-2,6-diylbis(methylisocyanate), isophoronediisocyanate, carbonyldiisocyanate, 1,4-diisocyanatobutane-1,4-dione, 1,5-diisocyanatopentane-1,5-dione, 2,2,4-trimethylhexamethylenediisocyanate, and 2,4,4-trimethylhexamethylenediisocyanate.

The following are preferred among the foregoing in terms of improving the storage stability: monomethylene diisocyanate, dimethylene diisocyanate, trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, dodecamethylene diisocyanate, 1,3-bis(isocyanatomethyl)cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, and 2,4,4-trimethylhexamethylene diisocyanate.

The isocyanate compound used in the present inventions may also be a trimer compound derived from a compound having at least two isocyanate groups per molecule or may be an aliphatic polyisocyanate provided by the addition of a polyhydric alcohol to the foregoing. Examples are the biuret, isocyanurate, adduct, and difunctional type modified polyisocyanate represented by the basic structures in the following general formulas (8-1) to (8-4) (the R and R' in general formulas (8-1) to (8-4) are each independently a freely selected hydrocarbon group).

[Chem. 8]

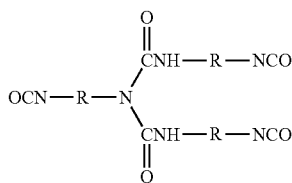

(8-1)

[Chem. 9]

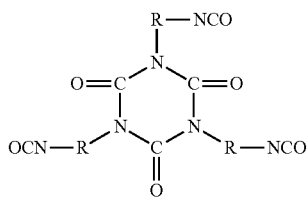

(8-2)

[Chem. 10]

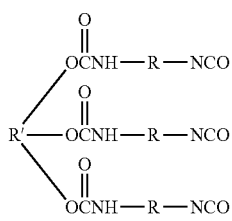

(8-3)

[Chem. 11]

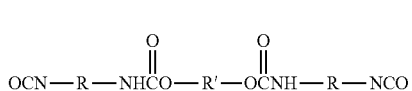

(8-4)

The compound having at least two isocyanate groups per molecule that is used by the present inventions also encompasses so-called blocked isocyanates that have been blocked with a blocking agent in order to raise the storage stability. The blocking agent can be exemplified by alcohols, phenols, organic amines, oximes, and lactams and can be specifically exemplified by n-butanol, phenol, tributylamine, diethylethanolamine, methyl ethyl ketoxime, and ε-caprolactam.

The co-use of a metal catalyst, e.g., dibutyltin dilaurate, or an amine catalyst, e.g., 1,8-diazabicyclo[5.4.0]undec-7-ene, is also preferred with the goal of obtaining a greater effect by promoting the reactions that are based on the compound having at least two isocyanate groups per molecule.

One of the compound having at least two isocyanate groups per molecule may be used alone, or any desired combination of two or more thereof in any desired proportion may be used. There are no limitations on the amount of incorporation, with respect to the overall non-aqueous electrolyte solution of the present invention, of the compound having at least two isocyanate groups per molecule, and this amount may be freely selected as long as the effects of the present inventions are not significantly impaired. However, incorporation is generally carried out, with respect to the non-aqueous electrolyte solution of the present invention, at a concentration of ordinarily 0.001 masse or more, preferably 0.01 mass % or more, and more preferably 0.1 mass % or more and ordinarily 10 mass % or less, preferably 5 mass % or less, and more preferably 3 mass % or less. If the abovementioned ranges are satisfied, the effects on output characteristic, load characteristic, low-temperature characteristic, cycle characteristic, high-temperature storage characteristic and so forth become more pronounced.

1-2. The Compound Having at Least Two Cyano Groups

A characteristic feature of the first present invention is the incorporation in the non-aqueous electrolyte solution of a compound having at least two cyano groups.

The compound having at least two cyano groups per molecule that is used in the present invention may be any compound having at least two cyano groups per molecule and is not particularly limited as to its type, but a compound with the following formula (1) is preferred.

[Chem. 12]

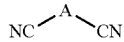

(1)

(In the formula, A is an organic group having 1 to 10 carbons comprising one or more types of atoms selected from the group consisting of hydrogen atoms, carbon atoms, nitrogen atoms, oxygen atoms, sulfur atoms, phosphorus atoms and halogen atoms.)

The organic group having 1 to 10 carbons comprising one or more types of atoms selected from the group consisting of hydrogen atoms, carbon atoms, nitrogen atoms, oxygen atoms, sulfur atoms, phosphorus atoms and halogen atoms, denotes organic groups comprising carbon atoms and hydrogen atoms, and, in addition, organic groups that may comprise nitrogen atoms, oxygen atoms, sulfur atoms, phosphorus atoms or halogen atoms. Organic groups that may comprise nitrogen atoms, oxygen atoms, sulfur atoms, phosphorus atoms or halogen atoms include organic groups in which some of the carbon atoms in the skeleton are substituted with any of the foregoing atoms, or organic groups having a substituent that is made up of the foregoing atoms.

The molecular weight of the compound having at least two cyano groups is not particularly limited, and may be any molecular weight, so long as the effect of the present invention is not significantly impaired. The lower limit of the molecular weight is preferably 65 or more, more preferably 80 or more, and even more preferably 90 or more. The upper limit of the molecular weight is preferably 200 or less, more preferably 160 or less, and even more preferably 135 or less. When the above conditions are satisfied, the solubility of the compound having at least two cyano groups towards the non-aqueous electrolyte solution is readily secured, and the effect of the present invention is readily brought about. The method for producing the compound having at least two cyano groups is not particularly limited, and the compound may be produced in accordance with an arbitrarily selected known method.

Specific examples of A in above formula (1) include, for instance, alkylene groups or derivatives thereof, alkenylene groups or derivatives thereof, cycloalkylene groups or derivatives thereof, alkynylene groups or derivatives thereof, cycloalkenylene groups or derivatives thereof, arylene groups or derivatives thereof, carbonyl groups or derivatives thereof, sulfonyl groups or derivatives thereof, sulfinyl groups or derivatives thereof, phosphonyl groups or derivatives thereof, phosphinyl groups or derivatives thereof, amide groups or derivatives thereof, imide groups or derivatives thereof, ether groups or derivatives thereof, thioether groups or derivatives thereof, borinic acid groups or derivatives thereof, and borane groups or derivatives thereof.

Preferred among the foregoing, in terms of enhancing battery characteristics, are alkylene groups or derivatives thereof, alkenylene groups or derivatives thereof, cycloalkylene groups or derivatives thereof, alkynylene groups or derivatives thereof, and arylene groups or derivatives thereof. More preferably, A is an organic group having 3 to 5 carbons optionally having a substituent.

The compound represented by general formula (1) can be specifically exemplified by malononitrile, succinonitrile, glutaronitrile, adiponitrile, pimelonitrile, suberonitrile, azelanitrile, sebaconitrile, undecanedinitrile, dodecanedinitrile, methylmalonotrile, ethylmalonotrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2,2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanonononane, 1,6-dicyanodecane, 1,2-dicyanobenzene, 1,3-dicyanobenzene, 1,4-dicyanobenzene, 3,3'-(ethylenedioxy)dipropionitrile, and 3,3'-(ethylenedithio)dipropionitrile.

Among the foregoing, malononitrile, succinonitrile, glutaronitrile, adiponitrile, pimelonitrile, suberonitrile, azelanitrile, sebaconitrile, undecanedinitrile, dodecanedinitrile, and fumaronitrile are preferred in terms of improving the storage characteristics. Glutaronitrile, adiponitrile, pimelonitrile, and suberonitrile are particularly preferred because they provide a particularly good improvement in the storage characteristics and little deterioration due to secondary reactions at the electrodes. In general with dinitrile compounds, the proportion of the cyano group in a single molecule increases and the viscosity of the molecule rises as the molecular weight declines, while the boiling point of the compound rises as the molecular weight increases. Therefore, glutaronitrile, adiponitrile, and pimelonitrile are highly preferred in terms of raising the production efficiency.

One of the compound having at least two cyano groups per molecule may be used alone, or any desired combination of two or more thereof in any desired proportion may be used. There are no limitations on the amount of incorporation, with respect to the overall non-aqueous electrolyte solution of the present invention, of the compound having at least two cyano groups, and this amount may be freely selected as long as the effects of the present inventions are not significantly impaired. However, incorporation is generally carried out, with respect to the non-aqueous electrolyte solution of the present invention, at a concentration of ordinarily 0.001 masse or more, preferably 0.01 mass % or more, more preferably 0.1 mass' or more, and even more preferably 0.03 mass % or more and ordinarily 10 masse or less, preferably 5 mass % or less, and more preferably 3 mass % or less.

The mass ratio between the compound having at least two isocyanate groups per molecule and the compound having at least two cyano groups that are incorporated in the non-aqueous electrolyte solution of the present invention, is 50:50 or more, preferably 40:60 or more, and more preferably 35:65 or more and is 1:99 or less and preferably 10:90 or less and is more preferably 20:80 or less. The battery characteristics and particularly the storage characteristics can be substantially improved when this range is satisfied. The theory underlying this is unclear, but it is thought that the secondary reactions of the additives at the electrodes are kept to a minimum by blending at the indicated ratios.

1-3. The Compounds Represented by Formulas (2) to (5)

The second present invention is characterized by the incorporation in the non-aqueous electrolyte solution of the previously described compound having at least two isocyanate groups per molecule and a compound as represented by the following formulas (2) to (5).

A single compound or two or more compounds from the compounds represented by formulas (2) to (5) may be incorporated in the non-aqueous electrolyte solution of the present invention. The content of the formula (2) to (5) compound (or the total content when two or more are used) is in the range from 0.01 mass % or more, preferably 0.05 masse or more, and more preferably 0.1 mass % or more to ordinarily 5 mass, or less, preferably 4 mass % or less, and more preferably 3 mass % or less. When this concentration is too low, the chemical and physical stability of the film may be unsatisfactory; when the concentration is too high, the film has a high insulating character and the discharge capacity may be reduced by the increase in the resistance. When the content of the formula (2) to (5) compound is in the indicated range, a synergistic effect is readily obtained with the compound having at least two isocyanate groups per molecule, which makes it possible to achieve an even greater inhibition of the reductive degradation reactions of the non-aqueous solvent that occur during charging, to improve the battery life, e.g., the high-temperature storage characteristics and the cycle characteristics, to raise the charge/discharge efficiency of the battery, and to improve the low-temperature characteristics.

There are no particular limitations on the method for incorporating the formula (2) to (5) compound in the electrolyte solution, but this method may be exemplified by methods in which the formula (2) to (5) compound synthesized by a known method is directly added to the electrolyte solution and by methods in which the formula (2) to (5) compound is generated within the battery or in the electrolyte solution. The method for generating the formula (2) to (5) compound can be exemplified by methods in which a compound other than the formula (2) to (5) compound is added and generation is then carried out by, for example, the oxidation or hydrolysis of a constituent element of the battery, for example, the electrolyte solution. Another example is a method in which the battery is fabricated and generation is induced by the application of an electrical load, for example, charge/discharge.

The content of the formula (2) to (5) compound in the non-aqueous electrolyte solution or the non-aqueous electrolyte battery can be quantitated by, for example, ion chromatography or F nuclear magnetic resonance spectroscopy.

The weight ratio between the compound having at least two isocyanate groups per molecule and the formula (2) to (5) compound is ordinarily in the range from 1:500 to 300:1, preferably 1:80 to 40:1, and more preferably 1:30 to 1.5:1.

1-3-1. Compound Represented by Formula (2)

[Chem. 13]

$$\text{LiN}(C_lF_{2l+1}SO_2)(C_mF_{2m+1}SO_2) \tag{2}$$

The l and m in formula (2) are integers from 0 to 4 and may have the same value or may differ from one another. In general, the ion mobility may decline and/or the film resistance may increase when the size of the anion in such a salt is too large.

1-3-2. Compound Represented by Formula (3)

[Chem. 14]

$$LiC_nF_{2n+1}SO_3 \tag{3}$$

The compound represented by formula (3) also has the same effect and thus the value of n is an integer from 0 to 4 for the same reason as described above with regard to the compound represented by formula (2).

1-3-3. Compound Represented by Formula (4)

[Chem. 15]

$$\begin{array}{c} R^2 \\ | \\ [R^1\!\!-\!\!]_e M^3\!-\!O\!-\!\underset{|}{Si}\!-\!R^3 \\ R^4 \end{array} \tag{4}$$

$M^3$ in formula (4) represents a metal atom, the phosphorus atom, the boron atom, or P=O. $R^1$ represents an alkyloxy group having 1 to 11 carbons, a silyloxy group, or an alkylsilyloxy group having 1 to 11 carbons. e represents the number of $R^1$ groups bonded to $M^3$. When e is two or more, the $R^1$ groups may be the same or may differ from one another. R2 to $R^4$ each independently represent an alkyl group having 1 to 11 carbons, alkenyl group having 1 to 11 carbons, alkyloxy group having 1 to 11 carbons, or aryl group having 6 to 11 carbons.

$M^3$ can be specifically exemplified by magnesium, boron, aluminum, silicon, phosphorus, P=O, scandium, titanium, vanadium, chromium, manganese, iron, cobalt, nickel, copper, zinc, germanium, tin, yttrium, zirconium, and niobium. Particularly preferred among the foregoing are aluminum, boron, phosphorus, P=O, titanium, and zirconium.

$R^1$ can be specifically exemplified by the methoxy group, ethoxy group, propoxy group, isopropoxy group, normal-butoxy group, sec-butoxy group, tert-butoxy group, pentoxy group, hexyloxy group, phenoxy group, trimethylsilyloxy group, triethylsilyloxy group, trimethoxysilyloxy group, and triethoxysilyloxy group. Preferred among the foregoing are the methoxy group, ethoxy group, propoxy group, isopropoxy group, normal-butoxy group, and trimethylsilyloxy group.

$R^2$, $R^3$, and $R^4$ can be specifically exemplified by the methyl group, ethyl group, vinyl group, propyl group, isopropyl group, 1-propenyl group, 2-propenyl group, 1-propynyl group, 2-propynyl group, butyl group, sec-butyl group, t-butyl group, 1-butenyl group, 2-butenyl group, 3-butenyl group, 4-methyl-2-propenyl group, 1-methylenepropyl group, 1-methyl-2-propenyl group, 1,2-dimethylvinyl group, 1-butynyl group, 2-butynyl group, 3-butynyl group, pentyl group, 1-methylbutyl group, 2-methylbutyl group, 3-methylbutyl group, 1-methyl-2-propyl group, 2,2-dimethylpropyl group, phenyl group, methylphenyl group, ethylphenyl group, pentamethylphenyl group, methoxy group, ethoxy group, propyloxy group, isopropyloxy group, butoxy group, sec-butoxy group, tert-butoxy group, pentoxy group, hexyloxy group, and phenoxy group. $R^1$ to $R^4$ desirably have no more than 4 carbons in terms of the solubility in the non-aqueous electrolyte solution, and preferred specific examples in this regard are the methyl, ethyl, propyl, isopropyl, normal-butyl, isobutyl, sec-butyl, methoxy, ethoxy, propoxy, isopropoxy, normal-butoxy, isobutoxy, and sec-butoxy group. The methyl group is the most preferred among the foregoing.

The following compounds are specific examples of the compound with formula (4): magnesium bis(trimethylsiloxide), tris(trimethylsilyl) borate, tris(trimethoxysilyl) borate, tris(triethylsilyl) borate, tris(triethoxysilyl) borate, tris(dimethylvinylsilyl) borate, tris(diethylvinylsilyl) borate, aluminum tris(trimethylsiloxide), dimethoxyaluminoxytrimethylsilane, dimethoxyaluminoxytrimethoxysilane, diethoxyaluminoxytrimethylsilane, diethoxyaluminoxytriethoxysilane, dipropyloxyaluminoxytrimethylsilane, dibutoxyaluminoxytrimethylsilane, dibutoxyaluminoxytrimethoxysilane, dibutoxyaluminoxytriethylsilane, dibutoxyaluminoxytriethoxysilane, dipropoxyaluminoxytriethoxysilane, dibutoxyaluminoxytripropylsilane, dibutoxyaluminoxytrimethoxysilane, dibutoxyaluminoxytriethoxysilane, dibutoxyaluminoxytripropyloxysilane, dibutoxyaluminoxytriphenoxysilane, tris(trimethylsilyl) phosphate, tris(triethylsilyl) phosphate, tris(tripropylsilyl) phosphate, tris(triphenylsilyl) phosphate, tris(trimethoxysilyl) phosphate, tris(triethoxysilyl) phosphate, tris(triphenoxysilyl) phosphate, tris(dimethylvinylsilyl) phosphate, tris (diethylvinylsilyl) phosphate, scandium tris(trimethylsiloxide), titanium tetrakis(trimethylsiloxide), titanium tetrakis(triethylsiloxide), titanium tetrakis(trimethoxysiloxide), titaniumoxybis(trimethylsiloxide), vanadiumoxytris(trimethylsiloxide), zinc bis(trimethylsiloxide), germanium tetrakis(trimethylsiloxide), tin tetrakis(trimethylsiloxide), yttrium tris(trimethylsiloxide), zirconium tetrakis(trimethylsiloxide), and niobium pentakis(trimethylsiloxide).

1-3-4. Compound Represented by Formula (5)

[Chem. 16]

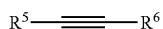

$$R^5\!-\!\!\equiv\!\!-\!R^6 \tag{5}$$

$R^5$ and $R^6$ in formula (5) are each independently the hydrogen atom, a halogen atom, or a possibly substituted organic group and may be the same or may differ from one another.

This organic group represents a functional group constituted of atoms selected from the group consisting of the carbon atom, hydrogen atom, nitrogen atom, oxygen atom, and halogen atoms. It can be specifically exemplified by an alkyl group, an alkenyl group, an alkynyl group, an aryl group, an alkoxy group, a cyano group, an isocyanate group, an ether group, a carbonate group, and a carbonyl group.

Specific examples of the substituent are a possibly halogen-substituted alkyl group and an alkenyl group, an alkynyl group, an aryl group, alkoxy group, a cyano group, an isocyanate group, an ether group, a carbonate group, a carbonyl group, a carboxyl group, a sulfonyl group, and a phosphoryl group.

Preferably either or both of $R^5$ and $R^6$ in formula (5) is or are an organic group that contains at least one S=O group. The reason for this is as follows: the presence of the S=O group facilitates interaction at the positive electrode and thus facilitates inhibition of the secondary reactions at the positive electrode by the compound having at least two isocyanate groups per molecule.

The molecular weight of the compound represented by formula (5) is not particularly limited, and may be any molecular weight so long as the effect of the present invention is not significantly impaired. Preferably, the molecular weight is 100 or more, more preferably 130 or more, and even more preferably 145 or more, and 500 or less, preferably 300 or less, and more preferably 270 or less. Within the above ranges, the solubility of the compound represented by formula (5) towards the non-aqueous electrolyte solution is readily secured, and the effect of the present invention is readily brought about.

The following compounds are specific examples of compounds represented by formula (5).

hydrocarbon compounds such as 1-pentyne, 2-pentyne, 1-hexyne, 2-hexyne, 3-hexyne, 1-heptyne, 2-heptyne, 3-heptyne, 1-octyne, 2-octyne, 3-octyne, 4-octyne, 1-nonyne, 2-nonyne, 3-nonyne, 4-nonyne, 1-dodecyne, 2-dodecyne, 3-dodecyne, 4-dodecyne, 5-dodecyne, phenylacetylene, 1-phenyl-1-propyne, 1-phenyl-2-propyne, 1-phenyl-1-butyne, 4-phenyl-1-butyne, 1-phenyl-1-pentyne, 5-phenyl-1-pentyne, 1-phenyl-1-hexyne, 6-phenyl-1-hexyne, diphenylacetylene, 4-ethynyltoluene, and dicyclohexylacetylene;

monocarbonates such as 2-propynyl methyl carbonate, 2-propynyl ethyl carbonate, 2-propynyl propyl carbonate, 2-propynyl butyl carbonate, 2-propynyl phenyl carbonate, 2-propynyl cyclohexyl carbonate, di-2-propynyl carbonate, 1-methyl-2-propynyl methyl carbonate, 1,1-dimethyl-2-propynyl methyl carbonate, 2-butynyl methyl carbonate, 3-butynyl methyl carbonate, 2-pentynyl methyl carbonate, 3-pentynyl methyl carbonate, and 4-pentynyl methyl carbonate;

dicarbonates such as 2-butyne-1,4-diol dimethyl dicarbonate, 2-butyne-1,4-diol diethyl dicarbonate, 2-butyne-1,4-diol dipropyl dicarbonate, 2-butyne-1,4-diol dibutyl dicarbonate, 2-butyne-1,4-diol diphenyl dicarbonate, and 2-butyne-1,4-diol dicyclohexyl dicarbonate;

the esters of monocarboxylic acids, e.g., 2-propynyl acetate, 2-propynyl propionate, 2-propynyl butyrate, 2-propynyl benzoate, 2-propynyl cyclohexylcarboxylate, 1,1-dimethyl-2-propynyl acetate, 1,1-dimethyl-2-propynyl propionate, 1,1-dimethyl-2-propynyl butyrate, 1,1-dimethyl-2-propynyl benzoate, 1,1-dimethyl-2-propynyl cyclohexylcarboxylate, 2-butynyl acetate, 3-butynyl acetate, 2-pentynyl acetate, 3-pentynyl acetate, 4-pentynyl acetate, methyl acrylate, ethyl acrylate, propyl acrylate, vinyl acrylate, 2-propenyl acrylate, 2-butenyl acrylate, 3-butenyl acrylate, methyl methacrylate, ethyl methacrylate, propyl methacrylate, vinyl methacrylate, 2-propenyl methacrylate, 2-butenyl methacrylate, 3-butenyl methacrylate, methyl 2-propynoate, ethyl 2-propynoate, propyl 2-propynoate, vinyl 2-propynoate, 2-propenyl 2-propynoate, 2-butenyl 2-propynoate, 3-butenyl 2-propynoate, methyl 2-butynoate, ethyl 2-butynoate, propyl 2-butynoate, vinyl 2-butynoate, 2-propenyl 2-butynoate, 2-butenyl 2-butynoate, 3-butenyl 2-butynoate, methyl 3-butynoate, ethyl 3-butynoate, propyl 3-butynoate, vinyl 3-butynoate, 2-propenyl 3-butynoate, 2-butenyl 3-butynoate, 3-butenyl 3-butynoate, methyl 2-pentynoate, ethyl 2-pentynoate, propyl 2-pentynoate, vinyl 2-pentynoate, 2-propenyl 2-pentynoate, 2-butenyl 2-pentynoate, 3-butenyl 2-pentynoate, methyl 3-pentynoate, ethyl 3-pentynoate, propyl 3-pentynoate, vinyl 3-pentynoate, 2-propenyl 3-pentynoate, 2-butenyl 3-pentynoate, 3-butenyl 3-pentynoate, methyl 4-pentynoate, ethyl 4-pentynoate, propyl 4-pentynoate, vinyl 4-pentynoate, 2-propenyl 4-pentynoate, 2-butenyl 4-pentynoate, and 3-butenyl 4-pentynoate;

the esters of monocarboxylic acids, e.g., 2-propynyl 2-(methanesulfonyloxy)propionate, 3-butynyl 2-(methanesulfonyloxy)propionate, 2-propynyl methanesulfonyloxyacetate, and 3-butynyl methanesulfonyloxyacetate;

the esters of dicarboxylic acids, e.g., 2-butyne-1,4-diol diacetate, 2-butyne-1,4-diol dipropionate, 2-butyne-1,4-diol dibutyrate, 2-butyne-1,4-diol dibenzoate, and 2-butyne-1,4-diol dicyclohexanecarboxylate;

the diesters of oxalic acid, e.g., methyl 2-propynyl oxalate, ethyl 2-propynyl oxalate, propyl 2-propynyl oxalate, 2-propynyl vinyl oxalate, allyl 2-propynyl oxalate, di-2-propynyl oxalate, 2-butynyl methyl oxalate, 2-butynyl ethyl oxalate, 2-butynyl propyl oxalate, 2-butynyl vinyl oxalate, allyl 2-butynyl oxalate, di-2-butynyl oxalate, 3-butynyl methyl oxalate, 3-butynyl ethyl oxalate, 3-butynyl propyl oxalate, 3-butynyl vinyl oxalate, allyl 3-butynyl oxalate, and di-3-butynyl oxalate;

sulfone compounds such as methyl-2-propynyl sulfone, ethyl-2-propynyl sulfone, propyl-2-propynyl sulfone, 2-propynyl vinyl sulfone, 2-propenyl 2-propynyl sulfone, di-2-propynyl sulfone, 3-butenyl 2-propynyl sulfone, 1,1-dimethyl-2-propynyl vinyl sulfone, and 1,1-dimethyl-2-propynyl 2-propenyl sulfone;

the esters of monosulfonic acids, e.g., 2-propynyl methanesulfonate, 2-propynyl ethanesulfonate, 2-propynyl propanesulfonate, 2-propynyl p-toluenesulfonate, 2-propynyl cyclohexylsulfonate, 2-propynyl vinylsulfonate, 2-propynyl 2-propenylsulfonate, methyl 2-propynylsulfonate, ethyl 2-propynylsulfonate, butyl 2-propynylsulfonate, 2-propenyl 2-propynylsulfonate, 2-propynyl 2-propynylsulfonate, 1,1-dimethyl-2-propynyl methanesulfonate, 1,1-dimethyl-2-propynyl ethanesulfonate, 1,1-dimethyl-2-propynyl propanesulfonate, 1,1-dimethyl-2-propynyl p-toluenesulfonate, 1,1-dimethyl-2-propynyl cyclohexylsulfonate, 1,1-dimethyl-2-propynyl vinylsulfonate, 1,1-dimethyl-2-propynyl 2-propenylsulfonate, 2-pentynyl methanesulfonate, 3-pentynyl methanesulfonate, 4-pentynyl methanesulfonate, 2-butynyl vinylsulfonate, 3-butynyl vinylsulfonate, 2-pentynyl vinylsulfonate, 3-pentynyl vinylsulfonate, 4-pentynyl vinylsulfonate, 2-butynyl 2-propenylsulfonate, 3-butynyl 2-propenylsulfonate, 2-pentynyl 2-propenylsulfonate, 3-pentynyl 2-propenylsulfonate, 4-pentynyl 2-propenylsulfonate, 2-butynyl 2-propynylsulfonate, 3-butynyl 2-propynylsulfonate, 2-pentynyl 2-propynylsulfonate, 3-pentynyl 2-propynylsulfonate, 4-pentynyl 2-propynylsulfonate, 2-propynyl 2-oxoethanesulfonate, 2-propynyl 3-oxopropanesulfonate, 2-propynyl 4-oxobutanesulfonate, 2-propynyl 5-oxopentanesulfonate, 2-propynyl 6-oxohexanesulfonate, 2-propynyl 7-oxoheptanesulfonate, 2-propynyl 3-oxopropoxymethanesulfonate, 2-propynyl 2-oxopropanesulfonate, 2-propynyl 3-oxobutanesulfonate, 2-propynyl 4-oxopentanesulfonate, 2-propynyl 5-oxohexanesulfonate, 2-propynyl 6-oxoheptanesulfonate, 2-propynyl 7-oxooctanesulfonate, 2-propynyl 2-oxobutanesulfonate, 2-propynyl 3-oxopentanesulfonate, 2-propynyl 4-oxohexanesulfonate, 2-propynyl 5-oxoheptanesulfonate, 2-propynyl 6-oxooctanesulfonate, 2-propynyl 7-oxononanesulfonate, 2-propynyl 2-(3-oxobutoxy)ethanesulfonate, 2-propynyl methanesulfonylmethanesulfonate, 2-propynyl 2-(methanesulfonyl)ethanesulfonate, 2-propynyl 3-(methanesulfonyl)

propanesulfonate, 2-propynyl 4-(methanesulfonyl)butanesulfonate, 2-propynyl 5-(methanesulfonyl)pentanesulfonate, 2-propynyl 6-(methanesulfonyl)hexanesulfonate, 2-propynyl ethanesulfonylmethanesulfonate, 2-propynyl 2-(ethanesulfonyl)ethanesulfonate, 2-propynyl 3-(ethanesulfonyl)propanesulfonate, 2-propynyl 4-(ethanesulfonyl)butanesulfonate, 2-propynyl 5-(ethanesulfonyl)pentanesulfonate, 2-propynyl 6-(ethanesulfonyl)hexanesulfonate, 2-propynyl trifluoromethanesulfonylmethanesulfonate, 2-propynyl 2-(trifluoromethanesulfonyl)ethanesulfonate, 2-propynyl 3-(trifluoromethanesulfonyl)propanesulfonate, 2-propynyl 4-(trifluoromethanesulfonyl)butanesulfonate, 2-propynyl 5-(trifluoromethanesulfonyl)pentanesulfonate, 2-propynyl 6-(trifluoromethanesulfonyl)hexanesulfonate, 2-propynyl 2-(2-(methanesulfonyl)ethoxy)ethanesulfonate, 2-propynyl benzenesulfonylmethanesulfonate, 2-propynyl 2-(benzenesulfonyl)ethanesulfonate, 2-propynyl 3-(benzenesulfonyl)propanesulfonate, 2-propynyl 4-(benzenesulfonyl)butanesulfonate, 2-propynyl 5-(benzenesulfonyl)pentanesulfonate, 2-propynyl 6-(benzenesulfonyl)hexanesulfonate, 2-propynyl 4-methylbenzenesulfonylmethanesulfonate, 2-propynyl 2-(4-methylbenzenesulfonyl)ethanesulfonate, 2-propynyl 3-(4-methylbenzenesulfonyl)propanesulfonate, 2-propynyl 4-(4-methylbenzenesulfonyl)butanesulfonate, 2-propynyl 5-(4-methylbenzenesulfonyl)pentanesulfonate, 2-propynyl 6-(4-methylbenzenesulfonyl)hexanesulfonate, 2-propynyl 4-fluorobenzenesulfonylmethanesulfonate, 2-propynyl 2-(4-fluorobenzenesulfonyl)ethanesulfonate, 2-propynyl 3-(4-fluorobenzenesulfonyl)propanesulfonate, 2-propynyl 4-(4-fluorobenzenesulfonyl)butanesulfonate, 2-propynyl 5-(4-fluorobenzenesulfonyl)pentanesulfonate, 2-propynyl 6-(4-fluorobenzenesulfonyl)hexanesulfonate, 2-propynyl 2-(2-benzenesulfonylethoxy)ethanesulfonate, 2-propynyl methoxysulfonylmethanesulfonate, 2-propynyl 2-(methoxysulfonyl)ethanesulfonate, 2-propynyl 3-(methoxysulfonyl)propanesulfonate, 2-propynyl 4-(methoxysulfonyl)butanesulfonate, 2-propynyl 5-(methoxysulfonyl)pentanesulfonate, 2-propynyl 6-(methoxysulfonyl)hexanesulfonate, 2-propynyl ethoxysulfonylmethanesulfonate, 2-propynyl 2-(ethoxysulfonyl)ethanesulfonate, 2-propynyl 3-(ethoxysulfonyl)propanesulfonate, 2-propynyl 4-(ethoxysulfonyl)butanesulfonate, 2-propynyl 5-(ethoxysulfonyl)pentanesulfonate, 2-propynyl 6-(ethoxysulfonyl)hexanesulfonate, 2-propynyl 2-(2-(methoxysulfonyl)ethoxy)ethanesulfonate, 2-propynyl 2-propenyloxysulfonylmethanesulfonate, 2-propynyl 2-(2-propenyloxysulfonyl)ethanesulfonate, 2-propynyl 3-(2-propenyloxysulfonyl)propanesulfonate, 2'-propynyl 4-(2-propenyloxysulfonyl)butanesulfonate, 2-propynyl 5-(2-propenyloxysulfonyl)pentanesulfonate, 2-propynyl 6-(2-propenyloxysulfonyl)hexanesulfonate, 2-propynyl 2-(2-(2-propenyloxysulfonyl)ethoxy)ethanesulfonate, 2-propynyl dimethoxyphosphorylmethanesulfonate, 2-propynyl 2-(dimethoxyphosphoryl)ethanesulfonate, 2-propynyl 3-(dimethoxyphosphoryl)propanesulfonate, 2-propynyl 4-(dimethoxyphosphoryl)butanesulfonate, 2-propynyl 5-(dimethoxyphosphoryl)pentanesulfonate, 2-propynyl 6-(dimethoxyphosphoryl)hexanesulfonate, 2-propynyl diethoxyphosphorylmethanesulfonate, 2-propynyl 2-(diethoxyphosphoryl)ethanesulfonate, 2-propynyl 3-(diethoxyphosphoryl)propanesulfonate, 2-propynyl 4-(diethoxyphosphoryl)butanesulfonate, 2-propynyl 5-(diethoxyphosphoryl)pentanesulfonate, 2-propynyl 6-(diethoxyphosphoryl)hexanesulfonate, 2-propynyl 2-(2-(dimethoxyphosphoryl)ethoxy)ethanesulfonate, 2-propynyl methoxy(methyl)phosphorylmethanesulfonate, 2-propynyl 2-(methoxy(methyl)phosphoryl)ethanesulfonate, 2-propynyl 3-(methoxy(methyl)phosphoryl)propanesulfonate, 2-propynyl 4-(methoxy(methyl)phosphoryl)butanesulfonate, 2-propynyl 5-(methoxy(methyl)phosphoryl)pentanesulfonate, 2-propynyl 6-(methoxy(methyl)phosphoryl)hexanesulfonate, 2-propynyl 2-(2-(methoxy(methyl)phosphoryl)ethoxy)ethanesulfonate, 2-propynyl ethoxy(methyl)phosphorylmethanesulfonate, 2-propynyl 2-(ethoxy(methyl)phosphoryl)ethanesulfonate, 2-propynyl 3-(ethoxy(methyl)phosphoryl)propanesulfonate, 2-propynyl ethyl(methoxy)phosphorylmethanesulfonate, 2-propynyl 2-(ethyl(methoxy)phosphoryl)ethanesulfonate, 2-propynyl 3-(ethyl(methoxy)phosphoryl)propanesulfonate, 2-propynyl dimethylphosphorylmethanesulfonate, 2-propynyl 2-(dimethylphosphoryl)ethanesulfonate, 2-propynyl 3-(dimethylphosphoryl)propanesulfonate, 2-propynyl 4-(dimethylphosphoryl)butanesulfonate, 2-propynyl 5-(dimethylphosphoryl)pentanesulfonate, 2-propynyl 6-(dimethylphosphoryl)hexanesulfonate, 2-propynyl 2-(2-(dimethylphosphoryl)ethoxy)ethanesulfonate, 2-propynyl methoxymethanesulfonate, 2-propynyl 2-methoxyethanesulfonate, 2-propynyl 3-methoxypropanesulfonate, 2-propynyl 4-methoxybutanesulfonate, 2-propynyl 5-methoxypentanesulfonate, 2-propynyl 6-methoxyhexanesulfonate, 2-propynyl ethoxymethanesulfonate, 2-propynyl 2-ethoxyethanesulfonate, 2-propynyl 3-ethoxypropanesulfonate, 2-propynyl 4-ethoxybutanesulfonate, 2-propynyl 5-ethoxypentanesulfonate, 2-propynyl 6-ethoxyhexanesulfonate, 2-propynyl 2-(2-methoxyethoxy)ethanesulfonate, 2-propynyl formyloxymethanesulfonate, 2-propynyl 2-(formyloxy)ethanesulfonate, 2-propynyl 3-(formyloxy)propanesulfonate, 2-propynyl 4-(formyloxy)butanesulfonate, 2-propynyl 5-(formyloxy)pentanesulfonate, 2-propynyl 6-(formyloxy)hexanesulfonate, 2-propynyl 2-(2-(formyloxy)ethoxy)ethanesulfonate, 2-propynyl acetyloxymethanesulfonate, 2-propynyl 2-(acetyloxy)ethanesulfonate, 2-propynyl 3-(acetyloxy)propanesulfonate, 2-propynyl 4-(acetyloxy)butanesulfonate, 2-propynyl 5-(acetyloxy)pentanesulfonate, 2-propynyl 6-(acetyloxy)hexanesulfonate, 2-propynyl propionyloxymethanesulfonate, 2-propynyl 2-(propionyloxy)ethanesulfonate, 2-propynyl 3-(propionyloxy)propanesulfonate, 2-propynyl 4-(propionyloxy)butanesulfonate, 2-propynyl 5-(propionyloxy)pentanesulfonate, 2-propynyl 6-(propionyloxy)hexanesulfonate, 2-propynyl 2-(2-(acetyloxy) ethoxy)ethanesulfonate, 2-propynyl methanesulfonyloxymethanesulfonate, 2-propynyl 2-(methanesulfonyloxy)ethanesulfonate, 2-propynyl 3-(methanesulfonyloxy)propanesulfonate, 2-propynyl 4-(methanesulfonyloxy)butanesulfonate, 2-propynyl 5-(methanesulfonyloxy)pentanesulfonate, 2-propynyl 6-(methanesulfonyloxy)hexanesulfonate, 2-propynyl ethanesulfonyloxymethanesulfonate, 2-propynyl 2-(ethanesulfonyloxy)ethanesulfonate, 2-propynyl 3-(ethanesulfonyloxy)propanesulfonate, 2-propynyl 4-(ethanesulfonyloxy)butanesulfonate, 2-propynyl 5-(ethanesulfonyloxy)pentanesulfonate, 2-propynyl 5-(ethanesulfonyloxy)hexanesulfonate, 2-propynyl trifluoromethanesulfonyloxymethanesulfonate, 2-propynyl 2-(trifluoromethanesulfonyloxy)ethanesulfonate, 2-propynyl 3-(trifluoromethanesulfonyloxy)propanesulfonate, 2-propynyl 4-(trifluoromethanesulfonyloxy)butanesulfonate, 2-propynyl 5-(trifluoromethanesulfonyloxy)pentanesulfonate, 2-propynyl 6-(trifluoromethanesulfonyloxy)hexanesulfonate, 2-propynyl 2-(2-(methanesulfonyloxy)ethoxy)ethanesulfonate, 2-propynyl dimethoxyphosphoryloxymethanesulfonate, 2-propynyl 2-(dimethoxyphosphoryloxy)ethanesulfonate, 2-propynyl 3-(dimethoxyphosphoryloxy)propanesulfonate, 2-propynyl 4-(dimethoxyphosphoryloxy)butanesulfonate, 2-propynyl 5-(dimethoxyphosphoryloxy)pentanesulfonate, 2-propynyl 6-(dimethoxyphosphoryloxy)hexanesulfonate, 2-propynyl diethoxyphosphoryloxymethanesulfonate, 2-propynyl 2-(diethoxyphosphoryloxy)ethanesulfonate, 2-propynyl 3-(diethoxyphosphoryloxy)propanesulfonate, 2-propynyl 4-(diethoxyphosphoryloxy)butanesulfonate, 2-propynyl 5-(diethoxyphosphoryloxy)pentanesulfonate, 2-propynyl 6-(diethoxyphosphoryloxy)hexanesulfonate, 2-propynyl 2-(2-(dimethoxyphosphoryloxy)ethoxy)ethanesulfonate, 2-propynyl methoxy(methyl)phosphoryloxymethanesulfonate, 2-propynyl 2-(methoxy(methyl)phosphoryloxy)ethanesulfonate, 2-propynyl 3-(methoxy(methyl)phosphoryloxy)propanesulfonate, 2-propynyl 4-(methoxy(methyl)phosphoryloxy)butanesulfonate, 2-propynyl 5-(methoxy(methyl)phosphoryloxy)pentanesulfonate, 2-propynyl 6-(methoxy(methyl)phosphoryloxy)hexanesulfonate, 2-propynyl 2-(2-(methoxy(methyl)phosphoryloxy)ethoxy)ethanesulfonate, 2-propynyl ethoxy(methyl)phosphoryloxymethanesulfonate, 2-propynyl 2-(ethoxy(methyl)phosphoryloxy)ethanesulfonate, 2-propynyl 3-(ethoxy(methyl)phosphoryloxy)propanesulfonate, 2-propynyl ethyl (methoxy)phosphoryloxymethanesulfonate, 2-propynyl 2-(ethyl(methoxy)phosphoryloxy)ethanesulfonate, 2-propynyl 3-(ethyl(methoxy)phosphoryloxy)propanesulfonate, 2-propynyl dimethylphosphoryloxymethanesulfonate, 2-propynyl 2-(dimethylphosphoryloxy)ethanesulfonate, 2-propynyl 3-(dimethylphosphoryloxy)propanesulfonate, 2-propynyl 4-(dimethylphosphoryloxy)butanesulfonate, 2-propynyl 5-(dimethylphosphoryloxy)pentanesulfonate, 2-propynyl 6-(dimethylphosphoryloxy)hexanesulfonate, and 2-propynyl 2-(2-(dimethylphosphoryloxy)ethoxy)ethanesulfonate;

the esters of disulfonic acids, e.g., 2-butyne-1,4-diol dimethanesulfonate, 2-butyne-1,4-diol dipropanesulfonate, 2-butyne-1,4-diol di-p-toluenesulfonate, 2-butyne-1,4-diol dicyclohexanesulfonate, 2-butyne-1,4-diol divinylsulfonate, 2-butyne-1,4-diol diallylsulfonate, 2-butyne-1,4-diol dipropynylsulfonate, di(2-propynyl) methane-1,1-disulfonate, di(2-propynyl) ethane-1,2-disulfonate, di(2-propynyl) propane-1,3-disulfonate, di(2-propynyl) butane-1,4-disulfonate, di(2-propynyl) pentane-1,5-disulfonate, di(2-propynyl) hexane-1,6-disulfonate, and di(2-propynyl) 2,2'-oxydiethanesulfonate; sulfate esters such as methyl 2-propynyl sulfate, ethyl 2-propynyl sulfate, propyl-2-propynyl sulfate, vinyl-2-propynyl sulfate, 2-propenyl 2-propynyl sulfate, di-2-propynyl sulfate, 2-propenyl 1,1-dimethyl-2-propynyl sulfate, 3-butenyl 2-propynyl sulfate, and 3-butenyl 1,1-dimethyl-2-propynyl sulfate; phosphine oxides, e.g., phosphine oxides such as methyl(2-propynyl) (vinyl)phosphine oxide, divinyl(2-propynyl) phosphine oxide, di(2-propynyl) (vinyl)phosphine oxide, di(2-propenyl) (2-propynyl)phosphine oxide, di(2-propynyl) (2-propenyl)phosphine oxide, di(3-butenyl) (2-propynyl)phosphine oxide, and di(2-propynyl) (3-butenyl)phosphine oxide;

phosphinate esters such as 2-propynyl methyl(2-propenyl)phosphinate, 2-propynyl 2-butenyl(methyl)phosphinate, 2-propynyl di(2-propenyl)phosphinate, 2-propynyl di(3-butenyl)phosphinate, 1,1-dimethyl-2-propynyl methyl(2-propenyl)phosphinate, 1,1-dimethyl-2-propynyl 2-butenyl(methyl)phosphinate, 1,1-dimethyl-2-propynyl di(2-propenyl)phosphinate, 1,1-dimethyl-2-propynyl di(3-butenyl)phosphinate, 2-propenyl methyl(2-propynyl)phosphinate, 3-butenyl methyl(2-propynyl)phosphinate, 2-propenyl di(2-propynyl)phosphinate, 3-butenyl di(2-propynyl)phosphinate, 2-propenyl 2-propynyl(2-propenyl)phosphinate, and 3-butenyl 2-propynyl(2-propenyl)phosphinate; phosphonate esters such as methyl 2-propynyl 2-propenylphosphonate, methyl 2-propynyl 2-butenylphosphonate, 2-propynyl 2-propenyl 2-propenylphosphonate, 3-butenyl 2-propynyl 3-butenylphosphonate, 1,1-dimethyl-2-propynyl methyl 2-propenylphosphonate, 1,1-dimethyl-2-propynyl methyl 2-butenylphosphonate, 1,1-dimethyl-2-propynyl 2-propenyl 2-propenylphosphonate, 3-butenyl 1,1-dimethyl-2-propynyl 3-butenylphosphonate, 2-propynyl 2-propenyl methylphosphonate, 3-butenyl 2-propynyl methylphosphonate, 1,1-dimethyl-2-propynyl 2-propenyl methylphosphonate, 3-butenyl 1,1-dimethyl-2-propynyl methylphosphonate, 2-propynyl 2-propenyl ethylphosphonate, 3-butenyl 2-propynyl ethylphosphonate, 1,1-dimethyl-2-propynyl 2-propenyl ethylphosphonate, and 3-butenyl 1,1-dimethyl-2-propynyl ethylphosphonate; and phosphate esters such as methyl 2-propenyl 2-propynyl phosphate, ethyl 2-propenyl 2-propynyl phosphate, 2-butenyl methyl 2-propynyl phosphate, 2-butenyl ethyl 2-propynyl phosphate, 1,1-dimethyl-2-propynyl methyl 2-propenyl phosphate, 1,1-dimethyl-2-propynyl ethyl 2-propenyl phosphate, 2-butenyl 1,1-dimethyl-2-propynyl methyl phosphate, and 2-butenyl ethyl 1,1-dimethyl-2-propynyl phosphate.

Among the foregoing, compounds having an alkynyloxy group are preferred for achieving a more stable formation of a negative electrode film in the electrolyte solution.

In addition, compounds such as 2-propynyl methyl carbonate, di-2-propynyl carbonate, 2-butyne-1,4-diol dimethyl dicarbonate, 2-propynyl acetate, 2-propynyl 2-(methanesulfonyloxy)propionate, 2-butyne-1,4-diol diacetate, methyl 2-propynyl oxalate, di-2-propynyl oxalate, 2-propynyl methanesulfonate, 2-propynyl vinylsulfonate, 2-propynyl 2-propenylsulfonate, 2-butyne-1,4-diol dimethanesulfonate, 2-butyne-1,4-diol divinylsulfonate, 2-butyne-1,4-diol diallylsulfonate, and so forth are more preferred, while compounds such as 2-propynyl methanesulfonate, 2-propynyl vinylsulfonate, 2-propynyl 2-propenylsulfonate, and so forth are particularly preferred in terms of improving the storage characteristics.

1-4. Compound Represented by Formula (6)

The second present invention is also characterized by the incorporation in the non-aqueous electrolyte solution of a compound with the following formula (6) and the previously described compound having at least two isocyanate groups per molecule.

[Chem. 17]

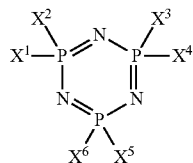

(6)

$X^1$ to $X^6$ in formula (6) are each independently a halogen atom, an alkyl group, an aryl group, an alkoxy group, or an aryloxy group and may be the same as each other or may differ from one another.

Among the foregoing, a halogen atom or alkoxy group or aryloxy group is preferred in terms of the electrochemical stability. The halogen atom is more preferably fluorine, chlorine, or bromine, wherein fluorine is most preferred from the standpoints of electrochemical stability and flame-retardant effect. On the other hand, there are no particular limitations on the number of carbons in the alkyl group or aryl group; however, for the alkoxy group, since a decline in the flame-retardant effect is seen when it has a large number of carbons, not more than 10 carbons is preferred and not more than 6 carbons is more preferred and, in the case of only alkoxy, not more than 3 carbons is even more preferred.

As long as the basic properties as an electrolyte solution are satisfied, i.e., the viscosity, electrical conductivity, electrochemical stability, and safety, $X^1$ to $X^6$ may all be the same substituent or may be a combination of two or more different substituents.

The alkoxy group here can be specifically exemplified by the methoxy group, fluoromethoxy group, difluoromethoxy group, trifluoromethoxy group, ethoxy group, 1-fluoroethoxy group, 2-fluoroethoxy group, 1,1-difluoroethoxy group, 1,2-difluoroethoxy group, 2,2-difluoroethoxy group, 1,1,2-trifluoroethoxy group, 1,2,2-trifluoroethoxy group, 2,2,2-trifluoroethoxy group, 1,1,2,2-tetrafluoroethoxy group, 1,2,2,2-tetrafluoroethoxy group, pentafluoroethoxy group, propoxy group (n-propoxy group), 1-fluoropropoxy group, 2-fluoropropoxy group, 3-fluoropropoxy group, 1,1-difluoropropoxy group, 1,2-difluoropropoxy group, 1,3-difluoropropoxy group, 2,2-difluoropropoxy group, 2,3-difluoropropoxy group, 3,3-difluoropropoxy group, 1,1,2-trifluoropropoxy group, 1,2,2-trifluoropropoxy group, 1,1,3-trifluoropropoxy group, 1,2,3-trifluoropropoxy group, 1,3,3-trifluoropropoxy group, 2,2,3-trifluoropropoxy group, 2,3,3-trifluoropropoxy group, 3,3,3-trifluoropropoxy group, 1,1,2,2-tetrafluoropropoxy group, 1,1,2,3-tetrafluoropropoxy group, 1,1,3,3-tetrafluoropropoxy group, 1,2,2,3-tetrafluoropropoxy group, 1,2,3,3-tetrafluoropropoxy group, 2,2,3,3-tetrafluoropropoxy group, 2,3,3,3-tetrafluoropropoxy group, 1,1,2,2,3-pentafluoropropoxy group, 1,2,2,3,3-pentafluoropropoxy group, 1,1,3,3,3-pentafluoropropoxy group, 1,2,3,3,3-pentafluoropropoxy group, 2,2,3,3,3-pentafluoropropoxy group, 1,1,2,2,3,3-hexafluoropropoxy group, 1,1,2,3,3,3-hexafluoropropoxy group, 1,2,2,3,3,3-hexafluoropropoxy group, heptafluoropropoxy group, 1-methylethoxy group (i-propoxy group), 1-fluoro-1-methylethoxy group, 2-fluoro-1-methylethoxy group, 1,2-difluoro-1-methylethoxy group, 1,2-difluoro-1-(fluoromethyl)ethoxy group, 1,2,2-trifluoro-1-methylethoxy group, 2,2,2-trifluoro-1-methylethoxy group, 2,2-difluoro-1-(fluoromethyl)ethoxy group, 1,2,2,2-tetrafluoro-1-methylethoxy group, 1,2,2-trifluoro-1-(fluoromethyl)ethoxy group, 2,2,2-trifluoro-1-(fluoromethyl)ethoxy group, 2,2-difluoro-1-(difluoromethyl)ethoxy group, 1,2,2,2-tetrafluoro-1-(fluoromethyl)ethoxy group, 1,2,2-trifluoro-1-(difluoromethyl)ethoxy group, 2,2,2-trifluoro-1-(difluoromethyl)ethoxy group, 1,2,2,2-tetrafluoro-1-(difluoromethyl)ethoxy group, 2,2,2-trifluoro-1-(trifluoromethyl)ethoxy, and 1,2,2,2-tetrafluoro-1-(trifluoromethyl)ethoxy group.

The unsubstituted phenoxy group and the fluorine-substituted phenoxy group are preferred specific examples of the aryloxy group, and specific examples here are the phenoxy group, 2-fluorophenoxy group, 3-fluorophenoxy group, 4-fluorophenoxy group, 2,3-difluorophenoxy group, 2,4-difluorophenoxy group, 2,5-difluorophenoxy group, 2,6-difluorophenoxy group, 3,4-difluorophenoxy group, 3,5-difluorophenoxy group, 2,3,4-trifluorophenoxy group, 2,3,5-trifluorophenoxy group, 2,3,6-trifluorophenoxy group, 2,4,5-trifluorophenoxy group, 2,4,6-trifluorophenoxy group, 3,4,5-trifluorophenoxy group, 2,3,4,5-tetrafluorophenoxy group, 2,3,4,6-tetrafluorophenoxy group, 2,3,5,6-tetrafluorophenoxy group, and pentafluorophenoxy group.

Considering the ease of production, the methoxy group, trifluoromethoxy group, ethoxy group, 2,2,2-trifluoroethoxy group, propoxy group, 1-methylethoxy group (i-propoxy group), and phenoxy group are more preferred among the foregoing, while the methoxy group, ethoxy group, and phenoxy group are particularly preferred.

Compound represented by formula (6) can be specifically exemplified by the following.

[Chem. 18]

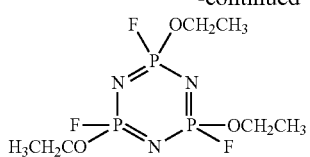
(cyclotriphosphazenes having the ethoxy group)

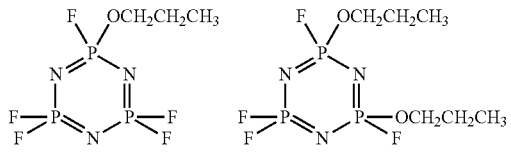

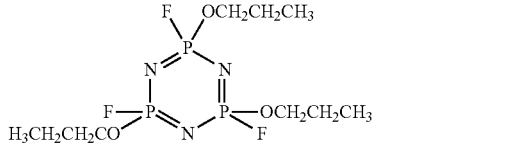
(cyclotriphosphazenes having the propoxy group)

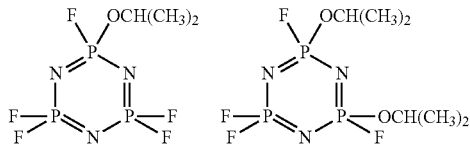
(cyclotriphosphazenes having the 1-methylethyl group)

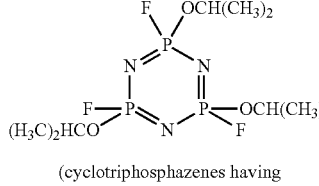
(cyclotriphosphazenes having the phenoxy group)

[Chem. 19]

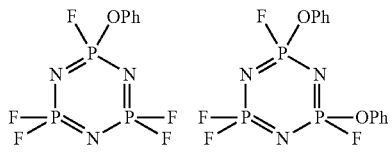
(cyclotriphosphazenes having the trifluoromethoxy group)

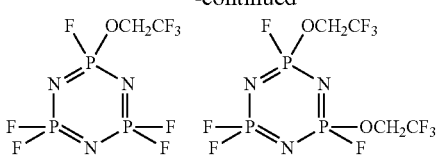
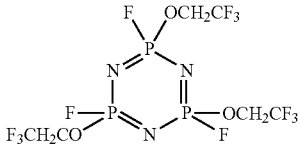
(cyclotriphosphazenes having the trifluoromethoxy group)

Among the foregoing, the following are preferred from the standpoint, for example, of the boiling point.

[Chem. 20]

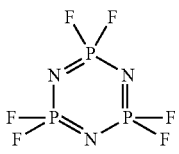
(cyclotriphosphazene wholly substituted by the fluorine atom)

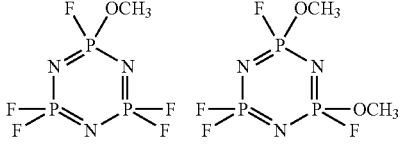
(cyclotriphosphazenes having the methoxy group)

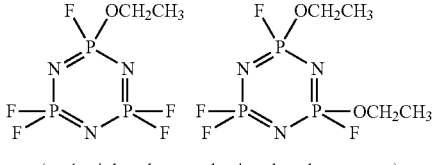
(cyclotriphosphazenes having the ethoxy group)

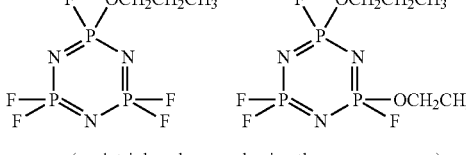
(cyclotriphosphazenes having the propoxy group)

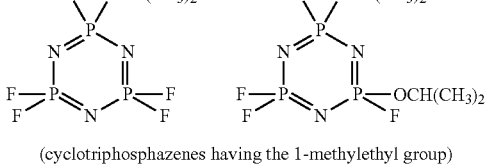
(cyclotriphosphazenes having the 1-methylethyl group)

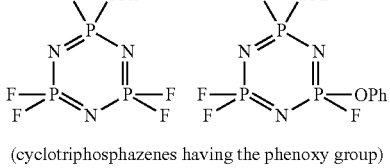
(cyclotriphosphazenes having the phenoxy group)

Moreover, the following are preferred because they provide a low level of secondary reactions in the battery and thus act to prevent an inhibition of battery reactions.

[Chem. 21]

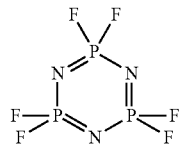

(cyclotriphosphazene wholly substituted by the fluorine atom)

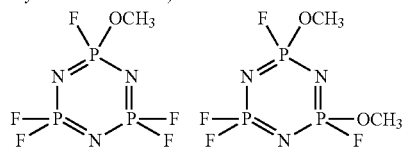

(cyclotriphosphazenes having the methoxy group)

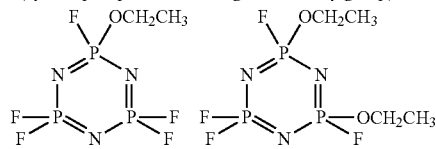

(cyclotriphosphazenes having the ethoxy group)

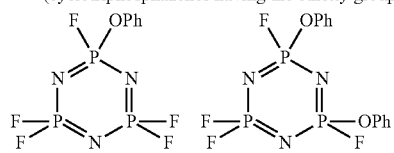

(cyclotriphosphazenes having the phenoxy group)

One of the compound represented by formula (6) may be used alone, or any desired combination of two or more thereof in any desired proportion may be used. There are no limitations on the amount of incorporation of the compound represented by formula (6) in the overall non-aqueous electrolyte solution of the present invention, and this amount may be freely selected as long as the effects of the present invention are not substantially impaired. However, for the case of use as a non-aqueous solvent, the incorporating amount is ordinarily 0.01 wt % or more, preferably 3 wt % or more, more preferably 5 wt % or more, more preferably 10 wt % or more, and most preferably 12 wt % or more and preferably 50 wt % or less, more preferably 40 wt % or less, even more preferably 30 wt % or less, and most preferably 20 wt % or less, with respect to 100 wt of the non-aqueous electrolyte solution.

Within this range, the non-aqueous electrolyte secondary battery can be provided with flame retardancy and can satisfactorily manifest the effects of the present invention, e.g., improved cycle characteristics, and this can be done while not causing an inhibition of Li salt dissolution and avoiding a decline in the load characteristics of the battery.

Due to its action at the positive electrode during the charge/discharge reactions of the battery, the compound represented by formula (6) also manifests an effective functionality not only as a non-aqueous solvent, but also as an auxiliary agent. The amount of incorporation when the compound represented by formula (6) is used as an auxiliary agent, the incorporating amount is preferably 0.01 wt % or more, more preferably 0.1 wt % or more, even more preferably 0.5 wt % or more, and most preferably 1.0 wt % or more and preferably 5 wt % or less, more preferably 4 wt % or less, and even more preferably 3 wt % or less. Within this range, the non-aqueous electrolyte secondary battery readily manifests a satisfactory improvement in the cycle characteristics and the phenomena of a reduction in the high-temperature storage characteristics, the generation of large amounts of gas, and a reduction in the discharge capacity retention rate are readily avoided. When, on the other hand, too little is used, the satisfactory manifestation of the effects of the present invention may be impaired.

1-5. Compound Represented by Formula (7)

The third present invention is characterized by the incorporation in the non-aqueous electrolyte solution of the previously described compound having at least two isocyanate groups per molecule and a compound with the following formula (7).

[Chem. 22]

$$M^1{}_a[M^2(C_2O_4)_b R_c]_d \tag{7}$$

In formula (7), $M^1$ is an element selected from aluminum (Al) and Groups 1 and 2 of the Periodic Table, $M^2$ is an element selected from the transition metals and Groups 13, 14, and 15 of the Periodic Table, R is a group selected from the halogens, alkyl groups having 1 to 11 carbons, and halogen-substituted alkyl groups having 1 to 11 carbons, a and b are positive integers, c is 0 or a positive integer, and d is an integer from 1 to 3.

The compound represented by formula (7) is a salt in which the anion is an oxalate complex. In terms of the battery properties when used in a lithium secondary battery, $M^1$ in the formula is preferably lithium, sodium, potassium, magnesium, or calcium with lithium being particularly preferred. In addition, considering the electrochemical stability when used in a lithium secondary battery, $M^2$ is particularly preferably boron or phosphorus. R can be specifically exemplified by fluorine and chlorine and the methyl group, trifluoromethyl group, ethyl group, pentafluoroethyl group, propyl group, isopropyl group, butyl group, sec-butyl group, t-butyl group, and so forth. Among the foregoing, fluorine and the trifluoromethyl group are particularly preferred.

The content of the compound represented by formula (7) in the non-aqueous electrolyte solution is in the range from 0.01 mass % or more, preferably 0.05 mass % or more, and more preferably 0.1 masse or more to ordinarily 1.5 mass % or less, preferably 1.3 mass % or less, more preferably 1 mass or less, and particularly preferably 0.5 mass % or less. When this concentration is too low, the chemical and physical stability of the film may be unsatisfactory; when this concentration is too high, the film has a high insulating character and the discharge capacity may be reduced by the increase in the resistance. When the content of the compound represented by formula (7) is in the indicated range, a synergistic effect is readily obtained with the compound having at least two isocyanate groups per molecule, which makes it possible to achieve an even greater inhibition of the reductive degradation reactions of the non-aqueous solvent that occur during charging, to improve the battery life, e.g., the high-temperature storage characteristics and the cycle characteristics, to raise the charge/discharge efficiency of the battery, and to improve the low-temperature characteristics.

There are no particular limitations on the method for incorporating the compound represented by formula (7) in the electrolyte solution, but this method may be exemplified by methods in which the compound represented by formula (7) synthesized by a known method is directly added to the electrolyte solution and by methods in which the compound represented by formula (7) is generated within the battery or in the electrolyte solution. The method for generating the compound represented by formula (7) can be exemplified by methods in which a compound other than the compound represented by formula (7) is added and generation is then carried out by, for example, the oxidation or hydrolysis of a constituent element of the battery, for example, the electrolyte solution. Another example is a method in which the battery is fabricated and generation is induced by the application of an electrical load, for example, charge/discharge.

The content of the compound represented by formula (7) in the non-aqueous electrolyte solution or the non-aqueous electrolyte battery can be quantitated by, for example, ion chromatography or F nuclear magnetic resonance spectroscopy.

The weight ratio between the compound having at least 2 isocyanate groups per molecule and the compound represented by formula (7) is ordinarily in the range from 1:500 to 300:1, preferably 1:80 to 40:1, and more preferably 1:30 to 1.5:1.

1-6. The Monofluorophosphate Salt and Difluorophosphate Salt

The fourth present invention is characterized by the incorporation in the non-aqueous electrolyte solution of the previously described compound having at least two isocyanate groups per molecule and a monofluorophosphate salt or difluorophosphate salt as described in the following.

There are no particular limitations on the countercation in the monofluorophosphate salt and difluorophosphate salt, and it can be exemplified by lithium, sodium, potassium, magnesium, calcium, and ammonium as represented by $NR^{11}R^{12}R^{13}R^{14}$ ($R^{11}$ to $R^{14}$ in the formula each independently represent the hydrogen atom or an organic group having 1 to 12 carbons).

The organic group having 1 to 12 carbons represented by the $R^{11}$ to $R^{14}$ in the aforementioned ammonium is not particularly limited and can be exemplified by possibly halogen-substituted alkyl groups, possibly halogen- or alkyl-substituted cycloalkyl groups, possibly halogen- or alkyl-substituted aryl groups, and possibly substituted nitrogenous heterocyclic groups. Among these, $R^{11}$ to $R^{14}$ are each independently preferably the hydrogen atom, an alkyl group, a cycloalkyl group, a nitrogenous heterocyclic group, and so forth.

The monofluorophosphate salts and difluorophosphate salts can be specifically exemplified by lithium monofluorophosphate, sodium monofluorophosphate, potassium monofluorophosphate, lithium difluorophosphate, sodium difluorophosphate, and potassium difluorophosphate, wherein lithium monofluorophosphate and lithium difluorophosphate are preferred and lithium difluorophosphate is more preferred.

One of the monofluorophosphate and the difluorophosphate may be used alone, or any desired combination of two or more thereof in any desired proportion may be used. The amount of incorporation The amount of incorporation of the monofluorophosphate and the difluorophosphate is not particularly limited, and may be any amount of incorporation, so long as the effect of the present invention is not significantly impaired. The amount of incorporation of the monofluorophosphate salt and difluorophosphate salt, in 100 mass % of the non-aqueous electrolyte solution, is preferably 0.001 mass % or more, more preferably 0.01 mass % or more, and even more preferably 0.1 masse or more and preferably 5 mass % or less, more preferably 4 mass % or less, and even more preferably 3 mass % or less. Within these ranges, a sufficient enhancing effect on cycle characteristic is readily brought about in the non-aqueous electrolyte battery, and drops in high-temperature storage characteristic resulting in excessive gas generation amount followed by drops in discharge capacity retention rate, are readily avoided.

There are no particular limitations on the method for incorporating the monofluorophosphate salt or difluorophosphate salt in the electrolyte solution, but this method may be exemplified by methods in which the monofluorophosphate salt or difluorophosphate salt synthesized by a known method is directly added to the electrolyte solution and by methods in which the monofluorophosphate salt or difluorophosphate salt is generated within the battery or in the electrolyte solution. The method for generating the monofluorophosphate salt or difluorophosphate salt can be exemplified by methods in which a compound other than the monofluorophosphate salt or difluorophosphate salt is added and generation is then carried out by, for example, the oxidation or hydrolysis of a constituent element of the battery, for example, the electrolyte solution. Another example is a method in which the battery is fabricated and generation is induced by the application of an electrical load, for example, charge/discharge.

The content of the monofluorophosphate salt or difluorophosphate salt in the non-aqueous electrolyte solution or the non-aqueous electrolyte battery can be quantitated by, for example, ion chromatography or F nuclear magnetic resonance spectroscopy.

The weight ratio between the compound having at least two isocyanate groups per molecule and the monofluorophosphate salt or difluorophosphate salt is ordinarily in the range from 1:500 to 300:1, preferably 1:80 to 40:1, and more preferably 1:30 to 1.5:1.

1-7. The Fluorine Atom-Containing Cyclic Carbonates and the Cyclic Carbonates Having a Carbon-Carbon Unsaturated Bond The non-aqueous electrolyte solutions according to the first through fourth present inventions preferably also additionally contain at least one compound selected from the group consisting of fluorine atom-containing cyclic carbonates and cyclic carbonates having a carbon-carbon unsaturated bond. The co-use of these compounds enables a very efficient inhibition of the secondary reactions caused by the individual additives.

1-7-1. Fluorine Atom-Containing Cyclic Carbonates

Fluorine atom-containing cyclic carbonates (hereafter may be referred to as "fluorinated cyclic carbonate") is not particularly limited, so long as it is a cyclic carbonate having a fluorine atom.

The fluorinated cyclic carbonate can be exemplified by the fluorinated products of cyclic carbonates having an alkylene group having 2 to 6 carbons and derivatives of these fluorinated products and by fluorinated ethylene carbonates substituted by a substituent having an aromatic ring or a carbon-carbon double bond and derivatives of these fluorinated ethylene carbonates, for example, products provided by the fluorination of ethylene carbonate and derivatives thereof and fluorinated vinylene carbonates and derivatives thereof. The derivatives of products provided by the fluorination of ethylene carbonate can be exemplified by the fluorination products of ethylene carbonates substituted by an alkyl group (for example, an alkyl group having 1 to 4 carbons). Preferred among the foregoing are ethylene carbonates having from 1 to 8 fluorine atoms and derivatives therefrom. The derivatives of fluorinated vinylene carbonates can be exemplified by fluorinated vinylene carbonates substituted by an alkyl group (for example, an alkyl group having 1 to 4 carbons). Preferred among the foregoing are vinylene carbonates having from 1 to 8 fluorine atoms and derivatives therefrom.

Specific examples are as follows: monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)ethylene carbonate, 4-(difluoromethyl)ethylene carbonate, 4-(trifluoromethyl)ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, 4,4-difluoro-5,5-dimethylethylene carbonate, 4-fluorovinylene carbonate, 4-fluoro-5-methylvinylene carbonate, 4-fluoro-5-phenylvinlene carbonate, 4-allyl-5-fluorovinylene carbonate, 4-fluoro-5-vinylvinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-4-vinylethylene carbonate, 4,4-difluoro-4-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, and 4,5-difluoro-4-phenylethylene carbonate.

Preferred among the foregoing are saturated cyclic carbonates on account of the stability of the compound, and more preferably, at least one compound selected from the group consisting of monofluoroethylene carbonate, 4,4-difluoroethylene carbonate, and 4,5-difluoroethylene carbonate, in terms of imparting high ionic conductivity and forming an appropriate interface protective coating.

One of the fluorinated cyclic carbonate may be used alone, or any desired combination of two or more thereof in any desired proportion may be used.

The content of the fluorinated cyclic carbonate is preferably 0.1 wt or more, more preferably 0.5 wt % or more, and even more preferably 1 wt % or more, and preferably 10 wt % or less, more preferably 5 wt % or less, and even more preferably 3 wt % or less, with respect to the non-aqueous electrolyte solution. Further, in a case where the fluorinated cyclic carbonate is used as non-aqueous solvents, the amount of incorporation thereof is preferably 1 vol % or more, more preferably 5 vol % or more and even more preferably 10 vol % or more, and preferably 50 vol % or less, more preferably 35 vol % or less and even more preferably 25 vole or less, with respect to 100 vol % of non-aqueous solvent.

Within the abovementioned ranges, a sufficient enhancing effect on cycle characteristic is readily brought about in the non-aqueous electrolyte secondary battery, and drops in high-temperature storage characteristic resulting in excessive gas generation amount followed by drops in discharge capacity retention rate, are readily avoided.

The compound having at least two isocyanate groups per molecule and the fluorine atom-containing cyclic carbonate in the non-aqueous electrolyte solution of the present inventions form a composite film on the negative electrode. In terms of achieving the excellent formation of this film, the blending mass ratio between the compound having at least two isocyanate groups per molecule and the fluorine atom-containing cyclic carbonate is preferably 0.4:100 to 100:100, more preferably 1:100 to 50:100, and even more preferably 1.4:100 to 35:100. Blending in this range can efficiently inhibit secondary reactions by these additives at the positive and negative electrodes and improves the battery characteristics.

1-7-2. Cyclic Carbonates Having a Carbon-Carbon Unsaturated Bond

Cyclic carbonates having a carbon-carbon unsaturated bond (also referred to in the following as "unsaturated cyclic carbonates") are cyclic carbonates that have a carbon-carbon double bond or a carbon-carbon triple bond, but are not otherwise particularly limited, and any unsaturated carbonate can be used. Cyclic carbonates having an aromatic ring are included herein among unsaturated cyclic carbonates.

Examples of unsaturated cyclic carbonates include, for instance, vinylene carbonates, ethylene carbonates substituted with an aromatic ring or a substituent having a carbon-carbon double bond or a carbon-carbon triple bond, phenyl carbonates, vinyl carbonates, allyl carbonates, catechol carbonates or the like.

The vinylene carbonates can be exemplified by vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate, 4-fluorovinylene carbonate, 4-fluoro-5-methylvinylene carbonate, 4-fluoro-5-phenylvinylene carbonate, 4-fluoro-5-vinylvinylene carbonate, and 4-allyl-5-fluorovinylene carbonate.

Ethylene carbonates that are substituted by an aromatic ring or by a substituent having a carbon-carbon double bond or a carbon-carbon triple bond can be specifically exemplified by vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, 4-methyl-5-allylethylene carbonate or the like.

Among the foregoing, unsaturated cyclic carbonates particularly preferred for co-use with the compound having at least two isocyanate groups per molecule can be exemplified by vinylene carbonate, methylvinylene carbonate, 4,5-dimethylvinylene carbonate, vinylvinylene carbonate, 4,5-divinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate, 4-allyl-5-vinylethylene carbonate, ethynylethylene carbonate, 4,5-diethynylethylene carbonate, 4-methyl-5-ethynylethylene carbonate, and 4-vinyl-5-ethynylethylene carbonate. In addition, vinylene carbonate, vinylethylene carbonate, and ethynylethylene carbonate are particularly preferred because an even more stable interface protective film is then formed.

The molecular weight of the unsaturated cyclic carbonate is not particularly limited, and may be any molecular weight, so long as the effect of the present invention is not significantly impaired. The molecular weight is preferably 80 or more and 250 or less. Within those ranges, the solubility of the unsaturated cyclic carbonate towards the non-aqueous electrolyte solution can be readily secured, and the effect of the present invention is readily brought about. The molecular weight of the unsaturated cyclic carbonate is more preferably 85 or more and more preferably 150 or less.

The method for producing the unsaturated cyclic carbonate is not particularly limited, and the unsaturated cyclic carbonate may be produced in accordance with an arbitrarily selected known method.

One of the unsaturated cyclic carbonate may be used alone, or any desired combination of two or more thereof in any desired proportion may be used. The amount of incorporation of the unsaturated cyclic carbonate is not particularly limited, and may be any incorporating amount, so long as the effect of the present invention is not significantly impaired. The amount of incorporation of the unsaturated cyclic carbonate is preferably 0.001 wt % or more, more preferably 0.01 wt % or more, and even more preferably 0.1 wt % or more, and preferably 5 wt % or less, more preferably 4 wt % or less, and eveneven more preferably 3 wt % or less, with respect to 100 wt % of the non-aqueous electrolyte solution. Within these ranges, a sufficient enhancing effect on cycle characteristic is readily brought about in the non-aqueous electrolyte battery, and drops in high-temperature storage characteristic resulting in excessive gas generation amount followed by drops in discharge capacity retention rate, are readily avoided.

1-8. Electrolyte

<Lithium Salt>

A lithium salt is generally used as the electrolyte. There are no particular limitations on the lithium salt as long as its use in this purpose is known and any such lithium salt can be used. Specific examples are provided in the following.

For instance, inorganic lithium salts such as LiPF6, LiBF4, LiClO4, LiAlF4, LiSbF6, LiTaF6, LiWF7 or the like; lithium tungstates such as LiWOF5; lithium carboxylate salts such as HCO2Li, CH3CO2Li, CH2FCO2Li, CHF2CO2Li, CF3CO2Li, CF3CH2CO2Li, CF3CF2CO2Li, CF3CF2CF2CO2Li, CF3CF2CF2CF2CO2Li or the like; lithium sulfonate salts such as FSO3Li, CH3SO3Li, CH2FSO3Li, CHF2SO3Li, CF3SO3Li, CF3CF2SO3Li, CF3CF2CF2SO3Li, CF3CF2CF2CF2SO3Li or the like; lithium imide salts such as LiN(FCO)2, LiN(FCO) (FSO2), LiN(FSO2)2, LiN(FSO2) (CF3SO2), LiN(CF3SO2)2, LiN(C2F$_5$SO2)2, lithium cyclic 1,2-perfluoroethanedisulfonylimide, lithium cyclic 1,3-perfluoropropanedisulfonylimide, LiN(CF3SO2) (C4F9SO2) or the like; lithium methide salts such as LiC(FSO2)3, LiC(CF3SO2)3, LiC(C2F5SO2)3 or the like; lithium oxalatoborate salts such as lithium difluorooxalatoborate, lithium bis(oxalato)borate, or the like; lithium oxalate phosphate salts such as lithium tetrafluorooxalatophosphate, lithium difluorobis(oxalate)phosphate, lithium tris(oxalate)phosphate, or the like; and fluorine-containing organic lithium salts such as LiPF4(CF3)2, LiPF4(C2F$_5$)2, LiPF4(CF3SO2)2, LiPF4(C2F$_5$SO2)2, LiBF3CF3, LiBF3C2F5, LiBF3C3F7, LiBF2(CF3)2, LiBF2(C2F5)2, LiBF2(CF3SO2)2, LiBF2(C2F5SO2)2 or the like.

Particularly preferred among the foregoing are LiPF6, LiBF4, LiSbF6, LiTaF6, FSO3Li, CF3SO3Li, LiN(FSO2)2, LiN(FSO2) (CF3SO2), LiN(CF3SO2)2, LiN(C2F5SO2)2, lithium cyclic 1,2-perfluoroethanedisulfonylimide, lithium cyclic 1,3-perfluoropropanedisulfonylimide, LiC(FSO2)3, LiC(CF3SO2)3, LiC(C2F5SO2)3, lithium bisoxalatoborate, lithium difluorooxalatoborate, lithium tetrafluorooxalatophosphate, lithium difluorobisoxalatophosphate, LiBF3CF3, LiBF3C2F5, LiPF3(CF3)3, LiPF3(C2F5)3 and the like, in terms of the effect of enhancing the output characteristic, high-rate charge-discharge characteristic, high-temperature storage characteristic, cycle characteristic and the like.

The above lithium salts may be used singly or concomitantly in combinations of two or more types. A preferred example of the use of two or more of these lithium salts in combination is the use of $LiPF_E$ with $LiBF_4$ or $LiPF_6$ with $FSO_3Li$; this has the effect of improving the load characteristics and cycle characteristics.

In this case, there are no limitations on the concentration of the $LiBF_4$ or $FSO_3Li$ with respect to 100 mass % of the total non-aqueous electrolyte solution, and this concentration may be freely selected as long as the effects of the present invention are not substantially impaired. However, expressed with respect to the non-aqueous electrolyte solution of the present invention, this concentration is ordinarily 0.01 mass' or more and preferably 0.1 mass % or more and is ordinarily 30 mass % or less and preferably 20 masse or less.

Another example is the use of an inorganic lithium salt in combination with an organolithium salt; the use of this combination has the effect of inhibiting the deterioration induced by storage at high temperatures. Preferred organic lithium salts are CF3SO3Li, LiN(FSO2)2, LiN(FSO2) (CF3SO2), LiN(CF3SO2)2, LiN(C2F5SO2)2, lithium cyclic 1,2-perfluoroethanedisulfonylimide, lithium cyclic 1,3-perfluoropropanedisulfonylimide, LiC(FSO2)3, LiC(CF3SO2)3, LiC(C2F5SO2))3, lithium bisoxalatoborate, lithium difluorooxalatoborate, lithium tetrafluorooxalatophosphate, lithium difluorobisoxalatophosphate, LiBF3CF3, LiBF3C2F5, LiPF3(CF3)3, LiPF3(C2F5)3 and the like. In this case, the concentration of the organolithium salt, with respect to 100 mass % of the non-aqueous electrolyte solution as a whole, is preferably 0.1 mass % or more and particularly preferably 0.5 mass % or more and preferably 30 mass % or less and particularly preferably 20 mass %, or less.

The concentration of these lithium salts in the non-aqueous electrolyte solution is not particularly limited as long as the effects of the present invention are not impaired, but in terms of bringing the electrical conductivity of the electrolyte solution into a favorable range and ensuring a favorable battery performance, the total molar concentration of the lithium in the non-aqueous electrolyte solution is preferably 0.3 mol/L or more, more preferably 0.4 mol/L or more, and even more preferably 0.5 mol/L or more and preferably 3 mol/L or less, more preferably 2.5 mol/L or less, and even more preferably 2.0 mol/L or less. If the total molar concentration of lithium is excessively low, the electrical conductivity of the electrolyte solution may be insufficient in some instances. If the concentration is excessively high, on the other hand, viscosity becomes higher, and hence electric conductance may decrease, and battery performance may decrease.

1-9. The Non-Aqueous Solvent

There are no particular limitations on the non-aqueous solvent in the present invention and known organic solvents can be used. Examples of known organic solvent include fluorine atom-free cyclic carbonates atom, linear carbonates, cyclic and linear carboxylic ester, ether compounds, sulfone compounds and the like.

<Fluorine Atom-Free Cyclic Carbonate>

The fluorine atom-free cyclic carbonate can be exemplified by cyclic carbonates having an alkylene group having 2 to 4 carbons.

Specific examples of fluorine-free cyclic carbonates having an alkylene group having 2 to 4 carbons are ethylene carbonate, propylene carbonate, and butylene carbonate. Particularly preferred among the foregoing are ethylene carbonate and propylene carbonate, in terms of enhancing battery characteristics as a result of an enhanced degree of dissociation of lithium ions.

One of the fluorine atom-free cyclic carbonate may be used alone, or any desired combination of two or more thereof in any desired proportion may be used.

The amount of incorporation of the fluorine atom-free cyclic carbonate is not particularly limited, as long as the effect of the present invention is not significantly impaired. In a case where one type of cyclic carbonate is used singly, the amount of incorporation is ordinarily 5 vole or more, and more preferably 10 vol % or more, with respect to 100 vol % of non-aqueous solvent. Through setting of this range, drops in electrical conductivity derived from decreased permittivity of the non-aqueous electrolyte solution are readily avoided, and the large-current discharge characteristic, stability towards the negative electrode and cycle characteristic of the non-aqueous electrolyte battery are readily brought to within good ranges. Furthermore, the amount of incorporation is ordinarily 95 vol % or less, preferably 90 vol % or less, and more preferably 85 vol % or less. By setting these ranges, the viscosity of the non-aqueous electrolyte solution is brought to within an appropriate range and drops in ion conductance are suppressed; accordingly, the load characteristic of the non-aqueous electrolyte battery is readily brought to within a good range.

<Linear Carbonate>

The chain carbonate is preferably a chain carbonate having 3 to 7 carbons and is more preferably a dialkyl carbonate having 3 to 7 carbons.

Specific examples of the linear carbonates include, for instance, dimethyl carbonate, diethyl carbonate, di-n-propyl carbonate, diisopropyl carbonate, n-propylisopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butylethyl carbonate, isobutylethyl carbonate, t-butylethyl carbonate and the like.

Preferred among the foregoing are dimethyl carbonate, diethyl carbonate, di-n-propyl carbonate, diisopropyl carbonate, n-propylisopropyl carbonate, ethyl methyl carbonate and methyl-n-propyl carbonate, and particularly preferably, dimethyl carbonate, diethyl carbonate and ethyl methyl carbonate.

Linear carbonates having a fluorine atom (hereafter may be referred to as "fluorinated linear carbonate") may also be used appropriately.

The number of fluorine atoms in the fluorinated linear carbonate is not particularly limited, so long as it is one or more, and is ordinarily 6 or less, preferably 4 or less. If the fluorinated linear carbonate has a plurality of fluorine atoms, the latter may be mutually bonded to a same carbon, or may be bonded to different carbons.

Examples of fluorinated linear carbonates include, for instance, fluorinated dimethyl carbonate and derivatives thereof, fluorinated ethyl methyl carbonate and derivatives thereof, fluorinated diethyl carbonate and derivatives thereof and the like.

Examples of fluorinated dimethyl carbonate and derivatives thereof include, for instance, fluoromethyl methyl carbonate, difluoromethyl methyl carbonate, trifluoromethyl methyl carbonate, bis(fluoromethyl) carbonate, bis(difluoro)methyl carbonate, bis(trifluoromethyl) carbonate and the like.

Examples of fluorinated ethyl methyl carbonate and derivatives thereof include, for instance, 2-fluoroethyl methyl carbonate, ethylfluoromethyl carbonate, 2,2-difluoroethyl methyl carbonate, 2-fluoroethylfluoromethyl carbonate, ethyldifluoromethyl carbonate, 2,2,2-trifluoroethyl methyl carbonate, 2,2-difluoroethylfluoromethyl carbonate, 2-fluoroethyldifluoromethyl carbonate, ethyltrifluoromethyl carbonate and the like.

Examples of fluorinated diethyl carbonate and derivatives thereof include, for instance, ethyl-(2-fluoroethyl) carbonate, ethyl-(2,2-difluoroethyl) carbonate, bis(2-fluoroethyl) carbonate, ethyl-(2,2,2-trifluoroethyl)carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethyl carbonate, bis(2,2,2-trifluoroethyl)carbonate and the like.

One of the linear carbonate may be used alone, or any desired combination of two or more thereof in any desired proportion may be used.

The amount of incorporation of the linear carbonate is preferably 5 vol % or more, more preferably 10 vol % or more, and even more preferably 15 volt or more with respect to 100 vol % of non-aqueous solvent. Setting such a lower limit has the effect of bringing the viscosity of the non-aqueous electrolyte solution to within an appropriate range, and of suppressing drops in ion conductance; accordingly, the large-current discharge characteristic of the non-aqueous electrolyte battery can be readily brought to within a good range. The amount of incorporation of the linear carbonate is preferably 90 vol % or less, more preferably 85 vol % or less, with respect to 100 vol % of non-aqueous solvent. By setting such an upper limit, drops in electrical conductivity derived from decreased permittivity of the non-aqueous electrolyte solution are avoided, and the large-current discharge characteristic of the non-aqueous electrolyte battery can be readily brought to within a good range.

<Cyclic Carboxylic Acid Ester>

The cyclic carboxylic acid ester is preferably a cyclic carbonate having 3 to 12 carbons.

Specific examples include, for instance, gamma-butyrolactone, gamma-valerolactone, gamma-caprolactone, epsilon-caprolactone and the like. Particularly preferred among the foregoing is gamma-butyrolactone, in terms of enhancing battery characteristics as a result of an enhanced degree of dissociation of lithium ions.

One of the cyclic carboxylic acid ester may be used alone, or any desired combination of two or more thereof in any desired proportion may be used.

Ordinarily, the amount of incorporation of the cyclic carboxylic acid ester is preferably 5 vole or more, and more preferably 10 vol % or more with respect to 100 vol of non-aqueous solvent. Within these ranges, the electrical conductivity of the non-aqueous electrolyte solution is improved, and the large-current discharge characteristic of the non-aqueous electrolyte battery is readily enhanced. The amount of incorporation of the cyclic carboxylic acid ester is preferably 50 vol % or less, and more preferably 40 vol % or less. By setting such an upper limit, the viscosity of the non-aqueous electrolyte solution is brought to within an appropriate range, drops in electrical conductivity are avoided, increases in negative electrode resistance are suppressed, and the large-current discharge characteristic of the non-aqueous electrolyte secondary battery is readily brought to within a good range.

<Linear Carboxylic Acid Ester>

The linear carbonate is preferably a linear carbonate having 3 to 7 carbons. Specific examples include, for instance, methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, isopropyl isobutyrate and the like.

Preferred among the foregoing are methyl acetate, ethyl acetate, n-propyl acetate, n-butyl acetate, methyl propionate, ethyl propionate, n-propyl propionate, isopropyl propionate, methyl butyrate, ethyl butyrate and the like, in terms of enhancing ion conductance through lowered viscosity.

One of the linear carboxylic acid ester may be used alone, or any desired combination of two or more thereof in any desired proportion may be used.

Ordinarily, the amount of incorporation of the linear carboxylic acid ester is preferably 10 vol % or more, more preferably 15 vol % or more with respect to 100 vol % of non-aqueous solvent. By setting such a lower limit, the electrical conductivity of the non-aqueous electrolyte solution is improved, and the large-current discharge characteristic of the non-aqueous electrolyte battery is readily enhanced. The amount of incorporation of the linear carboxylic acid ester is preferably 60 vol % or less, more preferably 50 vol % or less, with respect to 100 vol % of non-aqueous solvent. By setting such an upper limit, increases in negative electrode resistance are suppressed, and the large-current discharge characteristic, as well as the cycle characteristic of the non-aqueous electrolyte battery, are readily brought to within good ranges.

<Ether Compound>

The ether compound is preferably a linear ether having 3 to 10 carbons or a cyclic ether having 3 to 6 carbons in which some of hydrogen atoms are optionally substituted with fluorine.

The chain ethers having 3 to 10 carbons can be exemplified by diethyl ether, di(2-fluoroethyl) ether, di(2,2-difluoroethyl) ether, di(2,2,2-trifluoroethyl) ether, ethyl (2-fluoroethyl) ether, ethyl (2,2,2-trifluoroethyl) ether, ethyl (1,1,2,2-tetrafluoroethyl) ether, (2-fluoroethyl) (2,2,2-trifluoroethyl) ether, (2-fluoroethyl) (1,1,2,2-tetrafluoroethyl) ether, (2,2,2-trifluoroethyl) (1,1,2,2-tetrafluoroethyl) ether, ethyl n-propyl ether, ethyl (3-fluoro-n-propyl) ether, ethyl (3,3,3-trifluoro-n-propyl) ether, ethyl (2,2,3,3-tetrafluoro-n-propyl) ether, ethyl (2,2,3,3,3-pentafluoro-n-propyl) ether, 2-fluoroethyl n-propyl ether, (2-fluoroethyl) (3-fluoro-n-propyl) ether, (2-fluoroethyl) (3,3,3-trifluoro-n-propyl) ether, (2-fluoroethyl) (2,2,3,3-tetrafluoro-n-propyl) ether, (2-fluoroethyl) (2,2,3,3,3-pentafluoro-n-propyl) ether, 2,2,2-trifluoroethyl n-propyl ether, (2,2,2-trifluoroethyl) (3-fluoro-n-propyl) ether, (2,2,2-trifluoroethyl) (3,3,3-trifluoro-n-propyl) ether, (2,2,2-trifluoroethyl) (2,2,3,3-tetrafluoro-n-propyl) ether, (2,2,2-trifluoroethyl) (2,2,3,3,3-pentafluoro-n-propyl) ether, 1,1,2,2-tetrafluoroethyl n-propyl ether, (1,1,2,2-tetrafluoroethyl) (3-fluoro-n-propyl) ether, (1,1,2,2-tetrafluoroethyl) (3,3,3-trifluoro-n-propyl) ether, (1,1,2,2-tetrafluoroethyl) (2,2,3,3-tetrafluoro-n-propyl) ether, (1,1,2,2-tetrafluoroethyl) (2,2,3,3,3-pentafluoro-n-propyl) ether, di-n-propyl ether, (n-propyl) (3-fluoro-n-propyl) ether, (n-propyl) (3,3,3-trifluoro-n-propyl) ether, (n-propyl) (2,2,3,3-tetrafluoro-n-propyl) ether, (n-propyl) (2,2,3,3,3-pentafluoro-n-propyl) ether, di(3-fluoro-n-propyl) ether, (3-fluoro-n-propyl) (3,3,3-trifluoro-n-propyl) ether, (3-fluoro-n-propyl) (2,2,3,3-tetrafluoro-n-propyl) ether, (3-fluoro-n-propyl) (2,2,3,3,3-pentafluoro-n-propyl) ether, di(3,3,3-trifluoro-n-propyl) ether, (3,3,3-trifluoro-n-propyl) (2,2,3,3-tetrafluoro-n-propyl) ether, (3,3,3-trifluoro-n-propyl) (2,2,3,3,3-pentafluoro-n-propyl) ether, di(2,2,3,3-tetrafluoro-n-propyl) ether, (2,2,3,3-tetrafluoro-n-propyl) (2,2,3,3,3-pentafluoro-n-propyl) ether, di(2,2,3,3,3-pentafluoro-n-propyl) ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy) (2,2,2-trifluoroethoxy)methane, (2-fluoroethoxy) (1,1,2,2-tetrafluoroethoxy)methane, di(2,2,2-trifluoroethoxy)methane, (2,2,2-trifluoroethoxy) (1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy) (2,2,2-trifluoroethoxy)ethane, (2-fluoroethoxy) (1,1,2,2-tetrafluoroethoxy)ethane, di(2,2,2-trifluoroethoxy)ethane, (2,2,2-trifluoroethoxy) (1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

Specific examples of cyclic ethers having 3 to 6 carbons include, for instance, tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane and the like, and fluorinated compounds of the foregoing.

Preferred among the foregoing are dimethoxymethane, diethoxymethane, ethoxymethoxymethane, ethylene glycol di-n-propyl ether, ethylene glycol di-n-butyl ether and diethylene glycol dimethyl ether, in terms of enhancing ion dissociation ability by virtue of their high solvating power on lithium ions. Particularly preferred among the foregoing are dimethoxymethane, diethoxymethane and ethoxymethoxymethane, on account of their low viscosity and the high ion conductance that they impart.

One of the ether compound may be used alone, or any desired combination of two or more thereof in any desired proportion may be used.

Ordinarily, the amount of incorporation of the ether compound is preferably 5 vol or more, more preferably 10 vol % or more and even more preferably 15 vol % or more, and preferably 70 vol % or less, more preferably 60 vol % or less and even more preferably 50 vol % or less, with respect to 100 vol % of non-aqueous solvent.

Within such ranges, there is readily secured the enhancing effect on ion conductance, derived from an enhanced degree of dissociation of lithium ions and a drop in viscosity, that is exerted by the linear ether. In the case where the negative electrode active material is a carbonaceous material, the linear ether is co-intercalated together with lithium ions. Drops in capacity are likelier to be avoided as a result.

<Sulfone Compound>

The sulfone compound is preferably a cyclic sulfone having 3 to 6 carbons or a linear sulfone having 2 to 6 carbons. The number of sulfonyl groups in one molecule is preferably 1 or 2.

The cyclic sulfone having 3 to 6 carbons can be exemplified by trimethylene sulfones, tetramethylene sulfones and hexamethylene sulfones, which are monosulfone compounds; and trimethylene disulfones, tetramethylene disulfones, hexamethylene disulfones and the like, which are disulfone compounds.

More preferred among the foregoing, in terms of permittivity and viscosity, are tetramethylene sulfones, tetramethylene disulfones, hexamethylene sulfones and hexamethylene disulfones, and particularly preferably tetramethylene sulfones (sulfolanes).

The sulfolanes are preferably sulfolane and/or a sulfolane derivative (hereafter may be referred to as "sulfolanes", including sulfolane). The sulfolane derivative is preferably a sulfolane derivative wherein one or more hydrogen atoms bonded to the carbon atoms that make up the sulfolane ring are substituted with a fluorine atom or an alkyl group.

Preferred among the foregoing are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, 5-fluoro-3-(trifluoromethyl)sulfolane and the like, in terms of high ion conductance and high input and output characteristics.

In addition, the chain sulfone having 2 to 6 carbons can be exemplified by dimethyl sulfone, ethylmethyl sulfone, diethyl sulfone, n-propylmethyl sulfone, n-propylethyl sulfone, di-n-propyl sulfone, isopropylmethyl sulfone, isopropylethyl sulfone, diisopropyl sulfone, n-butylmethyl sulfone, n-butylethyl sulfone, t-butylmethyl sulfone, t-butylethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, perfluoroethylmethyl sulfone, ethyltrifluoroethyl sulfone, ethylpentafluoroethyl sulfone, di(trifluoroethyl)sulfone, perfluorodiethyl sulfone, fluoromethyl-n-propyl sulfone, difluoromethyl-n-propyl sulfone, trifluoromethyl-n-propyl sulfone, fluoromethylisopropyl sulfone, difluoromethylisopropyl sulfone, trifluoromethylisopropyl sulfone, trifluoroethyl-n-propyl sulfone, trifluoroethylisopropyl sulfone, pentafluoroethyl-n-propyl sulfone, pentafluoroethylisopropyl sulfone, trifluoroethyl-n-butyl sulfone, trifluoroethyl-t-butyl sulfone, pentafluoroethyl-n-butyl sulfone, pentafluoroethyl-t-butyl sulfone and the like.

Preferred among the foregoing are dimethyl sulfone, ethylmethyl sulfone, diethyl sulfone, n-propylmethyl sulfone, isopropylmethyl sulfone, n-butylmethyl sulfone, t-butylmethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, ethyltrifluoroethyl sulfone, ethylpentafluoroethyl sulfone, trifluoromethyl-n-propyl sulfone, trifluoromethylisopropyl sulfone, trifluoroethyl-n-butyl sulfone, trifluoroethyl-t-butyl sulfone, trifluoromethyl-n-butyl sulfone, trifluoromethyl-t-butyl sulfone and the like, in terms of high ion conductance and high input and output characteristics.

One of the sulfone compound may be used alone, or any desired combination of two or more thereof in any desired proportion may be used.

Ordinarily, the amount of incorporation of the sulfone compound is preferably 0.3 vol % or more, more preferably 1 vol % or more and even more preferably 5 vol % or more, and preferably 40 vol % or less, more preferably 35 vol % or less and even more preferably 30 volt or less, with respect to 100 vol % of non-aqueous solvent.

Within these ranges, an enhancing effect on durability in terms of cycle characteristic and storage characteristic and the like is readily achieved, the viscosity of the non-aqueous electrolyte solution can be brought to within an appropriate range, and drops in electrical conductivity can be avoided; also, drops in the charge-discharge capacity retention rate can be readily avoided, in a case where the non-aqueous electrolyte battery is charged and discharged at a high current density.

<Composition of the Non-Aqueous Solvent when the Fluorine Atom-Containing Cyclic Carbonate is not Used or Used as an Auxiliary Agent>

When the fluorine atom-containing cyclic carbonate is not used or used as an auxiliary agent in the present invention, a single one of the non-aqueous solvents provided above as examples may be used by itself as the non-aqueous solvent other than the fluorine atom-containing cyclic carbonate, or two or more may be used in combination using any combination and proportions.

An example of a preferred combination for the non-aqueous solvent is a combination composed mainly of a fluorine-free cyclic carbonate and a chain carbonate.

Here, the sum total of the fluorine-free cyclic carbonate and chain carbonate in the non-aqueous solvent is preferably 70 volume % or more, more preferably 80 volume % or more, and even more preferably 90 volume- or more, while the percentage for the fluorine-free cyclic carbonate relative to the sum total of the cyclic carbonate and chain carbonate is preferably 5 volume % or more, more preferably 10 volume- or more, and even more preferably 15 volume % or more and preferably 50 volume's or less, more preferably 35 volume % or less, even more preferably 30 volume % or less, and particularly preferably 25 volume % or less.

The use of a combination of these non-aqueous solvents can provide a favorable balance, for a battery fabricated using such a combination, between the cycle characteristics and the high-temperature storage characteristics (particularly the residual capacity after high-temperature storage and the high-load discharge capacity).

Specific examples of preferred combinations of the fluorine-free cyclic carbonate and chain carbonate are as follows: ethylene carbonate+dimethyl carbonate, ethylene carbonate+diethyl carbonate, ethylene carbonate+ethyl methyl carbonate, ethylene carbonate+dimethyl carbonate+diethyl carbonate, ethylene carbonate+dimethyl carbonate+ethyl methyl carbonate, ethylene carbonate+diethyl carbonate+ethyl methyl carbonate, and ethylene carbonate+dimethyl carbonate+diethyl carbonate+ethyl methyl carbonate.

Among the fluorine-free cyclic carbonate+chain carbonate combinations, combinations having an asymmetric chain alkyl carbonate for the chain carbonate are even more preferred. Further, combinations containing a symmetric chain carbonate, an asymmetric chain carbonate and ethylene carbonate exemplified by ethylene carbonate+dimethyl carbonate+ethyl methyl carbonate, ethylene carbonate+diethyl carbonate+ethyl methyl carbonate, and ethylene carbonate+dimethyl carbonate+diethyl carbonate+ethyl methyl carbonate, are particularly preferred because they provide a good balance between the cycle characteristics and the high-current discharge characteristics.

Among the foregoing, ethyl methyl carbonate is preferred for the asymmetric chain carbonate and the alkyl group in the chain carbonate preferably has 1 or 2 carbons.

Combinations provided by the further addition of propylene carbonate to these ethylene carbonate+chain carbonate combinations are also preferred combinations.

In those instances in which propylene carbonate is incorporated, the volume ratio between the ethylene carbonate and propylene carbonate is preferably 99:1 to 40:60, and is particularly preferably from 95:5 to 50:50. Further, the proportion of propylene carbonate in the entire non-aqueous solvent is preferably 0.1 volt or more, more preferably 1 vol % or more and even more preferably 2 vol % or more, and preferably 20 vol % or less, more preferably 8 vol % or less and even more preferably 5 vol % or less.

The incorporation of propylene carbonate in this concentration is preferred because this enables the characteristics of the ethylene carbonate+chain carbonate combination to be retained intact while also providing excellent low-temperature characteristics.

In a case where dimethyl carbonate is incorporated in the non-aqueous solvent, the load characteristics of the battery can be improved when the percentage of dimethyl carbonate incorporation in the total non-aqueous solvent is in the range of preferably 10 volume % or more, more preferably 20 volume % or more, even more preferably 25 volume % or more, and particularly preferably 30 volume % or more and preferably 90 volume % or less, more preferably 80 volume % or less, even more preferably 75 volumes or less, and particularly preferably 70 volume % or less.

Among the foregoing, the battery characteristics after high-temperature storage can be improved—while maintaining the electrical conductivity of the electrolyte solution—by incorporating dimethyl carbonate and ethyl methyl carbonate and having the percentage content of the dimethyl carbonate be larger than the percentage content of the ethyl methyl carbonate, and this is therefore preferred.

In terms of improving the electrical conductivity of the electrolyte solution and improving the battery characteristics after storage, the volume ratio of the dimethyl carbonate to the ethyl methyl carbonate (dimethyl carbonate/ethyl methyl carbonate) in the overall non-aqueous solvent is preferably 1.1 or more, more preferably 1.5 or more, and even more preferably 2.5 or more. In terms of improving the low-temperature battery characteristics, this volume ratio (dimethyl carbonate/ethyl methyl carbonate) is preferably 40 or less, more preferably 20 or less, even more preferably 10 or less, and particularly preferably 8 or less.

Another solvent, e.g., a cyclic carboxylate ester, chain carboxylate ester, cyclic ether, chain ether, sulfur-containing organic solvent, phosphorus-containing organic solvent, aromatic fluorine-containing solvent, and so forth, may also be blended in the aforementioned combination composed mainly of a fluorine-free cyclic carbonate and a chain carbonate.

In this Description, the volume of a non-aqueous solvent is the value measured at 25° C., while the value measured at the melting point is used for substances that are solid at 25° C., e.g., ethylene carbonate.

<Composition of the Non-Aqueous Solvent when the Fluorine Atom-Containing Cyclic Carbonate is Used as a Non-Aqueous Solvent>

When the fluorine atom-containing cyclic carbonate is used as a non-aqueous solvent in the present invention, a single one of the non-aqueous solvents provided above as examples may be used in combination with the fluorine atom-containing cyclic carbonate as the non-aqueous solvent other than the fluorine atom-containing cyclic carbonate, or a combination of two or more may be used in combination with the fluorine atom-containing cyclic carbonate.

An example of a preferred combination for the non-aqueous solvent is a combination composed mainly of the fluorine atom-containing cyclic carbonate and a chain carbonate. Here, the sum total of the fluorine atom-containing cyclic carbonate and chain carbonate in the non-aqueous solvent is preferably 60 volume % or more, more preferably 80 volume % or more, and even more preferably 90 volume % or more, while the percentage for the fluorine atom-containing cyclic carbonate relative to the sum total of the fluorine atom-containing cyclic carbonate and chain carbonate is 3 volume % or more, preferably 5 volumes or more, more preferably 10 volume % or more, and even more preferably 15 volume or more and preferably 60 volume's or less, more preferably 50 volume, or less, even more preferably 40 volume % or less, and particularly preferably 35 volumes or less.

The use of a combination of these non-aqueous solvents can provide a favorable balance, for a battery fabricated using such a combination, between the cycle characteristics and the high-temperature storage characteristics (particularly the residual capacity after high-temperature storage and the high-load discharge capacity).

Specific examples of preferred combinations of the fluorine atom-containing cyclic carbonate and chain carbonate are as follows: monofluoroethylene carbonate+dimethyl carbonate, monofluoroethylene carbonate+diethyl carbonate, monofluoroethylene carbonate+ethyl methyl carbonate, monofluoroethylene carbonate+dimethyl carbonate+diethyl carbonate, monofluoroethylene carbonate+dimethyl carbonate+ethyl methyl carbonate, monofluoroethylene carbonate+diethyl carbonate+ethyl methyl carbonate, and monofluoroethylene carbonate+dimethyl carbonate+diethyl carbonate+ethyl methyl carbonate.

Among the fluorine atom-containing cyclic carbonate+chain carbonate combinations, combinations having an asymmetric chain alkyl carbonate for the chain carbonate are even more preferred, and combinations containing a symmetric chain carbonate and an asymmetric chain carbonate, e.g., monofluoroethylene carbonate+dimethyl carbonate+ethyl methyl carbonate, monofluoroethylene carbonate+diethyl carbonate+ethyl methyl carbonate, and monofluoroethylene carbonate+dimethyl carbonate+diethyl carbonate+ethyl methyl carbonate, are particularly preferred because they provide a good balance between the cycle characteristics and the high-current discharge characteristics. Among the foregoing, dimethyl carbonate is preferred for the symmetric chain carbonate and the alkyl group in the chain carbonate preferably has 1 or 2 carbons.

Combinations provided by the further addition of a fluorine-free cyclic carbonate to these fluorine atom-containing cyclic carbonate+chain carbonate combinations are also preferred combinations. Here, the sum total of the fluorine atom-containing cyclic carbonate and the fluorine-free cyclic carbonate in the non-aqueous solvent is preferably 10 volume % or more, more preferably 15 volume % or more, and even more preferably 20 volume % or more, and the percentage of the fluorine atom-containing cyclic carbonate relative to the sum total of the fluorine atom-containing cyclic carbonate and the fluorine-free cyclic carbonate is 5 volume % or more, preferably 10 volumes or more, more preferably 15 volume % or more, and even more preferably 25 volume or more % and preferably 95 volume % or less, more preferably 85 volume % or less, even more preferably 75 volume % or less, and particularly preferably 60 volume % or less.

The incorporation of the fluorine-free cyclic carbonate in the indicated concentration range makes it possible to maintain the electrical conductivity of the electrolyte solution while forming a stable protective film at the negative electrode.

The following are specific examples of preferred combinations of the fluorine atom-containing cyclic carbonate and fluorine-free cyclic carbonate: monofluoroethylene carbonate+ethylene carbonate+dimethyl carbonate, monofluoroethylene carbonate+ethylene carbonate+diethyl carbonate, monofluoroethylene carbonate+ethylene carbonate+ethyl methyl carbonate, monofluoroethylene carbonate+ethylene carbonate+dimethyl carbonate+diethyl carbonate, monofluoroethylene carbonate+ethylene carbonate+dimethyl carbonate+ethyl methyl carbonate, monofluoroethylene carbonate+ethylene carbonate+diethyl carbonate+ethyl methyl carbonate, monofluoroethylene carbonate+ethylene carbonate+dimethyl carbonate+diethyl carbonate+ethyl methyl carbonate, monofluoroethylene carbonate+propylene carbonate+dimethyl carbonate, monofluoroethylene carbonate+propylene carbonate+diethyl carbonate, monofluoroethylene carbonate+propylene carbonate+ethyl methyl carbonate, monofluoroethylene carbonate+propylene carbonate+dimethyl carbonate+diethyl carbonate, monofluoroethylene carbonate+propylene carbonate+dimethyl carbonate+ethyl methyl carbonate, monofluoroethylene carbonate+propylene carbonate+diethyl carbonate+ethyl methyl carbonate, monofluoroethylene carbonate+propylene carbonate+dimethyl carbonate+diethyl carbonate+ethyl methyl carbonate, monofluoroethylene carbonate+ethylene carbonate+propylene carbonate+dimethyl carbonate, monofluoroethylene carbonate+ethylene carbonate+propylene carbonate+diethyl carbonate, monofluoroethylene carbonate+ethylene carbonate+propylene carbonate+ethyl methyl carbonate, monofluoroethylene carbonate+ethylene carbonate+propylene carbonate+dimethyl carbonate+diethyl carbonate, monofluoroethylene carbonate+ethylene carbonate+propylene carbonate+dimethyl carbonate+ethyl methyl carbonate, monofluoroethylene carbonate+ethylene carbonate+propylene carbonate+diethyl carbonate+ethyl methyl carbonate, and monofluoroethylene carbonate+ethylene carbonate+propylene carbonate+dimethyl carbonate+diethyl carbonate+ethyl methyl carbonate.

Among the fluorine atom-containing carbonate+fluorine-free cyclic carbonate+chain carbonate combinations, combinations that contain a symmetric chain alkyl carbonate for the chain carbonate are even more preferred, and combinations that contain monofluoroethylene carbonate+a symmetric chain carbonate+an asymmetric chain carbonate, e.g., monofluoroethylene carbonate+ethylene carbonate+dimethyl carbonate+ethyl methyl carbonate, monofluoroethylene carbonate+propylene carbonate+dimethyl carbonate+ethyl methyl carbonate, monofluoroethylene carbonate+ethylene carbonate+propylene carbonate+dimethyl carbonate+ethyl methyl carbonate, monofluoroethylene carbonate+ethylene carbonate+diethyl carbonate+ethyl methyl carbonate, monofluoroethylene carbonate+propylene carbonate+diethyl carbonate+ethyl methyl carbonate, monofluoroethylene carbonate+ethylene carbonate+propylene carbonate+diethyl carbonate+ethyl methyl carbonate, monofluoroethylene carbonate+dimethyl carbonate+diethyl carbonate+ethyl methyl carbonate, monofluoroethylene carbonate+propylene carbonate+dimethyl carbonate+diethyl carbonate+ethyl methyl carbonate, and monofluoroethylene carbonate+ethylene carbonate+propylene carbonate+dimethyl carbonate+diethyl carbonate+ethyl methyl carbonate, are particularly preferred because they provide good balance between the cycle characteristics and the high-current discharge characteristics. Among the foregoing, dimethyl carbonate is preferred for the symmetric chain carbonate and the alkyl group in the chain carbonate preferably has 1 or 2 carbons.

In a case where dimethyl carbonate is incorporated in the non-aqueous solvent, the load characteristics of the battery are improved when the percentage of dimethyl carbonate incorporation in the total non-aqueous solvent is in the range of preferably 10 volume's or more, more preferably 20 volume's or more, even more preferably 25 volume, or more, and particularly preferably 30 volume % or more and preferably 90 volume or less, more preferably 80 volume's or less, even more preferably 75 volumes or less, and particularly preferably 70 volumes or less.

Among the foregoing, the battery characteristics after high-temperature storage can be improved—while maintaining the electrical conductivity of the electrolyte solution—by incorporating dimethyl carbonate and ethyl methyl carbonate and having the percentage content of the dimethyl carbonate be larger than the percentage content of the ethyl methyl carbonate, and this is therefore preferred.

In terms of improving the electrical conductivity of the electrolyte solution and improving the battery characteristics after storage, the volume ratio of the dimethyl carbonate to the ethyl methyl carbonate (dimethyl carbonate/ethyl methyl carbonate) in the overall non-aqueous solvent is preferably 1.1 or more, more preferably 1.5 or more, and even more preferably 2.5 or more.

In terms of improving the low-temperature battery characteristics, this volume ratio (dimethyl carbonate/ethyl methyl carbonate) is preferably not more than 40, more preferably not more than 20, even more preferably not more than 10, and particularly preferably not more than 8.

Another solvent, e.g., a cyclic carboxylate ester, chain carboxylate ester, cyclic ether, chain ether, sulfur-containing organic solvent, phosphorus-containing organic solvent, fluorine-containing aromatic solvent, and so forth, may also be blended in addition to the previously described fluorine-free cyclic carbonate in the aforementioned combination composed mainly of a fluorine atom-containing cyclic carbonate and a chain carbonate.

1-10. Auxiliary agents Besides the compounds described in 1-1 to 1-9, the non-aqueous electrolyte battery of the present invention may use appropriate auxiliary agents, in accordance with the intended purpose. The auxiliary agent can be exemplified by the monoisocyanates, mononitriles, cyclic sulfonate esters, overcharge inhibitors, and other auxiliary agents described below.

<The Monoisocyanate>

The monoisocyanate compound is not particularly limited, so long as the compound has one isocyanate group per molecule.

The monoisocyanate compound can be specifically exemplified by methyl isocyanate, ethyl isocyanate, propyl isocyanate, isopropyl isocyanate, butyl isocyanate, tertiary-butyl isocyanate, pentyl isocyanate, hexyl isocyanate, cyclohexyl isocyanate, vinyl isocyanate, allyl isocyanate, ethynyl isocyanate, propynyl isocyanate, phenyl isocyanate, and fluorophenyl isocyanate.

Methyl isocyanate, ethyl isocyanate, allyl isocyanate, and propynyl isocyanate are preferred among the foregoing in terms of improving the battery characteristics.

One of the monoisocyanate compound may be used alone, or any desired combination of two or more thereof in any desired proportion may be used. The amount of incorporation of the monoisocyanate compound with respect to the overall non-aqueous electrolyte solution of the present invention is not limited and may be freely selected as long as the effects of the present invention are not substantially impaired, but the monoisocyanate compound is generally incorporated at a concentration, considered with respect to the non-aqueous electrolyte solution of the present invention, of 0.001 mass % or more, preferably 0.1 mass % or more, and more preferably 0.3 mass % or more and ordinarily 10 mass % or less, preferably 5 mass % or less, and more preferably 3 mass % or less. If the abovementioned ranges are satisfied, the effects on output characteristic, load characteristic, low-temperature characteristic, cycle characteristic, high-temperature storage characteristic and so forth become more pronounced.

<The Mononitrile>

There are no particular limitations on the type of mononitrile compound other than that the compound have one cyano group per molecule.

The mononitrile compound can be specifically exemplified by cyanate compounds such as methyl cyanate, ethyl cyanate, propyl cyanate, butyl cyanate, pentyl cyanate, hexyl cyanate, and heptyl cyanate; sulfur-containing compounds such as methyl thiocyanate, ethyl thiocyanate, propyl thiocyanate, butyl thiocyanate, pentyl thiocyanate, hexyl thiocyanate, heptyl thiocyanate, methanesulfonyl cyanide, ethanesulfonyl cyanide, propanesulfonyl cyanide, butanesulfonyl cyanide, pentanesulfonyl cyanide, hexanesulfonyl cyanide, heptanesulfonyl cyanide, methyl sulfurocyanidate, ethyl sulfurocyanidate, propyl sulfurocyanidate, butyl sulfurocyanidate, pentyl sulfurocyanidate, hexyl sulfurocyanidate, and heptyl sulfurocyanidate; and phosphorus-containing compounds such as cyanodimethylphosphine, cyanodimethylphosphine oxide, methyl cyanomethylphosphinate, methyl cyanomethylphosphinite, dimethylphosphinic cyanide, dimethylphosphinous cyanide, dimethyl cyanophosphonate, dimethyl cyanophosphonite, cyanomethyl methylphosphonate, cyanomethyl methylphosphonite, cyano dimethyl phosphate, and cyano dimethyl phosphite.

Preferred among the foregoing in terms of improving the storage characteristics are acetonitrile, propionitrile, butyronitrile, isobutyronitrile, valeronitrile, isovaleronitrile, lauronitrile, crotononitrile, and 3-methylcrotononitrile.

One of the mononitrile compound may be used alone, or any desired combination of two or more thereof in any desired proportion may be used. The amount of incorporation of the cyano compound with respect to the overall non-aqueous electrolyte solution of the present invention is not limited and may be freely selected as long as the effects of the present invention are not substantially impaired, but the nitrile compound is generally incorporated at a concentration, considered with respect to the non-aqueous electrolyte solution of the present invention, of 0.001 mass % or more, preferably 0.1 mass % or more, and more preferably 0.3 masse or more and ordinarily 10 mass % or less, preferably 5 mass % or less, and more preferably 3 mass % or less. If the abovementioned ranges are satisfied, the effects on output characteristic, load characteristic, low-temperature characteristic, cycle characteristic, high-temperature storage characteristic and so forth become more pronounced.

<The Cyclic Sulfonate Ester>

The cyclic sulfonate ester is a sulfonate ester that has a cyclic structure, but is not otherwise particularly limited as to type.

The cyclic sulfonate ester can be specifically exemplified by sultone compounds such as 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1-fluoro-1,4-butane sultone, 2-fluoro-1,4-butane sultone, 3-fluoro-1,4-butane sultone, 4-fluoro-1,4-butane sultone, 1-methyl-1,4-butane sultone, 2-methyl-1,4-butane sultone, 3-methyl-1,4-butane sultone, 4-methyl-1,4-butane sultone, 1-butene-1,4-sultone, 2-butene-1,4-sultone, 3-butene-1,4-sultone, 1-fluoro-1-butene-1,4-sultone, 2-fluoro-1-butene-1,4-sultone, 3-fluoro-1-butene-1,4-sultone, 4-fluoro-1-butene-1,4-sultone, 1-fluoro-2-butene-1,4-sultone, 2-fluoro-2-butene-1,4-sultone, 3-fluoro-2-butene-1,4-sultone, 4-fluoro-2-butene-1,4-sultone, 1-fluoro-3-butene-1,4-sultone, 2-fluoro-3-butene-1,4-sultone, 3-fluoro-3-butene-1,4-sultone, 4-fluoro-3-butene-1,4-sultone, 1-methyl-1-butene-1,4-sultone, 2-methyl-1-butene-1,4-sultone, 3-methyl-1-butene-1,4-sultone, 4-methyl-1-butene-1,4-sultone, 1-methyl-2-butene-1,4-sultone, 2-methyl-2-butene-1,4-sultone, 3-methyl-2-butene-1,4-sultone, 4-methyl-2-butene-1,4-sultone, 1-methyl-3-butene-1,4-sultone, 2-methyl-3-butene-1,4-sultone, 3-methyl-3-butene-1,4-sultone, 4-methyl-3-butene-1,4-sultone, 1,5-pentane sultone, 1-fluoro-1,5-pentane sultone, 2-fluoro-1,5-pentane sultone, 3-fluoro-1,5-pentane sultone, 4-fluoro-1,5-pentane sultone, 5-fluoro-1,5-pentane sultone, 1-methyl-1,5-pentane sultone, 2-methyl-1,5-pentane sultone, 3-methyl-1,5-pentane sultone, 4-methyl-1,5-pentane sultone, 5-methyl-1,5-pentane sultone, 1-pentene-1,5-sultone, 2-pentene-1,5-sultone, 3-pentene-1,5-sultone, 4-pentene-1,5-sultone, 1-fluoro-1-pentene-1,5-sultone, 2-fluoro-1-pentene-1,5-sultone, 3-fluoro-1-pentene-1,5-sultone, 4-fluoro-1-pentene-1,5-sultone, 5-fluoro-1-pentene-1,5-sultone, 1-fluoro-2-pentene-1,5-sultone, 2-fluoro-2-pentene-1,5-sultone, 3-fluoro-2-pentene-1,5-sultone, 4-fluoro-2-pentene-1,5-sultone, 5-fluoro-2-pentene-1,5-sultone, 1-fluoro-3-pentene-1,5-sultone, 2-fluoro-3-pentene-1,5-sultone, 3-fluoro-3-pentene-1,5-sultone, 4-fluoro-3-pentene-1,5-sultone, 5-fluoro-3-pentene-1,5-sultone, 1-fluoro-4-pentene-1,5-sultone, 2-fluoro-4-pentene-1,5-sultone, 3-fluoro-4-pentene-1,5-sultone, 4-fluoro-4-pentene-1,5-sultone, 5-fluoro-4-pentene-1,5-sultone, 1-methyl-1-pentene-1,5-sultone, 2-methyl-1-pentene-1,5-sultone, 3-methyl-1-pentene-1,5-sultone, 4-methyl-1-pentene-1,5-sultone, 5-methyl-1-pentene-1,5-sultone, 1-methyl-2-pentene-1,5-sultone, 2-methyl-2-pentene-1,5-sultone, 3-methyl-2-pentene-1,5-sultone, 4-methyl-2-pentene-1,5-sultone, 5-methyl-2-pentene-1,5-sultone, 1-methyl-3-pentene-1,5-sultone, 2-methyl-3-pentene-1,5-sultone, 3-methyl-3-pentene-1,5-sultone, 4-methyl-3-pentene-1,5-sultone, 5-methyl-3-pentene-1,5-sultone, 1-methyl-4-pentene-1,5-sultone, 2-methyl-4-pentene-1,5-sultone, 3-methyl-4-pentene-1,5-sultone, 4-methyl-4-pentene-1,5-sultone, and 5-methyl-4-pentene-1,5-sultone;

sulfate compounds such as methylene sulfate, ethylene sulfate, and propylene sulfate; disulfonate compounds such as methylene methanedisulfonate and ethylene methanedisulfonate; nitrogenous compounds such as 1,2,3-oxathiazolidine-2,2-dioxide, 3-methyl-1,2,3-oxathiazolidine-2,2-dioxide, 3H-1,2,3-oxathiazole-2,2-dioxide, 5H-1,2,3-oxathiazole-2,2-dioxide, 1,2,4-oxathiazolidine-2,2-dioxide, 4-methyl-1,2,4-oxathiazolidine-2,2-dioxide, 3H-1,2,4-oxathiazole-2,2-dioxide, 5H-1,2,4-oxathiazole-2,2-dioxide, 1,2,5-oxathiazolidine-2,2-dioxide, 5-methyl-1,2,5-oxathiazolidine-2,2-dioxide, 3H-1,2,5-oxathiazole-2,2-dioxide, 5H-1,2,5-oxathiazole-2,2-dioxide, 1,2,3-oxathiazinane-2,2-dioxide, 3-methyl-1,2,3-oxathiazinane-2,2-dioxide, 5,6-dihydro-1,2,3-oxathiazine-2,2-dioxide, 1,2,4-oxathiazinane-2,2-dioxide, 4-methyl-1,2,4-oxathiazinane-2,2-dioxide, 5,6-dihydro-1,2,4-oxathiazine-2,2-dioxide, 3,6-dihydro-1,2,4-oxathiazine-2,2-dioxide, 3,4-dihydro-1,2,4-oxathiazine-2,2-dioxide, 1,2,5-oxathiazinane-2,2-dioxide, 5-methyl-1,2,5-oxathiazinane-2,2-dioxide, 5,6-dihydro-1,2,5-oxathiazine-2,2-dioxide, 3,6-dihydro-1,2,5-oxathiazine-2,2-dioxide, 3,4-dihydro-1,2,5-oxathiazine-2,2-dioxide, 1,2,6-oxathiazinane-2,2-dioxide, 6-methyl-1,2,6-oxathiazinane-2,2-dioxide, 5,6-dihydro-1,2,6-oxathiazine-2,2-dioxide, 3,4-dihydro-1,2,6-oxathiazine-2,2-dioxide, and 5,6-dihydro-1,2,6-oxathiazine-2,2-dioxide; and phosphorus-containing compounds such as 1,2,3-oxathiaphoslane-2,2-dioxide, 3-methyl-1,2,3-oxathiaphoslane-2,2-dioxide, 3-methyl-1,2,3-oxathiaphoslane-2,2,3-trioxide, 3-methoxy-1,2,3-oxathiaphoslane-2,2,3-trioxide, 1,2,4-oxathiaphoslane-2,2-dioxide, 4-methyl-1,2,4-oxathiaphoslane-2,2-dioxide, 4-methyl-1,2,4-oxathiaphoslane-2,2,4-trioxide, 4-methoxy-1,2,4-oxathiaphoslane-2,2,4-trioxide, 1,2,5-oxathiaphoslane-2,2-dioxide, 5-methyl-1,2,5-oxathiaphoslane-2,2-dioxide, 5-methyl-1,2,5-oxathiaphoslane-2,2,5-trioxide, 5-methoxy-1,2,5-oxathiaphoslane-2,2,5-trioxide, 1,2,3-oxathiaphosphinane-2,2-dioxide, 3-methyl-1,2,3-oxathiaphosphinane-2,2-dioxide, 3-methyl-1,2,3-oxathiaphosphinane-2,2,3-trioxide, 3-methoxy-1,2,3-oxathiaphosphinane-2,2,3-trioxide, 1,2,4-oxathiaphosphinane-2,2-dioxide, 4-methyl-1,2,4-oxathiaphosphinane-2,2-dioxide, 4-methyl-1,2,4-oxathiaphosphinane-2,2,3-trioxide, 4-methyl-1,5,2,4-dioxathiaphosphinane-2,4-dioxide, 4-methoxy-1,5,2,4-dioxathiaphosphinane-2,4-dioxide, 3-methoxy-1,2,4-oxathiaphosphinane-2,2,3-trioxide, 1,2,5-oxathiaphosphinane-2,2-dioxide, 5-methyl-1,2,5-oxathiaphosphinane-2,2-dioxide, 5-methyl-1,2,5-oxathiaphosphinane-2,2,3-trioxide, 5-methoxy-1,2,5-oxathiaphosphinane-2,2,3-trioxide, 1,2,6-oxathiaphosphinane-2,2-dioxide, 6-methyl-1,2,6-oxathiaphosphinane-2,2-dioxide, 6-methyl-1,2,6-oxathiaphosphinane-2,2,3-trioxide, and 6-methoxy-1,2,6-oxathiaphosphinane-2,2,3-trioxide.

Among the foregoing, 1,3-propane sultone, 1-fluoro-1,3-propane sultone, 2-fluoro-1,3-propane sultone, 3-fluoro-1,3-propane sultone, 1-propene-1,3-sultone, 1-fluoro-1-propene-1,3-sultone, 2-fluoro-1-propene-1,3-sultone, 3-fluoro-1-propene-1,3-sultone, 1,4-butane sultone, methylene methanedisulfonate, and ethylene methanedisulfonate are preferred in terms of improving the storage characteristics, while 1,3-propane sultone, 1-fluoro-1,3-propane sultone, 2-fluoro-1,3-propane sultone, 3-fluoro-1,3-propane sultone, and 1-propene-1,3-sultone are more preferred.

One of the cyclic sulfonic acid ester may be used alone, or any desired combination of two or more thereof in any desired proportion may be used. There is no limitation on the amount of incorporation of the cyclic sulfonate ester with respect to the overall non-aqueous electrolyte solution of the present invention, and this amount may be freely selected as long as the effects of the present invention are not substantially impaired. However, the cyclic sulfonate ester is generally incorporated, with respect to the non-aqueous electrolyte solution of the present invention, at a concentration of 0.001 mass % or more and preferably 0.1 mass % or more and more preferably 0.3 mass % or more and ordinarily 10 mass % or less, preferably 5 mass % or less, and more preferably 3 mass % or less. If the indicated ranges are satisfied, the effects on output characteristic, load characteristic, low-temperature characteristic, cycle characteristic, high-temperature storage characteristic and so forth become more pronounced.

<Overcharge Preventing Agent>

An overcharge preventing agent can be used in the non-aqueous electrolyte solution of the present invention with a view to effectively suppressing bursting/ignition of the battery, for instance in an overcharged state of the non-aqueous electrolyte battery.

Examples of overcharge inhibitor include, for instance, aromatic compounds such as biphenyl, alkyl biphenyl, terphenyl, partially hydrogenated products of terphenyl, cyclohexyl benzene, t-butylbenzene, t-amylbenzene, diphenyl ether, dibenzofuran or the like; partially fluorinated products of the abovementioned aromatic compounds, for instance 2-fluorobiphenyl, o-cyclohexylfluorobenzene, p-cyclohexylfluorobenzene or the like; or fluorine-containing anisole compounds such as 2,4-difluoroanisole, 2,5-difluoroanisole, 2,6-difluoroanisole, 3,5-difluoroanisole or the like. Preferred among the foregoing are aromatic compounds such as biphenyl, alkylbiphenyl, terphenyl, partially hydrogenated products of terphenyl, cyclohexylbenzene, t-butylbenzene, t-amylbenzene, diphenyl ether, di-benzofuran or the like.

The foregoing may be used as a single type or concomitantly as two or more types. When using two or more types concomitantly, then there is preferably used, in particular, a combination of cyclohexylbenzene and t-butylbenzene or t-amylbenzene; or at least one type selected from among aromatic compounds containing no oxygen atoms, for instance, biphenyl, alkylbiphenyl, terphenyl, partially hydrogenated products of terphenyl, cyclohexylbenzene, t-butylbenzene, t-amylbenzene or the like, and at least one type selected from among oxygen-containing aromatic compounds such as diphenyl ether, dibenzofuran or the like, in terms of striking a balance between the overcharge prevention characteristic and high-temperature storage characteristic.

The amount of incorporation of the overcharge preventing agent is not particularly limited, and may be any amount of incorporation, so long as the effect of the present invention is not significantly impaired. The overcharge inhibitor is incorporated, in 100 mass % for the non-aqueous electrolyte solution, preferably 0.1 mass % or more and 5 mass' or less. Within such a range, the effect elicited by the overcharge preventing agent is readily brought about at a sufficient level, and impairment of battery characteristics, for instance high-temperature storage characteristic, is readily avoided.

The amount of incorporation of the overcharge preventing agent is more preferably 0.2 wt or more, even more preferably 0.3 wt % or more and particularly preferably 0.5 wt or more, and more preferably 3 wt % or less and even more preferably 2 wt(or less.

<Other Auxiliary Agents>

Other known auxiliary agents may be used in the non-aqueous electrolyte solution of the present invention.

These other auxiliary agents can be exemplified by carbonate compounds such as erythritol carbonate, spirobisdimethylene carbonate, methoxyethyl methyl carbonate, and so forth; carboxylic acid anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, phenylsuccinic anhydride, and so forth; spiro compounds such as 2,4,8,10-tetraoxaspiro[5.5]undecane, 3,9-divinyl-2,4,8,10-tetraoxaspiro[5.5]undecane, and so forth; sulfur-containing compounds such as ethylene sulfite, methyl fluorosulfonate, ethyl fluorosulfonate, methyl methanesulfonate, ethyl methanesulfonate, busulfan, sulfolene, biphenyl sulfone, N,N-dimethylmethanesulfonamide, N,N-diethylmethanesulfonamide, methyl vinylsulfonate, ethyl vinylsulfonate, allyl vinylsulfonate, methyl allylsulfonate, ethyl allylsulfonate, allyl allylsulfonate, 1,2-bis(vinylsulfonyloxy)ethane, and so forth; nitrogenous compounds such as 1-methyl-2-pyrrolidinone, 1-methyl-2-piperidone, 3-methyl-2-oxazolidinone, 1,3-dimethyl-2-imidazolidinone, N-methylsuccinimide, and so forth; phosphorus-containing compounds such as trimethyl phosphite, triethyl phosphite, triphenyl phosphite, trimethyl phosphate, triethyl phosphate, triphenyl phosphate, dimethyl methylphosphonate, diethyl ethylphosphonate, dimethyl vinylphosphonate, diethyl vinylphosphonate, ethyl diethylphosphonoacetate, methyl dimethylphosphinate, ethyl diethylphosphinate, trimethylphosphine oxide, triethylphosphine oxide, and so forth; hydrocarbon compounds such as heptane, octane, nonane, decane, cycloheptane, and so forth; and fluorine-containing aromatic compounds such as fluorobenzene, difluorobenzene, hexafluorobenzene, benzotrifluoride, and so forth. The foregoing may be used as a single type or concomitantly as two or more types. The capacity retention characteristic after storage at high-temperature, as well as the cycle characteristic, can be enhanced through the addition of such auxiliary agents.

The amount of incorporation of these other auxiliary agents is not particularly limited, and may be any amount of incorporation, so long as the effect of the present invention is not significantly impaired. The other auxiliary agent is incorporated, in 100 mass % for the non-aqueous electrolyte solution, preferably 0.01 mass % or more and 5 mass % or less. Within such a range, the effect elicited by the other auxiliary agents is readily brought about at a sufficient level, and impairment of battery characteristics such as high-load discharge characteristic is readily avoided.

The amount of incorporation of the other auxiliary agents is more preferably 0.1 wt % or more and even more preferably 0.2 wt % or more, and more preferably 3 wt. or less, even more preferably 1 wt or less.

The non-aqueous electrolyte solution described above encompasses a non-aqueous electrolyte solution that is present inside the non-aqueous electrolyte battery that is disclosed in the present invention.

Specific such instances include an instance where the constituent elements of the non-aqueous electrolyte solution such as the lithium salt, the solvent, the auxiliary agents and so forth are synthesized separately, and there is prepared a non-aqueous electrolyte solution out of the substantially isolated constituent elements, and then the non-aqueous electrolyte solution is poured into a battery assembled separately, to obtain a non-aqueous electrolyte solution in a non-aqueous electrolyte battery; an instance where the constituent elements of the non-aqueous electrolyte solution of the present invention are provided individually in the battery, and are then mixed within the battery, to obtain as a result a composition identical to that of the non-aqueous electrolyte solution of the present invention; or an instance where the compounds that make up the non-aqueous electrolyte solution of the present invention are generated in the non-aqueous electrolyte battery, to obtain thereby a composition identical to that of the non-aqueous electrolyte solution of the present invention.

2. Battery Configuration

The non-aqueous electrolyte solution of the present invention is appropriate for use as an electrolyte solution for secondary batteries, for instance lithium secondary batteries, from among non-aqueous electrolyte batteries. A non-aqueous electrolyte battery that uses the non-aqueous electrolyte solution of the present invention is explained next.

The non-aqueous electrolyte battery of the present invention can have a known structure, and is typically provided with a negative electrode and a positive electrode that can absorb and release ions (for instance, lithium ions), plus the above-described non-aqueous electrolyte solution of the present invention.

2-1. Negative Electrode

The negative electrode active material is not particularly limited, so long as it is capable of electrochemically absorbing and releasing lithium ions. Specific examples include, for instance, carbonaceous materials, alloy-based materials, lithium-containing metal complex oxide materials and the like. One of the foregoing may be used alone, or any desired combination of two or more thereof in any desired proportion may be used. A characteristic feature of the fourth present invention is that a carbonaceous material is present in the negative electrode.

<Negative Electrode Active Material>

Among the abovementioned carbonaceous materials, preferably, the carbonaceous material that is used as the negative electrode active material is selected from the following (1) to (4), since in that case a good balance is achieved between initial irreversible capacity and high current density charge-discharge characteristics:

(1) natural graphite;
(2) a carbonaceous material obtained as a result of one or several heating treatments, at a temperature ranging from 400 to 3200° C., of an artificial carbonaceous substance and an artificial graphitic substance;
(3) a carbonaceous material such that the negative electrode active material layer comprises at least two or more carbonaceous substances of dissimilar crystallinity, and/or a carbonaceous material having interfaces at which such carbonaceous substances of dissimilar crystallinity come into contact with each other; and
(4) a carbonaceous material such that the negative electrode active material layer comprises at least two or more carbonaceous substances having dissimilar orientation, and/or a carbonaceous material having interfaces at which such carbonaceous substances of dissimilar orientation come into contact with each other.

One of the carbonaceous materials of (1) to (4) may be used alone, or any desired combination of two or more thereof in any desired proportion may be used.

Examples of the artificial carbonaceous substance and artificial graphitic substance of (2) include, for instance, natural graphite, coal-based coke, petroleum coke, coal-based pitch, petroleum pitch, and products obtained as a result of an oxidation treatment of the foregoing pitches;

needle coke, pitch coke and carbon materials resulting from partial graphitization thereof; furnace black, acetylene black and organic pyrolysis products of pitch-based carbon fibers or the like; a carbonizable organic material or a carbonized product thereof; or a solution resulting from dissolving a carbonizable organic material in a low-molecular weight organic solvent such as benzene, toluene, xylene, quinoline, n-hexane or the like, or a carbonized product of the solution.

The alloy-based material that is used as the negative electrode active material is not particularly limited and may be single lithium, a single metal and alloy forming a lithium alloy or a compound exemplified by an oxide thereof, carbide thereof, nitride thereof, silicide thereof, sulfide thereof or phosphide thereof, so long as it is capable of absorbing and releasing lithium.

The single metal and alloy forming a lithium alloy are preferably a material comprising a metal/semimetal element (excluding carbon) of groups 13 and 14, more preferably a single metal such as aluminum, silicon or tin (hereafter, they may be referred to as "specific metal elements"), as well as alloys or compounds comprising these atoms.

One of the foregoing may be used alone, or any desired combination of two or more thereof in any desired proportion may be used.

Examples of the negative electrode active material having at least one type of atom selected from among the specific metal elements include a single metal of any one type of the specific metal elements; alloys comprising two or more types of the specific metal elements; alloys comprising one type or two or more types of the specific metal elements and another one type or two or more types of metal elements; compounds containing one type or two or more types of the specific metal elements; as well as complex compounds such as oxides thereof, carbides thereof, nitrides thereof, silicide thereof, sulfides thereof or phosphides thereof.

The capacity of the battery can be increased through the use of these single metals, alloys and metal compounds as the negative electrode active material.

Examples of the abovementioned complex compounds include compounds wherein a plurality of types of elements such as single metals, alloys and non-metallic elements, are bonded to each other in complex manners. Specifically, in the case of silicon and tin, for instance, alloys of these elements with metals that do not act as a negative electrode can be used. In the case of tin a complex compound comprising 5 to 6 elements including a combination of a metal other than tin and silicon that acts as a negative electrode, a metal that does not act as a negative electrode and a non-metallic element can be used.

Preferred among the abovementioned negative electrode active materials are any one single metal of the specific metal elements; or an alloy of two or more types of the specific metal elements; and an oxide, carbide and nitride of the specific metal elements in terms of the substantial capacity per unit mass that is afforded in the resulting battery. In particular, a single metal, alloy, oxide, carbide, nitride or the like of silicon and/or tin is preferably used in terms of capacity per unit mass and environmental impact.

The lithium-containing metal complex oxide material used as the negative electrode active material is not particularly limited so long as it is capable of absorbing and releasing lithium. However in terms of high current density charge-discharge characteristic, the lithium-containing complex metal oxide material preferably contains titanium and lithium, more preferably titanium, and even more preferably a complex oxide of lithium and titanium (hereafter they may be referred to as "lithium-titanium complex oxide"). In particular, the use of a negative electrode active material for non-aqueous electrolyte batteries comprising a lithium-titanium complex oxide having a spinel structure is prefer because output resistance is significantly reduced in such a case.

Also preferred is a metal oxide in which lithium and/or titanium in the lithium-titanium complex oxide are substituted by another metal element, for instance at least one element selected from the group consisting of Na, K, Co, Al, Fe, Ti, Mg, Cr, Ga, Cu, Zn and Nb.

This metal oxide is preferably a lithium titanium composite oxide with general formula (A) wherein $0.7 \leq x \leq 1.5$, $1.5 \leq y \leq 2.3$, and $0 \leq z \leq 1.6$ in general formula (A), because this has a stable structure during lithium ion doping/dedoping.

$$Li_x Ti_y M_z O_4 \tag{A}$$

(In formula (A), M denotes at least one element selected from the group consisting of Na, K, Co, Al, Fe, Ti, Mg, Cr, Ga, Cu, Zn and Nb).

Among the compositions represented by formula (A), particularly preferred are those wherein $$1.2 \leq x \leq 1.4, 1.5 \leq y \leq 1.7, z=0 \tag{a}$$

$$0.9 \leq x \leq 1.1, 1.9 \leq y \leq 2.1, z=0 \tag{b}$$

$$0.7 \leq 0.9, 2.1 \leq y \leq 2.3, z=0 \tag{c}$$

since a good battery performance balance is achieved with such structures.

Particularly preferred representative compositions of the above compounds include $Li_{4/3}Ti_{5/3}O_4$ for (a), $Li_1Ti_2O_4$ for (b) and $Li_{4/5}Ti_{11/5}O_4$ for (c). Preferred instances of a structure where $Z \neq 0$ include $Li_{4/3}Ti_{4/3}Al_{1/3}O_4$.

<Characteristics of the Carbonaceous Material>

When using a carbonaceous material as the negative electrode active material, the carbonaceous material preferably has the following properties.

(X-Ray Parameters)

The d value (interlayer distance) of the (002) lattice plane determined by x-ray diffraction by a method according to the Japan Society for the Promotion of Science (Gakushin) for the carbonaceous material is preferably 0.335 nm or more and is ordinarily 0.360 nm or less and is preferably 0.350 nm or less and more preferably is 0.345 nm or less. In addition, the crystallite size (Lc) determined by x-ray diffraction by the Gakushin method for the carbonaceous material is preferably 1.0 nm or more and is more preferably 1.5 nm or more.

(Volume-Average Particle Diameter)

The volume-average particle diameter of the carbonaceous material determined by laser diffraction/scattering which denotes the average particle diameter (median diameter), referred to volume, is ordinarily 1 μm or more, preferably 3 μm or more, even more preferably 5 μm or more, and particularly preferably 7 μm or more, and is ordinarily 100 μm or smaller, preferably 50 μm or less, more preferably 40 μm or less, even more preferably 30 μm or less, and particularly preferably 25 μm or less.

If the volume-average particle diameter is below the indicated range, irreversible capacity may increase, which may result in loss of initial battery capacity. If the volume-average particle diameter exceeds the indicated range, coated surfaces are likely to be non-uniform in producing the electrode by coating. That may be undesirable in the battery production process.

The volume-based average particle diameter is measured by dispersing the carbon powder in a 0.2 mass % aqueous solution (approximately 10 mL) of the surfactant polyoxyethylene(20) sorbitan monolaurate and carrying out the measurement using a laser diffraction/scattering particle size distribution analyzer (LA-700 from Horiba, Ltd.). The median diameter obtained in the measurement is defined as the volume-average particle diameter of the carbonaceous material.

(Raman R Value, Raman Half-Width)

The Raman R value of the carbonaceous material is the value measured using argon ion laser Raman spectroscopy and is ordinarily 0.01 or more and is preferably 0.03 or more and more preferably 0.1 or more and is ordinarily 1.5 or less and is preferably 1.2 or less, even more preferably 1 or less, and particularly preferably 0.5 or less.

The Raman half-width of the carbonaceous material around 1580 $cm^{-1}$ is not particularly limited, and is ordinarily 10 $cm^{-1}$ or more, preferably 15 $cm^{-1}$ or more, and ordinarily 100 $cm^{-1}$ or less, preferably 80 $cm^{-1}$ or less, even more preferably 60 $cm^{-1}$ or less and particularly preferably 40 $cm^{-1}$ or less.

The Raman R value and the Raman half-value width are indices of the crystallinity of the carbonaceous material surface, and the carbonaceous material preferably has a suitable crystallinity from a chemical stability perspective and preferably has a crystallinity to a degree that the interlayer sites that intercalate the Li are not extinguished by charge/discharge, i.e., the charge acceptance does not decline. If the density of the negative electrode is to be increased through pressing after coating onto the current collector, the crystals will become readily oriented in a direction parallel to the electrode plate; it is therefore preferable to take that into consideration. When the Raman R value or the Raman half-value width is in the range indicated above, a favorable film can be formed on the negative electrode surface and the storage characteristics and/or cycle characteristics and load characteristics can be improved and the gas generation and decline in efficiency accompanying reactions with the non-aqueous electrolyte solution can be inhibited.

The Raman spectrum is measured using a Raman spectrometer (Raman spectrometer, by JASCO) by filling a sample, through natural dropping, into a measurement cell, and causing the cell to rotate within a plane perpendicular to an argon-ion laser beam while irradiating the sample surface in the cell with the laser beam. Regarding obtained Raman spectrum, the intensity Ia of peak PA around 1580 $cm^{-1}$ and the intensity Ib of peak PB around 1360 $cm^{-1}$ are measured, and the intensity ratio R (R=Ib/Ia) is calculated. The Raman R value calculated in the above-described measurement is defined as the Raman R value of the carbonaceous material of the present invention. The half-width of the peak $P_A$ around 1580 $cm^{-1}$ of the obtained Raman spectrum is measured, and the measured half-width is defined as the Raman half-width of the carbonaceous material of the present invention.

The conditions of Raman measurement are as follows.
Argon-ion laser wavelength 514.5 nm
Laser power on sample: 15 to 25 mW
Resolution: 10 to 20 $cm^{-1}$
Measurement range: 1100 $cm^{-1}$ to 1730 $cm^{-1}$
Raman R value, Raman half-width analysis: background processing
Smoothing: simple average, 5-point convolution (BET Specific Surface Area)

The BET specific surface area of the carbonaceous material is the value of the specific surface area measured using the BET method and is ordinarily 0.1 $m^2 \cdot g^{-1}$ or more and is preferably 0.7 $m^2 \cdot g^{-1}$ or more, more preferably 1.0 $m^2 \cdot g^{-1}$ or more, and particularly preferably 1.5 $m^2 \cdot g^{-1}$ or more and is ordinarily 100 $m^2 \cdot g^{-1}$ or less and is preferably 25 $m^2 \cdot g^{-1}$ or less, more preferably 15 $m^2 \cdot g^{-1}$ or less, and particularly preferably 10 $m^2 \cdot g^{-1}$ or less.

When the value of the BET specific surface area is in the indicated range, lithium precipitation to the electrode surface can be inhibited and gas generation due to reactions with the non-aqueous electrolyte solution can also be inhibited.

The measurement of the specific surface area by the BET method is carried out using a surface area analyzer (a fully automatic surface area analyzer from Ohkura Riken Co., Ltd.) by subjecting the sample to a preliminary drying for 15 minutes at 350° C. under a nitrogen gas current and carrying out the BET nitrogen adsorption single-point method using the gas flow technique and using a nitrogen-helium mixed gas precisely adjusted to provide a value of 0.3 for the relative pressure of the nitrogen versus atmospheric pressure. The specific surface area determined according to the above-described measurement is defined as the BET specific surface area of the carbonaceous material in the present invention.

(The Circularity)

The circularity measured as an index of the spherical shape of the carbonaceous material preferably falls in the range given below. The circularity is defined as "circularity= (length of the circumference of the equivalent circle having the same area as the particle projected shape)/(length of the actual circumference of the particle projected shape)", and a circularity of 1 indicates a theoretically perfect sphere.

A circularity for the carbonaceous material particles with a diameter in the 3 to 40 μm range closer to 1 is more desirable, and is preferably 0.1 or more, more preferably 0.5 or more, even more preferably 0.8 or more, still more preferably 0.85 or more, and particularly preferably 0.9 or more.

With regard to the high current density charge/discharge characteristics, at higher circularity values the packing behavior is better and the particle-to-particle resistance is thus kept lower and as a consequence the high current density charge/discharge characteristics are better. Accordingly, a higher circularity as in the range indicated above is preferred.

The circularity is measured using a flow-type particle image analyzer (FPIA from the Sysmex Corporation). Specifically, approximately 0.2 g of the sample is dispersed in a 0.2 mass % aqueous solution (approximately 50 mL) of the surfactant polyoxyethylene(20) sorbitan monolaurate and is exposed for 1 minute to 28 kHz ultrasound at an output of 60 W; the detection range is then set to 0.6 to 400 μm; and measurement is carried out on the particles in the 3 to 40 μm diameter range. The circularity determined by this measurement is defined as the circularity of the carbonaceous material in the present invention.

There are no particular limitations on methods for increasing the circularity, but a carbonaceous material made into a spherical shape by the execution of a sphericizing treatment is preferred because the shape of the interparticle voids is then ordered when this is made into the electrode body. The sphericizing treatment can be exemplified by the following: methods in which the spherical shape is mechanically approximated through the application of shear force or compressive force; mechanical/physical treatment methods in which a plurality of finely divided particles are granulated using a binder or the attachment forces intrinsic to the particles themselves.

(The Tap Density)

The tap density of the carbonaceous material is ordinarily 0.1 g·cm$^{-3}$ or more and is preferably 0.5 g·cm$^{-3}$ or more, more preferably 0.7 g·cm$^{-3}$ or more, and particularly preferably 1 g·cm$^{-3}$ or more. It is preferably 2 g·cm$^{-3}$ or less, more preferably 1.8 g·cm$^{-3}$ or less, and particularly preferably 1.6 g·cm$^{-3}$ or less. The battery capacity can be ensured and the interparticle resistance can be kept from increasing when the tap density is in the indicated range.

The tap density is measured as follows: the sample is passed through a sieve with an aperture of 300 µm down into a 20 cm$^3$ tapping cell and the sample is filled to the upper end surface of the cell; using a powder density analyzer (for example, a Tap Denser from Seishin Enterprise Co., Ltd.), 1000 taps with a stroke length of 10 mm are then administered; and the tap density is calculated from the volume and the mass of the sample at this point. The tap density calculated according to the above measurement is defined as the tap density of the carbonaceous material in the present invention.

(Orientation Ratio)

The orientation ratio of the carbonaceous material is ordinarily 0.005 or more and is preferably 0.01 or more and more preferably 0.015 or more and is ordinarily 0.67 or less. Excellent high-density charge/discharge characteristics can be ensured when the orientation ratio is in the indicated range. The upper limit of the indicated range is the theoretical upper limit value of the orientation ratio of the carbonaceous material.

The orientation ratio is measured by X-ray diffraction after pressure-molding of a sample. A sample of 0.47 g is stuffed into a 17 mm-diameter molding machine, and is compressed at 58.8 MNm$^{-2}$, to yield a molded product that is then measured by X-ray diffraction by being set flush with the surface of a measurement sample holder, using clay. The ratio represented by (110) diffraction peak intensity/(004) diffraction peak intensity is calculated from the peak intensities of (110) diffraction and (004) diffraction for carbon. The orientation ratio as calculated in the above-described measurement is defined as the orientation ratio of the carbonaceous material in the present invention.

The X-ray diffraction measurement conditions are as follows. Herein, "2θ" denotes the diffraction angle.

Target: Cu (Kα rays) graphite monochromator
Slit:
   Divergent slit=0.5 degrees
   Light-receiving slit=0.15 mm
   Scattering slit=0.5 degrees
Measurement range and step angle/measurement time:

(110) plane: 75 degrees≤2θ≤80 degrees 1 degree/60 seconds (004) plane: 52 degrees≤2θ≤57 degrees 1 degree/60 seconds (Aspect Ratio (Powder))

The aspect ratio of the carbonaceous material is ordinarily 1 or more, and ordinarily 10 or less, preferably 8 or less and even more preferably 5 or less. When this range is obeyed, streaking during plate fabrication can be inhibited and a more uniform coating is made possible and as a consequence excellent high current density charge/discharge characteristics can be ensured. The lower limit of the indicated range is a theoretical lower limit value of the aspect ratio of the carbonaceous material.

The aspect ratio is measured through observation of enlarged scanning electron micrographs (SEM). 50 arbitrary graphite particles fixed to the edge face of metal of thickness no greater than 50 µm are selected. The particles are observed each three-dimensionally through rotation and tilting of a stage to which the sample is fixed. The longest length A, and the shortest length B perpendicular thereto, of each carbonaceous material particle, are measured, and the average value of A/B is calculated. The aspect ratio (A/B) calculated in the above-described measurement is defined as the aspect ratio of the carbonaceous material in the present invention.

<Configuration and Production Method of the Negative Electrode>

Any known method can be used to produce the negative electrode, so long as the effect of the present invention is not significantly impaired. For instance, the binder, the solvent and, as the case may require, a thickener, a conductive material, a filler and the like, are added to the negative electrode active material, to obtain a slurry that is then applied onto a current collector and is dried, followed by pressing. The negative electrode can be formed thereby.

In a case where an alloy-based material is used, a method is resorted to wherein a thin film layer (negative electrode active material layer) that contains the above-described negative electrode active material is formed by vapor deposition, sputtering, plating or the like.

(Current Collector)

Any known current collector can be used as the current collector that holds the negative electrode active material. Examples of the metallic material of the current collector of the negative electrode include, for instance, aluminum, copper, nickel, stainless steel, nickel-plated steel or the like, and preferably copper, in terms of cost and ease of processing.

In a case where the current collector is a metallic material, the current collector may be shaped, for instance, as a metal foil, metal cylinder, metal coil, metal plate, metal thin film, expanded metal, punched metal, foamed metal or the like. Preferably, the current collector is a metal thin film, more preferably a copper foil, and even more preferably a rolled copper foil obtained by rolling or an electrolytic copper foil obtained by electrolysis, and any of which can be used as the current collector.

The thickness of the current collector is ordinarily 1 µm or more, preferably 5 µm or more, and ordinarily 100 µm or less, preferably 50 µm or less in terms of securing battery capacity and handling.

(Ratio Between the Thicknesses of the Current Collector and the Negative Electrode Active Material Layer)

The ratio between the thicknesses of the current collector and the negative electrode active material layer is not particularly limited, but the value of "(thickness of the negative electrode active material layer on one side immediately prior to injection of non-aqueous electrolyte solution)/(current collector thickness)" is preferably 150 or less, more preferably 20 or less, and particularly preferably 10 or less, and preferably 0.1 or more, more preferably 0.4 or more and particularly preferably 1 or more. When the thickness ratio of the negative electrode active material layer to the current collector is in the indicated range, the battery capacity can be maintained and heat generation by the current collector during high current density charge/discharge can also be restrained.

(The Binder)

The binder that binds the negative electrode active material is not particularly limited, so long as it is a stable material towards the non-aqueous electrolyte solution and towards the solvent used during the production of the electrodes.

Specific examples include resin-based polymers such as polyethylene, polypropylene, polyethylene terephthalate, polymethyl methacrylate, aromatic polyamide, polyimide, cellulose, nitrocellulose or the like; rubber-like polymers such as SBR (styrene-butadiene rubber), isoprene rubber, butadiene rubber, fluororubber, NBR (acrylonitrile-butadiene rubber), ethylene-propylene rubber or the like; styrene-butadiene-styrene block copolymers or hydrogenated products thereof; thermoplastic elastomeric polymers such as EPDM (ethylene-propylene-diene terpolymer), styrene-ethylene-butadiene-styrene copolymers, styrene-isoprene-styrene block copolymers, or hydrogenated products thereof; soft resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride, polytetrafluoroethylene, fluorinated polyvinylidene fluoride, polytetrafluoroethylene-ethylene copolymers and the like; and polymer compositions having ionic conductivity towards alkali metal ions (in particular, lithium ions). One of the foregoing may be used alone, or any desired combination of two or more thereof in any desired proportion may be used.

The percentage for the binder with respect to the negative electrode active material is preferably 0.1 mass, or more, more preferably 0.5 mass % or more, and particularly preferably 0.6 mass % or more and is preferably 20 mass % or less, more preferably 15 mass % or less, even more preferably 10 mass % or less, and particularly preferably 8 mass % or less. The battery capacity and the strength of the negative electrode can be satisfactorily ensured when the percentage for the binder with respect to the negative electrode active material is in the indicated range.

When, in particular, the main component is a rubbery polymer typified by SBR, the proportion of the binder in the negative electrode active material is ordinarily 0.1 mass % or more and is preferably 0.5 mass % or more and more preferably 0.6 mass % or more and is ordinarily 5 masse or less and is preferably 3 mass % or less and more preferably 2 mass % or less.

When the main component is a fluoropolymer typified by polyvinylidene fluoride, the proportion of the binder in the negative electrode active material is ordinarily 1 wt or more, preferably 2 wt % or more, even more preferably 3 wt % or more, and ordinarily 15 wt % or less, preferably 10 wt % or less and even more preferably 8 wt % or less.

(Slurry-Forming Solvent)

The solvent used for forming the slurry is not particularly limited, and may be any aqueous solvent or non-aqueous solvent, provided that the solvent can dissolve or disperse the negative electrode active material, the binder, as well as a thickener and conductive material that are used as the case may require.

Examples of aqueous solvents include, for instance, water and alcohol. Examples of non-aqueous solvents include, for instance, N-methyl pyrrolidone (NMP), dimethyl formamide, dimethyl acetamide, methyl ethyl ketone, cyclohexanone, methyl acetate, methyl acrylate, diethyl triamine, N,N-dimethylaminopropyl amine, tetrahydrofuran (THF), toluene, acetone, diethyl ether, hexamethylphosphoric amide, dimethyl sulfoxide, benzene, xylene, quinoline, pyridine, methyl naphthalene, hexane or the like.

When, in particular, an aqueous solvent is used, it is preferable to add a dispersant or the like in conjunction with the thickener, and to form a slurry using a latex of SBR or the like. One of these solvents may be used alone, or any desired combination of two or more thereof in any desired proportion may be used.

(Thickener)

A thickener is generally used in order to adjust the viscosity of the slurry. The thickener is not particularly limited, and specific examples include, for instance, carboxymethyl cellulose, methyl cellulose, hydroxymethyl cellulose, ethyl cellulose, polyvinyl alcohol, starch oxide, phosphorylated starch, casein, as well as salts thereof. One of the foregoing may be used alone, or any desired combination of two or more thereof in any desired proportion may be used.

When a thickener is used, the proportion of the thickener in the negative electrode active material is ordinarily 0.1 mass % or more and is preferably 0.5 mass % or more and more preferably 0.6 mass % or more and is ordinarily 5 masse or less and is preferably 3 masses or less and more preferably 2 mass % or less. When the proportion of the thickener in the negative electrode active material is in the indicated range, a reduction in the battery capacity and an increase in the resistance can be suppressed while an excellent coating behavior can be secured at the same time.

(Electrode Density)

There are no particular limitations on the electrode structure when the negative electrode active material is converted into an electrode, and the density of the negative electrode active material present on the current collector is preferably 1 g·cm$^{-3}$ or more, more preferably 1.2 g·cm$^{-3}$ or more, and particularly preferably 1.3 g·cm$^{-3}$ or more and is preferably 2.2 g·cm$^{-3}$ or less, more preferably 2.1 g·cm$^{-3}$ or less, even more preferably 2.0 g·cm$^{-3}$ or less, and particularly preferably 1.9 g·cm$^{-3}$ or less. If the density of the negative electrode active material that is present on the current collector lies within the indicated range, negative electrode active material particles can be prevented from breaking, allowing suppression of an increase in initial irreversible capacity and deterioration of the high-current density charge-discharge characteristic on account of lower permeability of the non-aqueous electrolyte solution in the vicinity of the interface of the current collector/negative electrode active material, as well as suppression of drops in battery capacity and an increase in registance.

(Thickness of the Negative Electrode Plate)

The thickness of the negative electrode plate is designed in accordance with the positive electrode plate that is used, and is not particularly limited; however, the thickness of mixture layer resulting from subtracting the thickness of the metal foil serving as a core material, is ordinarily 15 μm or more, preferably 20 μm or more, more preferably 30 μm or more, and ordinarily 300 μm or less, preferably 280 μm or less, and more preferably 250 μm or less.

(Surface Cover of the Negative Electrode Plate)

A surface cover may be used in which a substance having composition different from that of the surface of the negative electrode plate is deposited on the surface of the negative electrode plate. Examples of surface deposition substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; and carbonates such as lithium carbonate, calcium carbonate, magnesium carbonate and the like.

2-2. Positive Electrode
<Positive Electrode Active Material>

Positive electrode active materials that are used in the positive electrode are explained next.

(Composition)

The positive electrode active material is not particularly limited, so long as it is capable of electrochemically absorbing and releasing lithium ions, but, for instance, is preferably a substance that contains lithium and at least one transition metal. Specific examples include, for instance, lithium-transition metal complex oxides, lithium-containing transition metal phosphate compounds and the like.

The transition metal in the lithium transition metal composite oxide is preferably V, Ti, Cr, Mn, Fe, Co, Ni, Cu, and so forth. Specific examples are lithium cobalt composite oxides such as $LiCoO_2$; lithium nickel composite oxides such as $LiNiO_2$; lithium manganese composite oxides such as $LiMnO_2$, $LiMn_2O_4$, and $Li_2MnO_4$; and lithium transition metal composite oxides provided by substituting a portion of the majority transition metal atoms in the foregoing lithium transition metal composite oxides with another element, e.g., Na, K, B, F, Al, Ti, V, Cr, Mn, Fe, Co, Li, Ni, Cu, Zn, Mg, Ga, Zr, Si, Nb, Mo, Sn, W, and so forth.

Specific examples of the substituted lithium transition metal composite oxides are $LiNi_{0.5}Mn_{0.3}O_2$, $LiNi_{0.5}Mn_{0.5}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$, and $LiMn_{1.5}Ni_{0.5}O_4$.

The transition metal in the lithium-containing transition metal phosphate compound is preferably V, Ti, Cr, Mn, Fe, Co, Ni, Cu, and so forth, and the lithium-containing transition metal phosphate compound can be specifically exemplified by iron phosphates such as $LiFePO_4$, $Li_3Fe_2(PO_4)_3$, and $LiFeP_2O_7$; cobalt phosphates such as $LiCoPO_4$; and lithium-containing transition metal phosphate compounds provided by substituting a portion of the majority transition metal atoms in the foregoing lithium-containing transition metal phosphate compounds with another element, e.g., Al, Ti, V, Cr, Mn, Fe, Co, Li, Ni, Cu, Zn, Mg, Ga, Zr, Nb, Si and so forth.

The incorporation of lithium phosphate in the positive electrode active material is preferred because this improves the continuous charging characteristics. While there is no limitation on the use of the lithium phosphate, it is preferably used by mixing the lithium phosphate with the previously described positive electrode active material. The amount of lithium phosphate used, expressed with respect to the total of the previously described positive electrode active material and the lithium phosphate, is preferably 0.1 mass % or more, more preferably 0.3 mass % or more, and even more preferably 0.5 mass % or more and is preferably 10 mass % or less, more preferably 8 mass % or less, and even more preferably 5 mass or less.

(Surface Cover)

A surface cover may be used in which a substance having composition different from that of the surface of the positive electrode active material (hereafter referred to as "surface deposition substance" as appropriate) is deposited on the surface of the positive electrode active material. Examples of surface deposition substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; carbonates such as lithium carbonate, calcium carbonate, magnesium carbonate or the like; and carbons.

The surface deposition substances may be deposited on the positive electrode active material surface in accordance with a method that involves, for instance, dissolving or suspending the surface deposition substance in a solvent, and causing the surface deposition substance to be impregnated into/added to the positive electrode active material, followed by drying, or a method that involves dissolving or suspending a surface deposition substance precursor in a solvent, and causing the precursor to be impregnated into/added to the positive electrode active material, followed by heating or the like to elicit a reaction; or a method that involves addition of a surface deposition substance precursor to a positive electrode active material precursor, with simultaneous firing of the foregoing. In a case where carbon is to be deposited, a method may be resorted to wherein a carbonaceous substance, for instance in the form of activated carbon or the like, is mechanically deposited at a later time.

The amount of the surface-bound substance used, expressed as the mass with respect to the positive electrode active material, is preferably 0.1 ppm or more, more preferably 1 ppm or more, and even more preferably 10 ppm or more and is preferably 20% or less, more preferably 10% or less, and even more preferably 5% or less. The surface deposition substance allows a suppressing effect on oxidation reactions of the electrolyte solution at the positive electrode active material surface, and allows enhancing battery life. However, the effect elicited by the surface deposition substance fails to be sufficiently brought about if the deposition amount is excessively low, while if the deposition amount is excessively large, interface resistance may increase as a result of hindered traffic of lithium ions.

In the present invention, a positive electrode active material having a surface on which a substance of a composition different from that of the positive electrode active material is deposited, is included among "positive electrode active material".

(The Shape)

The shape of the positive electrode active material particles may be the lump shape, polyhedral shape, spherical shape, oval shape, plate shape, needle shape, column shape, and so forth, as heretofore used. In addition, the primary particles may aggregate to form secondary particles.

(The Tap Density)

The tap density of the positive electrode active material is preferably 0.5 g/cm$^3$ or more, more preferably 0.8 g/cm$^3$ or more, and even more preferably 1.0 g/cm$^3$ or more. When the tap density of the positive electrode active material is in the indicated range, the amount of dispersion medium required during formation of the positive electrode active material layer can be kept down and the required amount of the electroconductive material and/or binder can also be kept down and as a result the packing ratio of the positive electrode active material and the battery capacity can be ensured.

The use of a composite oxide powder with a high tap density enables the formation of a high-density positive electrode active material layer. A larger tap density is thus generally more preferred, and, while there is no particular upper limit on this tap density, it is preferably 4.0 g/cm$^3$ or less, more preferably 3.7 g/cm$^3$ or less, and even more preferably 3.5 g/cm$^3$ or less. The load characteristics can be kept from declining in this range.

The tap density is determined in the present invention as the powder packing density (tap density) in g/cc when 5 to 10 g of the positive electrode active material powder is introduced into a 10-mL glass graduated cylinder and 200 taps with a stroke of approximately 20 mm are administered. The tap density determined according to the above measurement is defined as the tap density of the positive electrode active material in the present invention.

(Median Diameter d50)

The median diameter d50 of the particles of the positive electrode active material (the secondary particle diameter when the primary particles undergo aggregation to form secondary particles) is preferably 0.3 µm or more, more preferably 0.5 µm or more, even more preferably 0.8 µm or more, and most preferably 1.0 µm or more and is preferably 30 µm or less, more preferably 27 µm or less, even more preferably 25 µm or less, and most preferably 22 µm or less. In the indicated range, a high tap density product is obtained and a reduction in the battery properties can be suppressed, and, in addition, problems such as streaking and so forth can be prevented during fabrication of the battery positive electrode, i.e., when the active material and electroconductive material, binder, and so forth are slurried with a solvent and coated in thin film form. Fillability during production of the positive electrode can be further enhanced by mixing two or more types of positive electrode active materials having different median diameters d50.

In the present invention, the median diameter d50 is measured using a known laser diffraction/scattering particle size measurement instrument. When an LA-920 from Horiba, Ltd. is used as the particle distribution analyzer, a 0.1 masse aqueous solution of sodium hexametaphosphate is used as the dispersion medium used in the measurement; ultrasound dispersion is performed for 5 minutes; and the measurement refractive index is set to 1.24 and the measurement is performed.

(Average Primary Particle Size)

In those instances in which the primary particles undergo aggregation to form secondary particles, the average primary particle diameter of the positive electrode active material is preferably 0.05 µm or more, more preferably 0.1 µm or more, and even more preferably 0.2 µm or more and is preferably 5 µm or less, more preferably 4 µm or less, even more preferably 3 µm or less, and most preferably 2 µm or less. Within the indicated range, the powder packing behavior and specific surface area are secured and a decline in the battery performance can be suppressed, and, in addition, an appropriate crystallinity is obtained and due to this the charge/discharge reversibility can be ensured.

In the present invention, the primary particle size is measured through observation using a scanning electron microscope (SEM). Specifically, the largest value of a section by a left-right boundary of primary particles with respect to a straight line in the horizontal direction is determined in micrographs at a 10000× magnification, for 50 arbitrary primary particles. The average of the values is calculated then as the primary particle size.

(BET Specific Surface Area)

The BET specific surface area of the positive electrode active material is preferably 0.1 $m^2/g$ or more, more preferably 0.2 $m^2/g$ or more, and even more preferably 0.3 $m^2/g$ or more and is preferably 50 $m^2/g$ or less, more preferably 40 $m^2/g$ or less, and even more preferably 30 $m^2/g$ or less. When the BET specific surface area is in the indicated range, the battery performance can be ensured, and, in addition, an excellent coating behavior by the positive electrode active material can be maintained.

The determination of specific surface area in the present invention by the BET method is made with a surface area analyzer (for example, a fully automatic surface area analyzer from Ohkura Riken Co., Ltd.) by preliminarily drying a sample at 150° C. for 30 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmospheric pressure. The specific surface area determined through this measurement is defined as the BET specific surface area of the positive electrode active material in the present invention.

(The Method of Producing the Positive Electrode Active Material)

With regard to the method for producing the positive electrode active material, general methods may be used for the methods of producing the inorganic compounds. Various methods may be contemplated in particular for producing a spherical to oval active material. An example here are methods in which the transition metal starting material is dissolved or pulverized and dispersed in a solvent, e.g., water; the pH is adjusted while stirring and a spherical precursor is produced and recovered; this is dried as necessary; an Li source, e.g., LiOH, $Li_2CO_3$, $LiNO_3$, and so forth, is subsequently added; and the active material is then obtained by high-temperature calcination.

To produce the positive electrode, a positive electrode active material as described in the foregoing may be used by itself or one or more with a different composition may be co-used therewith in any combination or proportion. Preferred combinations in this case are combinations of $LiCoO_2$ with $LiMn_2O_4$ or a composite oxide (for example, $LiNi_{0.33}Co_{0.33}Mn_{0.33}O_2$) provided by replacing a portion of the Mn in $LiMn_2O_4$ with, for example, another transition metal, and combinations with $LiCoO_2$ or a composite oxide provided by replacing a portion of the Co in $LiCoO_2$ with, for example, another transition metal.

<Configuration and Production Method of the Positive Electrode>

The configuration of the positive electrode is explained next. In the present invention, the positive electrode is produced by forming, onto a current collector a positive electrode active material layer that contains the positive electrode active material and a binder. The positive electrode that uses a positive electrode active material can be produced in accordance with ordinary methods. Specifically, the positive electrode active material and the binder, and, as the case may require, a conductive material, a thickener and the like, are dry-mixed to yield a sheet-like mixture that is then pressure-bonded against a positive electrode current collector; alternatively, these materials are dissolved or dispersed in a liquid medium, to yield a slurry that is then coated onto a positive electrode current collector, followed by drying, to form a positive electrode active material layer on the current collector. The positive electrode can be obtained thereby.

The content of positive electrode active material in the positive electrode active material layer is preferably 80 wt % or more, more preferably 82 wt or more, and particularly preferably 84 wt % or more. Further, the content is preferably 99 wt % or less, and more preferably 98 wt % or less. In the indicated range, the electrical capacity of the positive electrode active material in the positive electrode active material layer can be ensured, and, in addition, the strength of the positive electrode can be maintained.

In order to increase the packing density of the positive electrode active material, the positive electrode active material layer that is obtained by coating and drying is preferably compacted using a hand press, a roller press or the like. The density of the positive electrode active material layer is in the range from preferably 1.5 g/cm$^3$ or more, more preferably 2 g/cm$^3$ or more, and even more preferably 2.2 g/cm$^3$ or more to preferably 5 g/cm$^3$ or less, more preferably 4.5 g/cm$^3$ or less, and even more preferably 4 g/cm$^3$ or less. In this range, excellent charge/discharge characteristics are obtained, and, in addition, an increase in the electrical resistance can be suppressed.

(Conductive Material)

Any known conductive materials can be used as the conductive material. Specific examples include, for instance, metallic materials such as copper, nickel or the like; graphite such as natural graphite, artificial graphite or the like; carbon black such as acetylene black; and carbon materials such as amorphous carbon, for instance needle coke or the like. One of the foregoing may be used alone, or any desired combination of two or more thereof in any desired proportion may be used. The content of conductive material in the positive electrode active material layer is ordinarily 0.01 wt % or more, preferably 0.1 wt % or more, more preferably 1 wt % or more and, ordinarily 50 wt % or less, preferably 30 wt % or less, more preferably 15 wt % or less. A satisfactory electrical conductivity and battery capacity can be ensured in the indicated range.

(Binder)

The binder used to produce of the positive electrode active material layer is not particularly limited, and may be any material that is dissolved or dispersed in the liquid medium that is used during electrode production, in the case of a coating method. Specific examples include, for instance, resin-based polymers such as polyethylene, polypropylene, polyethylene terephthalate, polymethyl methacrylate, polyimide, aromatic polyamide, cellulose, nitrocellulose or the like; rubber-like polymers such as SBR (styrene-butadiene rubber), NBR (acrylonitrile-butadiene rubber), fluororubber, isoprene rubber, butadiene rubber, ethylene-propylene rubber or the like; thermoplastic elastomeric polymers such as styrene-butadiene-styrene block copolymers and hydrogenated products thereof, EPDM (ethylene-propylene-diene terpolymer), styrene-ethylene-butadiene-ethylene copolymers, styrene-isoprene-styrene block copolymers, or hydrogenated products thereof; soft resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride (PVdF), polytetrafluoroethylene, fluorinated polyvinylidene fluoride, polytetrafluoroethylene-ethylene copolymers and the like; and polymer compositions having ionic conductivity towards alkali metal ions (in particular, lithium ions). One of these substances may be used alone, or any desired combination of two or more thereof in any desired proportion may be used.

The proportion of the binder in the positive electrode active material layer is ordinarily 0.1 mass or more and is preferably 1 mass % or more and more preferably 1.5 mass % or more and is ordinarily 80 mass s or less and is preferably 60 mass % or less, more preferably 40 mass % or less, and most preferably 10 mass % or less. When the proportion of the binder is too low, the binder may fail to sufficiently hold the positive electrode active material, the mechanical strength of the positive electrode may be insufficient, and battery performance in terms of cycle characteristic may be poorer. When the proportion of binder is excessively high, battery capacity and conduction may decrease.

(Slurry-Forming Solvent)

The solvent used for forming the slurry is not particularly limited, and may be any aqueous solvent or non-aqueous solvent, provided that the solvent can dissolve or disperse the positive electrode active material, the conductive material, the binder, as well as a thickener that is used as the case may require. The aqueous solvent can be exemplified by water and water+alcohol mixed media. The organic solvent can be exemplified by aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethyl ether, propylene oxide, and tetrahydrofuran (THF); amides such as N-methylpyrrolidone (NMP), dimethylformamide, and dimethylacetamide; and aprotic polar solvents such as hexamethylphosphoramide and dimethyl sulfoxide.

When an aqueous medium is used, in particular, a slurry is preferably formed using a thickener and a latex of styrene-butadiene rubber (SBR) or the like. A thickener is generally used in order to adjust the viscosity of the slurry. The thickener is not particularly limited, and specific examples include, for instance, carboxymethyl cellulose, methyl cellulose, hydroxymethyl cellulose, ethyl cellulose, polyvinyl alcohol, starch oxide, phosphorylated starch, casein, as well as salts thereof. One of the foregoing may be used alone, or any desired combination of two or more thereof in any desired proportion may be used. In those cases in which a thickener is also added, the proportion of the thickener in the active material is in the range from 0.1 mass % or more and preferably 0.2 mass % or more and more preferably 0.3 mass or more to 5 mass % or less and preferably 3 mass % or less and more preferably 2 masse or less. In the indicated range, a reduction in the battery capacity and an increase in the resistance can be suppressed while an excellent coating behavior can be obtained at the same time.

(Current Collector)

The material of the positive electrode current collector is not particularly limited, and any known material can be used. Specific examples include, for instance, metallic materials such as aluminum, stainless steel, nickel plating, titanium, tantalum or the like; and carbon materials such as carbon cloth, carbon paper or the like. Aluminum is particularly preferred from among the above metallic materials.

In a case where the current collector is a metallic material, the current collector may be shaped, for instance, as a metal foil, metal cylinder, metal coil, metal plate, metal thin film, expanded metal, punched metal, foamed metal or the like. In the case of a carbon material, the current collector may be shaped as a carbon plate, carbon thin film, carbon cylinder or the like. A metal thin film is preferred among the foregoing. The thin film may be appropriately formed as a mesh. The thickness of the thin film may be any thickness, but, in terms of strength and handling as a current collector, is ordinarily 1 μm or more, preferably 3 μm or more, more preferably 5 μm or more, and is ordinarily 1 mm or less, preferably 100 μm or less and more preferably 50 μm or less.

Preferably, a conductive aid is coated onto the surface of the current collector, in terms of lowering the electron contact resistance between the current collector and the positive electrode active material layer. Examples of conductive aids include, for instance, carbon and noble metals such as gold, platinum, silver or the like.

The ratio between the thickness of the positive electrode active material layer and the thickness of the current collector is not particularly limited, but the value of (thickness of the positive electrode active material layer on one side immediately prior to immersion in the electrolyte solution)/(thickness of the current collector) is in the range from preferably 20 or less, more preferably 15 or less, and most preferably 10 or less to preferably 0.5 or more, more preferably 0.8 or more, and most preferably 1 or more. Above this range, the current collector may generate heat by Joule heating during high current density charge/discharge. When this range is obeyed, heat generation by the current collector during high current density charge/discharge can be suppressed and the battery capacity can be ensured.

(The Electrode Area)

In a case where the non-aqueous electrolyte solution according to the invention is used, in terms of increasing the stability during high outputs and high temperatures, the area of the positive electrode active material layer is preferably made large relative to the exterior area of the outer case of the battery. In specific terms, the sum total of the electrode area of the positive electrode is, as the area ratio, preferably 15 times or more and more preferably 40 times or more that of the surface area of the outside of the secondary battery.

The outer surface area of the outer case refers, in the case of a closed-bottom prismatic configuration, to the total area determined by calculation from the length, width, and thickness dimensions of the case part in which the electricity-producing element is packed, excluding the projections for the terminals. In the case of a closed-bottom cylindrical configuration, it is the geometric surface area for the approximation as a cylinder of the case part in which the electricity-producing element is packed, excluding the projections for the terminals.

The sum total of the electrode area of the positive electrode is the geometric surface area of the positive electrode mixture layer that faces the mixture layer containing the negative electrode active material, and, for a structure in which a positive electrode mixture layer is formed on both sides of an intervening current collector foil, it refers to the total of the areas separately calculated for each side.

(Thickness of the Positive Electrode Plate)

The thickness of the positive electrode plate is not particularly limited. In terms of high capacity and high output, the thickness of a mixture layer resulting from subtracting the thickness of the metal foil serving as a core material with respect to one face of the current collector is preferably 10 µm or more, more preferably 20 µm or more, and preferably 500 µm or less and more preferably 450 µm or less.

2-3. Separator

Ordinarily, a separator is interposed between the positive electrode and the negative electrode, in order to prevent short circuiting. Ordinarily, the non-aqueous electrolyte solution of the present invention is used by being impregnated into such a separator.

The material and shape of the separator are not particularly limited, and any known materials and shapes may be used, so long as the effect of the present invention is not significantly impaired. Among the foregoing there are preferably used, for instance, a resin, glass fibers, inorganic materials or the like that are formed out of a stable material towards the non-aqueous electrolyte solution of the present invention, in the form of a porous sheet or nonwoven fabric-like member having excellent liquid retention.

Examples of materials of resin and glass-fiber separators include, for instance, polyolefins such as polyethylene or polypropylene, aromatic polyamide, polytetrafluoroethylene, polyether sulfone, glass filters and the like. Preferred among the foregoing are glass filters and polyolefins, and even more preferably polyolefins. One of these materials may be used alone, or any desired combination of two or more thereof in any desired proportion may be used.

The separator may have any desired thickness, but the thickness is ordinarily 1 µm or more, preferably 5 µm or more, more preferably 8 µm or more, and ordinarily 50 µm or less, preferably 40 µm or less and more preferably 30 µm or less. In the indicated range, the insulating character and mechanical strength can be ensured and at the same time the energy density and battery performance, e.g., the rate characteristics and so forth, can also be ensured.

When using a porous separator such as a porous sheet or a nonwoven fabric, the separator may have any desired porosity, but the porosity is ordinarily 20% or more, preferably 35% or more, and even more preferably 45% or more, and ordinarily 90% or less, preferably 85% or less and even more preferably 75% or less. When the porosity is in the indicated range, the insulating character and mechanical strength can be ensured and at the same time the film resistance can be restrained and excellent rate characteristics can be obtained.

The average pore diameter of the separator may also be freely selected, but is ordinarily 0.5 µm or less and is preferably 0.2 µm or less and is ordinarily 0.05 µm or more. When the average pore diameter exceeds the indicated range, short circuiting are likely to occur. When the average pore diameter is in the indicated range, short circuiting is prevented while the film resistance can be restrained and excellent rate characteristics can be obtained. The inorganic material, for instance, an oxide such as alumina or silicon dioxide, a nitride such as aluminum nitride or silicon nitride, or a sulfate such as barium sulfate or calcium sulfate is used in the form of particles or fibers.

Which respect to form, a separator of a thin film form may be used, such as a nonwoven fabric, woven fabric, or microporous film. Suitable ones of a thin film form have a pore diameter of 0.01 to 1 µm and a thickness of 5-50 µm. Besides such a separator in an independent thin film form, use can be made of a separator obtained by forming a composite porous layer containing particles of the inorganic material on a surface layer of the positive electrode and/or negative electrode with a resinous binder. Examples of such separators include a porous layer formed by fixing alumina particles having a 90% particle diameter smaller than 1 µm on both sides of the positive electrode with a fluororesin as a binder.

2-4. Battery Design

<Electrode Group>

The electrode group may be either of: one having a multilayer structure in which the positive-electrode plate and negative-electrode plate described above have been superposed through the separator described above; and one having a wound structure in which the positive-electrode plate and negative-electrode plate described above have been spirally wound through the separator described above. The proportion of the volume of the electrode group to the internal volume of the battery (hereinafter referred to as electrode group proportion) is generally 40% or higher, preferably 50% or higher, and is generally 90% or lower, preferably 80% or lower.

When the electrode group proportion is in the indicated range, the battery capacity can be ensured, and, in addition, the decline in properties, e.g., the repetitive charge/discharge performance and high-temperature storability, associated with a rise in the internal pressure can be suppressed and the operation of the gas discharge valve can also be prevented.

<Current Collection Structure>

The current collector structure is not particularly limited. However, it is preferred to employ a structure reduced in the resistance of wiring parts and joint parts.

In the case of electrode groups assembled into the multilayer structure described above, a structure obtained by bundling the metallic core parts of respective electrode layers and welding the bundled parts to a terminal is suitable. When each electrode has a large area, this results in increased internal resistance. In this case, the method of disposing two or more terminals in each electrode to reduce the resistance is preferably used. In the case of an electrode group having the wound structure described above, two or more lead structures may be disposed on each of the positive electrode and negative electrode and bundled into a terminal, whereby internal resistance can be reduced.

<Outer Case>

The material of the outer case is not particularly limited, so long as it is a substance that is stable in the non-aqueous electrolyte solution that is used. Specific examples of the material that can be used include, for instance, metals such as nickel-plated steel plate, stainless steel, aluminum or aluminum alloys, magnesium alloys or the like; or a multilayer film (laminate film) of resin and aluminum foil. A metal such as aluminum or aluminum alloy, or a laminate film, are appropriately used from the standpoint of achieving lighter weights.

Examples of outer cases that utilize metals include, for instance, outer cases having an airtight sealed structure resulting from welding metals together by laser welding, resistance welding, ultrasonic welding or the like. In an alternative structure, the metals may be crimped to each other with a resin-made gasket interposed in between.

Examples of an outer case that utilizes the abovementioned laminate film include, for instance, outer cases having an airtight sealed structure through thermal pressure-bonding of resin layers to each other. In order to enhance sealability, a resin that is different from that of the resins used in the laminate film may be interposed between the abovementioned resin layers. In the particular case of a sealed structure resulting from thermal pressure-bonding of resin layers with interposed collecting terminals, metal and resin are joined to each other, and hence a resin having polar groups or a resin that is modified through introduction of polar groups is appropriately used as the interposed resin. The shape of the outer package may be any shape. For instance the outer package may be of cylindrical type, box-like type, laminate type, coin type, large type and the like.

<Protective Element>

As the protective element there can be used, for instance, a PTC (positive temperature coefficient) in which resistance increases upon abnormal heat generation or upon excessive current flow, a temperature fuse, a thermistor, or a valve (current shutoff valve) that shuts off current that flows in a circuit when the internal pressure and/or internal temperature in the battery rise suddenly upon abnormal heat generation.

As the protective element there is preferably selected a protective element that is in an inoperative condition during ordinary use with high current. More preferably, the battery is designed so that abnormal heat generation or thermal runaway does not occur even in the absence of the protective element.

EXAMPLES

The present invention will be explained in more detail next based on examples and comparative examples. However, the present invention is not limited to these examples. The methods for evaluating the batteries obtained in the following examples and comparative examples are also described below.

Examples 1-1 and 1-2 and Comparative Examples 1-1 to 1-4 (Battery Evaluation)

Example 1-1

[Production of the Non-Aqueous Electrolyte Solution]

While operating under a dry argon atmosphere, 0.5 mass' adiponitrile and 0.5 mass % hexamethylene diisocyanate (also referred to below as HMI), as the contents in the non-aqueous electrolyte solution, were mixed into a mixture of monofluoroethylene carbonate (also referred to below as MFEC) and dimethyl carbonate (also referred to below as DMC) (30:70 volume ratio) and an electrolyte solution was then prepared by dissolving thoroughly dried $LiPF_6$ therein so as to provide a concentration of 1.0 mole/L.

[Production of a Positive Electrode]

97 mass % lithium cobaltate ($LiCoO_2$) as the positive electrode active material, 1.5 mass % of an acetylene black as an electroconductive material, and 1.5 mass % of a polyvinylidene fluoride (PVdF) as a binder were mixed and slurried in N-methylpyrrolidone solvent using a disperser. This was uniformly coated and dried on both sides of a 21 μm-thick aluminum foil followed by pressing to provide a positive electrode.

[Production of a Negative Electrode]

A slurry was formed by adding 1 part by weight of an aqueous dispersion of sodium carboxymethyl cellulose (concentration of sodium carboxymethyl cellulose 1 wt), and 1 part by weight of an aqueous dispersion of styrene-butadiene rubber (styrene-butadiene rubber concentration 50 wt %), as a thickener and a binder, respectively, to 100 parts by weight of graphite powder as the negative electrode active material, with mixing in a disperser. This slurry was uniformly coated and dried on one side of a 12 μm-thick copper foil followed by pressing to provide a negative electrode.

[Production of the Non-Aqueous Electrolyte Battery]

The above-described positive electrode, negative electrode, and a polyethylene separator were sequentially stacked, in the order of negative electrode, separator, positive electrode, separator, negative electrode, to produce a battery element. The battery element was inserted into a bag comprising a laminate film in which aluminum (thickness 40 μm) was covered, on both sides, by a resin layer, while causing the terminals of the positive electrode and the negative electrode to be disposed protrusively. Thereafter, the non-aqueous electrolyte solution was poured into a bag, which was then vacuum-sealed, to prepare a sheet-like non-aqueous electrolyte battery. In addition, in order to raise the intimacy of contact between the electrodes, the sheet-form battery was sandwiched by glass plates and pressure was applied.

[Evaluation of the Initial Capacity]

At 25° C., the non-aqueous electrolyte battery was stabilized by constant-current charging to 4.1 V at a current corresponding to 0.2 C followed by discharging to 3 V at a constant current of 0.2 C and additionally by constant current-constant voltage charging (referred to below as "CCCV charging" as appropriate) to 4.33 V at a current corresponding to 0.2 C (0.05 C cut off) followed by discharging to 3 V at 0.2 C. It was then subjected to CCCV charging (0.05 C cut off) to 4.33 V at 0.2 C and was subsequently again discharged to 3 V at 0.2 C to determine the initial capacity. Here, 1 C represents the current value that discharges the reference capacity of the battery in 1 hour, and, for example, 0.2 C represents one-fifth of this current value.

[Evaluation of High-Temperature Storage Characteristic]

After the non-aqueous electrolyte battery had been subjected to the initial capacity evaluation, it was again CCCV charged (0.05 C cut off) to 4.33 V followed by high-temperature storage at 85° C. for the prescribed period of time. After sufficient cooling of the battery, the mass of the latter was measured through immersion in an ethanol bath, to determine the amount of storage gas generated on the basis of changes in mass before and after storage. The result was taken as the amount of storage gas. Next, the battery was discharged down to 3V at 0.2 C at a temperature of 25° C. and the residual capacity after the high-temperature storage characteristic test was measured. The proportion of the residual capacity with respect to the initial discharge capacity was determined and was taken as the residual capacity (%) after high-temperature storage. CCCV charging (0.05 C cut off) to 4.33 V was again carried out; discharge to 3 V at 0.2 C was performed and the 0.2 C discharge capacity after the high-temperature storage characteristics test was measured; and the proportion of the 0.2 C discharge capacity with respect to the initial capacity was determined and this was taken to be the recovered capacity (%) after high-temperature storage.

The evaluation of the high-temperature storage characteristics was performed using 24 hours at 85° C. and the non-aqueous electrolyte battery fabricated as described above. The evaluation results are given in Table 1.

Example 1-2

A non-aqueous electrolyte battery was fabricated operating as in Example 1-1, but using 1 mass % adiponitrile instead of the 0.5 mass % adiponitrile in the electrolyte solution of Example 1, and the initial capacity and high-temperature storage characteristics (85° C., 24 hours) were evaluated. The evaluation results are given in Table 1.

Comparative Example 1-1

A non-aqueous electrolyte battery was fabricated operating as in Example 1-1, but using an electrolyte solution provided by omitting the adiponitrile and the HMI from the electrolyte solution of Example 1-1, and the initial capacity and high-temperature storage characteristics (85° C., 24 hours) were evaluated. The evaluation results are given in Table 1.

Comparative Example 1-2

A non-aqueous electrolyte battery was fabricated operating as in Example 1-1, but using an electrolyte solution provided by omitting the HMI from the electrolyte solution of Example 1-1, and the initial capacity and high-temperature storage characteristics (85° C., 24 hours) were evaluated. The evaluation results are given in Table 1.

Comparative Example 1-3

A non-aqueous electrolyte battery was fabricated operating as in Example 1-1, but using an electrolyte solution provided by omitting the adiponitrile from the electrolyte solution of Example 1-1, and the initial capacity and high-temperature storage characteristics (85° C., 24 hours) were evaluated. The evaluation results are given in Table 1.

Comparative Example 1-4

A non-aqueous electrolyte battery was fabricated operating as in Example 1-1, but using 1 mass % HMI instead of the 0.5 mass % HMI in the electrolyte solution of Example 1-1, and the initial capacity and high-temperature storage characteristics (85° C., 24 hours) were evaluated. The evaluation results are given in Table 1.

TABLE 1

| | additive 1 | mass parts | additive 2 | mass parts | storage gas amount/% | residual capacity/% |
|---|---|---|---|---|---|---|
| Example 1-1 | adiponitrile | 0.5 | HMI | 0.5 | 42.6 | 107.2 |
| Example 1-2 | adiponitrile | 1 | HMI | 0.5 | 39.4 | 107.9 |
| Comparative Example 1-1 | none | — | none | — | 100.0 | 100.0 |
| Comparative Example 1-2 | adiponitrile | 0.5 | none | — | 79.8 | 96.2 |
| Comparative Example 1-3 | HMI | 0.5 | none | — | 60.6 | 101.0 |
| Comparative Example 1-4 | adiponitrile | 0.5 | HMI | 1 | 43.2 | 102.7 |

* Relative values using Comparative Example 1-1 as 100%

Table 1 demonstrates that, when the non-aqueous electrolyte solutions of Examples 1-1 and 1-2 according to the first present invention are used, the amount of gas generation during storage is less than for the absence of addition (Comparative Example 1-1) and the residual capacity after high-temperature storage is better. In addition, it is also shown that the improvement effect for the amount of gas generation during storage and residual capacity is unsatisfactory when the compound having at least two isocyanate groups per molecule is added by itself and when the compound having at least two cyano groups per molecule is added by itself (Comparative Examples 1-2 and 1-3). It is further shown that the improvement effect for the residual capacity after high-temperature storage is unsatisfactory when the compound having at least two isocyanate groups per molecule and the compound having at least two cyano groups per molecule are not incorporated at from 50:50 to 1:99 mass ratio (Comparative Example 1-4).

Examples 2-1 to 2-4 and Comparative Examples 2-1 to 2-6 (Battery Evaluation)

Example 2-1

A non-aqueous electrolyte battery was fabricated operating as in Example 1-1, with the exception that the electrolyte solution was prepared as follows: while operating under a dry argon atmosphere, 2 mass % vinylene carbonate (also referred to below as VC), 1 mass % succinonitrile, and 0.5 mass % HMI, as the contents in the non-aqueous electrolyte solution, were mixed into a mixture of ethylene carbonate (also referred to below as EC) and ethyl methyl carbonate (also referred to below as EMC) (30:70 volume ratio) and thoroughly dried $LiPF_6$ was then dissolved therein so as to provide a concentration of 1.0 mole/L. The initial capacity and high-temperature storage characteristics (85° C., 48 hours) were evaluated. The evaluation results are given in Table 2.

Example 2-2

A non-aqueous electrolyte battery was fabricated operating as in Example 2-1, but using adiponitrile in place of the succinonitrile in the electrolyte solution of Example 2-1, and the initial capacity and high-temperature storage characteristics (85° C., 48 hours) were evaluated. The evaluation results are given in Table 2.

Example 2-3

A non-aqueous electrolyte battery was fabricated operating as in Example 2-1, but using pimelonitrile in place of the succinonitrile in the electrolyte solution of Example 2-1, and the initial capacity and high-temperature storage characteristics (85° C., 48 hours) were evaluated. The evaluation results are given in Table 2.

Example 2-4

A non-aqueous electrolyte battery was fabricated operating as in Example 2-1, but using suberonitrile in place of the succinonitrile in the electrolyte solution of Example 2-1, and the initial capacity and high-temperature storage characteristics (85° C., 48 hours) were evaluated. The evaluation results are given in Table 2.

Example 2-5

A non-aqueous electrolyte battery was fabricated operating as in Example 2-1, with the exception that an electrolyte solution was prepared follows as the electrolyte solution: while operating under a dry argon atmosphere, 2 mass, VC, 1 mass % adiponitrile, and 0.5 mass % HMI, as the contents in the non-aqueous electrolyte solution, were mixed into a mixture of EC and 2,2,2-trifluoroethyl methyl carbonate (30:70 volume ratio) and thoroughly dried $LiPF_6$ was then dissolved therein so as to provide a concentration of 1.0 mole/L. The initial capacity and high-temperature storage characteristics (85° C., 48 hours) were evaluated. The evaluation results are given in Table 2.

Example 2-6

A non-aqueous electrolyte battery was fabricated operating as in Example 2-1, with the exception that an electrolyte solution was prepared as follows as the electrolyte solution: while operating under a dry argon atmosphere, 0.5 masse adiponitrile and 0.5 mass % HMI, as the contents in the non-aqueous electrolyte solution, were mixed into a mixture of EC, MFEC, and 2,2,2-trifluoroethyl methyl carbonate (20:10:70 volume ratio) and thoroughly dried $LiPF_6$ was then dissolved therein so as to provide a concentration of 1.0 mole/L. The initial capacity and high-temperature storage characteristics (85° C., 48 hours) were evaluated. The evaluation results are given in Table 2.

Comparative Example 2-1

A non-aqueous electrolyte battery was fabricated operating as in Example 2-1, but using an electrolyte solution provided by omitting the succinonitrile and the HMI from the electrolyte solution of Example 2-1, and the initial capacity and high-temperature storage characteristics (85° C., 48 hours) were evaluated. The evaluation results are given in Table 2.

Comparative Example 2-2

A non-aqueous electrolyte battery was fabricated operating as in Example 2-1, but using an electrolyte solution provided by omitting the succinonitrile from the electrolyte solution of Example 2-1, and the initial capacity and high-temperature storage characteristics (85° C., 48 hours) were evaluated. The evaluation results are given in Table 2.

Comparative Example 2-3

A non-aqueous electrolyte battery was fabricated operating as in Example 2-1, but using an electrolyte solution provided by omitting the HMI from the electrolyte solution of Example 2-1, and the initial capacity and high-temperature storage characteristics (85° C., 48 hours) were evaluated. The evaluation results are given in Table 2.

Comparative Example 2-4

A non-aqueous electrolyte battery was fabricated operating as in Comparative Example 2-3, but using adiponitrile in place of the succinonitrile in the electrolyte solution of Comparative Example 2-3, and the initial capacity and high-temperature storage characteristics (85° C., 48 hours) were evaluated. The evaluation results are given in Table 2.

Comparative Example 2-5

A non-aqueous electrolyte battery was fabricated operating as in Comparative Example 2-3, but using pimelonitrile in place of the succinonitrile in the electrolyte solution of Comparative Example 2-3, and the initial capacity and high-temperature storage characteristics (85° C., 48 hours) were evaluated. The evaluation results are given in Table 2.

Comparative Example 2-6

A non-aqueous electrolyte battery was fabricated operating as in Comparative Example 2-3, but using suberonitrile in place of the succinonitrile in the electrolyte solution of Comparative Example 2-3, and the initial capacity and high-temperature storage characteristics (85° C., 48 hours) were evaluated The evaluation results are given in Table 2.

TABLE 2

| | additive 1 | mass parts | additive 2 | mass parts | storage gas amount/% | residual capacity/% |
|---|---|---|---|---|---|---|
| Example 2-1 | succinonitrile | 1 | HMI | 0.5 | 45.2 | 115.7 |
| Example 2-2 | adiponitrile | 1 | HMI | 0.5 | 22.5 | 120.3 |
| Example 2-3 | pimelonitrile | 1 | HMI | 0.5 | 22.7 | 119.2 |
| Example 2-4 | suberonitrile | 1 | HMI | 0.5 | 25.8 | 116.9 |
| Example 2-5 | adiponitrile | 1 | HMI | 0.5 | 18.5 | 112.1 |
| Example 2-6 | adiponitrile | 1 | HMI | 0.5 | 66.7 | 104.2 |
| Comparative Example 2-1 | none | — | none | — | 100.0 | 100.0 |
| Comparative Example 2-2 | HMI | 0.5 | none | — | 60.0 | 107.2 |
| Comparative Example 2-3 | succinonitrile | 1 | none | — | 56.3 | 106.8 |
| Comparative Example 2-4 | adiponitrile | 1 | none | — | 42.3 | 109.8 |

TABLE 2-continued

| | additive 1 | mass parts | additive 2 | mass parts | storage gas amount/% | residual capacity/% |
|---|---|---|---|---|---|---|
| Comparative Example 2-5 | pimelonitrile | 1 | none | — | 41.2 | 108.5 |
| Comparative Example 2-6 | suberonitrile | 1 | none | — | 43.6 | 108.1 |

* Relative values using Comparative Example 2-1 as 100%

Table 2 demonstrates that, when the non-aqueous electrolyte solutions of Examples 2-1 to 2-6 according to the first present invention are used, the amount of gas generation during storage is less than in the absence of the compound having at least two isocyanate groups per molecule and the compound having at least two cyano groups per molecule (Comparative Example 2-1) and the residual capacity after high-temperature storage is better. In addition, it is also shown that the improvement effect for the amount of gas generation during storage and residual capacity is unsatisfactory when the compound having at least two isocyanate groups per molecule is added by itself and when the compound having at least two cyano groups per molecule is added by itself (Comparative Examples 2-2 to 2-6).

Examples 3-1 and 3-2 and Comparative Examples 3-1 to 3-2

Example 3-1

A non-aqueous electrolyte battery was fabricated operating as in Example 1-1, with the exception that the electrolyte solution was prepared as follows: while operating under a dry argon atmosphere, 1 mass % VC, 1 mass % adiponitrile, 0.5 mass % HMI, and 0.5 mass' ethoxypentafluorocyclotriphosphazene (a compound with general formula (6) in which the substituents $X^1$ to $X^5$ are the fluorine atom and $X^6$ is the ethoxy group; also referred to below as EtPFPN), as the contents in the non-aqueous electrolyte solution, were mixed into a mixture of MFEC and DMC (30:70 volume ratio) and thoroughly dried $LiPF_6$ was then dissolved therein so as to provide a concentration of 1.0 mole/L. The initial capacity and high-temperature storage characteristics (85° C., 24 hours) were evaluated. The evaluation results are given in Table 3.

Comparative Example 3-1

A non-aqueous electrolyte battery was fabricated operating as in Example 3-1, but using an electrolyte solution provided by omitting the EtPFPN and the HMI from the electrolyte solution of Example 3-1, and the initial capacity and high-temperature storage characteristics (85° C., 24 hours) were evaluated. The evaluation results are given in Table 3.

Comparative Example 3-2

A non-aqueous electrolyte battery was fabricated operating as in Example 3-1, but using an electrolyte solution provided by omitting the HMI from the electrolyte solution of Example 3-1, and the initial capacity and high-temperature storage characteristics (85° C., 24 hours) were evaluated. The evaluation results are given in Table 3.

Example 3-2

A non-aqueous electrolyte battery was fabricated operating as in Example 3-1, but using an electrolyte solution provided by omitting the EtPFPN from the electrolyte solution of Example 3-1, and the initial capacity and high-temperature storage characteristics (85° C., 24 hours) were evaluated. The evaluation results are given in Table 3.

TABLE 3

| | additive 1 | mass parts | additive 2 | mass parts | initial capacity/% | amount of gas generation/% | residual capacity/% | recovered capacity/% |
|---|---|---|---|---|---|---|---|---|
| Example 3-1 | EtPFPN | 0.5 | HMI | 0.5 | 100 | 62.5 | 101.5 | 101.0 |
| Comparative Example 3-1 | none | 0.5 | none | — | 100 | 100.0 | 100.0 | 100.0 |
| Comparative Example 3-2 | EtPFPN | 0.5 | none | — | 100 | 116.1 | 99.6 | 99.7 |
| Example 3-2 | HMI | 0.5 | none | — | 100 | 73.2 | 100.8 | 100.3 |

* Relative values using Comparative Example 3-1 as 100%

Table 3 demonstrates that, when the non-aqueous electrolyte solution of Example 3-1 according to the second present invention is used, the amount of gas generation during storage is less than in the absence of the compound with general formula (6) and the compound having at least two isocyanate groups per molecule (Comparative Example 3-1) and the residual/recovered capacities after high-temperature storage are better. In addition, it is also shown that the improvement effect for the amount of gas generation during storage and residual capacity is unsatisfactory when the compound with general formula (6) is added by itself and when the compound having at least two isocyanate groups per molecule is added by itself (Comparative Example 3-2).

Examples 4-1 and 4-2 and Comparative Example 4-1

Example 4-1

A non-aqueous electrolyte battery was fabricated operating as Example 1-1, with the exception that the electrolyte solution was prepared as follows: while operating as Example 1-1 under a dry argon atmosphere, 1 mass % VC, 1 mass % adiponitrile, 0.5 mass % HMI, and 0.5 mass % EtPFPN, as the contents in the non-aqueous electrolyte solution, were mixed into a mixture of MFEC, EC, and DMC (15:15:70 volume ratio) and thoroughly dried $LiPF_6$ was then dissolved therein so as to provide a concentration of 1.0 mole/L. The initial capacity and high-temperature storage characteristics (85° C., 24 hours) were evaluated. The evaluation results are given in Table 4.

Comparative Example 4-1

A non-aqueous electrolyte battery was fabricated operating as Example 4-1, but using an electrolyte solution provided by omitting the HMI and the EtPFPN from the electrolyte solution of Example 4-1, and the initial capacity and high-temperature storage characteristics (85° C., 24 hours) were evaluated. The evaluation results are given in Table 4.

Example 4-2

A non-aqueous electrolyte battery was fabricated operating as in Example 4-1, but using an electrolyte solution provided by omitting the EtPFPN from the electrolyte solution of Example 4-1, and the initial capacity and high-temperature storage characteristics (85° C., 24 hours) were evaluated. The evaluation results are given in Table 4.

TABLE 4

|  | additive 1 | mass parts | additive 2 | mass parts | initial capacity/% | amount of gas generation/% | residual capapcity/% | recovered capacity/% |
|---|---|---|---|---|---|---|---|---|
| Example 4-1 | EtPFPN | 0.5 | HMI | 0.5 | 100 | 51.7 | 102.3 | 102.4 |
| Comparative Example 4-1 | none | 0.5 | none | — | 100 | 100.0 | 100.0 | 100.0 |
| Example 4-2 | HMI | 0.5 | none | — | 100 | 61.7 | 101.5 | 101.3 |

* Relative values using Comparative Example 4-1 as 100%

Table 4 demonstrates that, when the non-aqueous electrolyte solution of Example 4-1 according to the second present invention is used, the amount of gas generation during storage is less than in the absence of the compound with general formula (6) and the compound having at least two isocyanate groups per molecule (Comparative Example 4-1) and the residual/recovered capacities after high-temperature storage are better.

Example 5-1 and Comparative Examples 5-1 to 5-3

Example 5-1

A non-aqueous electrolyte battery was fabricated operating as in Example 1-1, with the exception that the electrolyte solution was prepared as follows: while operating as in Example 1-1 under a dry argon atmosphere, 2 mass % VC, 0.3 mass % HMI, and 0.3 mass % 2-propynyl vinylsulfonate (also referred to below as PVS), as the contents in the non-aqueous electrolyte solution, were mixed into a mixture of EC and DMC (30:70 volume ratio) and thoroughly dried LiPF$_6$ was then dissolved therein so as to provide a concentration of 1.0 mole/L. The initial capacity and high-temperature storage characteristics (85° C., 24 hours) were evaluated. The evaluation results are given in Table 5.

Comparative Example 5-11

A non-aqueous electrolyte battery was fabricated operating as in Example 5-1, but using an electrolyte solution provided by omitting the HMI and the PVS from the electrolyte solution of Example 5-1, and the initial capacity and high-temperature storage characteristics (85° C., 24 hours) were evaluated. The evaluation results are given in Table 5.

Comparative Example 5-2

A non-aqueous electrolyte battery was fabricated operating as in Example 5-1, but using an electrolyte solution provided by omitting the PVS from the electrolyte solution of Example 5-1, and the initial capacity and high-temperature storage characteristics (85° C., 24 hours) were evaluated. The evaluation results are given in Table 5.

Comparative Example 5-3

A non-aqueous electrolyte battery was fabricated operating as in Example 5-1, but using an electrolyte solution provided by omitting the HMI from the electrolyte solution of Example 5-1, and the initial capacity and high-temperature storage characteristics (85° C., 24 hours) were evaluated. The evaluation results are given in Table 5.

TABLE 5

|  | additive 1 | mass parts | additive 2 | mass parts | initial capacity/% | amount of gas generation/% | residual capapcity/% |
|---|---|---|---|---|---|---|---|
| Example 5-1 | HMI | 0.3 | PVS | 0.3 | 100 | 56.3 | 103.2 |
| Comparative Example 5-1 | none | — | none | — | 100 | 100.0 | 100.0 |
| Comparative Example 5-2 | HMI | 0.3 | none | — | 100 | 56.3 | 102.0 |
| Comparative Example 5-3 | PVS | 0.3 | none | — | 100 | 84.4 | 100.3 |

* Relative values using Comparative Example 5-1 as 100%

Table 5 demonstrates that, when the non-aqueous electrolyte solution of Example 5-1 according to the second present invention is used, the amount of gas generation during storage is less than in the absence of the compound with general formula (5) and the compound having at least two isocyanate groups per molecule (Comparative Example 5-1) and the residual/recovered capacities after high-temperature storage are better. In addition, it is also shown that, while an improvement effect for the amount of gas generation during storage and residual capacity is seen when the compound having at least two isocyanate groups per molecule is added by itself and when the compound with general formula (5) is added by itself (Comparative Examples 5-2 and 5-3), this is inadequate for battery service.

Examples 6-1 to 6-2 and Comparative Examples 6-1 to 6-4

Example 6-1

A non-aqueous electrolyte battery was fabricated operating as in Example 1-1, with the exception that the electrolyte solution was prepared as follows: while operating as in Example 1-1 under a dry argon atmosphere, 1 mass % VC, 0.3 mass % HMI, and 0.3 mass % 2-propynyl methanesulfonate (also referred to below as PMS), as the contents in the non-aqueous electrolyte solution, were mixed into a mixture of EC, MFEC, and DMC (15:15:70 volume ratio) and thoroughly dried $LiPF_6$ was then dissolved therein so as to provide a concentration of 1.0 mole/L. The initial capacity and high-temperature storage characteristics (85° C., 24 hours) were evaluated. The evaluation results are given in Table 6.

Example 6-2

A non-aqueous electrolyte battery was fabricated operating as in Example 6-1, but using PVS in place of the PMS in the electrolyte solution of Example 6-1, and the initial capacity and high-temperature storage characteristics (85° C., 24 hours) were evaluated. The evaluation results are given in Table 6.

Comparative Example 6-1

A non-aqueous electrolyte battery was fabricated operating as in Example 6-1, but using an electrolyte solution provided by omitting the HMI and PMS from the electrolyte solution of Example 6-1, and the initial capacity and high-temperature storage characteristics (85° C., 24 hours) were evaluated. The evaluation results are given in Table 6.

Comparative Example 6-2

A non-aqueous electrolyte battery was fabricated operating as in Example 6-1, but using an electrolyte solution provided by omitting the PMS from the electrolyte solution of Example 6-1, and the initial capacity and high-temperature storage characteristics (85° C., 24 hours) were evaluated. The evaluation results are given in Table 6.

Comparative Example 6-3

A non-aqueous electrolyte battery was fabricated operating as in Example 6-1, but using an electrolyte solution provided by omitting the HMI from the electrolyte solution of Example 6-1, and the initial capacity and high-temperature storage characteristics (85° C., 24 hours) were evaluated. The evaluation results are given in Table 6.

Comparative Example 6-4

A non-aqueous electrolyte battery was fabricated operating as in Example 6-2, but using an electrolyte solution provided by omitting the HMI from the electrolyte solution of Example 6-2, and the initial capacity and high-temperature storage characteristics (85° C., 24 hours) were evaluated. The evaluation results are given in Table 6.

TABLE 6

| | additive 1 | mass parts | additive 2 | mass parts | initial capacity/% | amount of gas generation/% | residual capapcity/% |
|---|---|---|---|---|---|---|---|
| Example 6-1 | HMI | 0.3 | PMS | 0.3 | 100 | 47.6 | 102.6 |
| Example 6-2 | HMI | 0.3 | PVS | 0.3 | 100 | 46.4 | 101.7 |
| Comparative Example 6-1 | none | — | none | — | 100 | 100.0 | 100.0 |
| Comparative Example 6-2 | HMI | 0.3 | none | — | 100 | 64.3 | 101.7 |
| Comparative Example 6-3 | PMS | 0.3 | none | — | 100 | 86.9 | 100.2 |
| Comparative Example 6-4 | PVS | 0.3 | none | — | 100 | 77.4 | 100.9 |

* Relative values using Comparative Example 6-1 as 100%

Table 6 demonstrates that, when the non-aqueous electrolyte solutions of Examples 6-1 and 6-2 according to the second present invention are used, the amount of gas generation during storage is less than in the absence of the compound with general formula (5) and the compound having at least two isocyanate groups per molecule (Comparative Example 6-1) and the residual/recovered capacities after high-temperature storage are better. In addition, it is also shown that, while an improvement effect for the amount of gas generation during storage and residual capacity is seen when the compound having at least two isocyanate groups per molecule is added by itself and when the compound with general formula (5) is added by itself (Comparative Examples 6-2 to 6-4), this is inadequate for battery service.

Example 7-1 and Comparative Examples 7-1 to 7-3

Example 7-1

[Production of the Non-Aqueous Electrolyte Solution]

While operating under a dry argon atmosphere, 0.5 masse HMI, as the content in the non-aqueous electrolyte solution, was mixed into a mixture of EC, EMC, and EtPFPN (30:60:10 volume ratio) and an electrolyte solution was then prepared by dissolving thoroughly dried $LiPF_6$ therein so as to provide a concentration of 1.0 mole/L. The EtPFPN content in this non-aqueous electrolyte solution was 12 mass %.

[Production of the Positive Electrode]

97 mass % lithium cobaltate (LiCoO$_2$) as the positive electrode active material, 1.5 mass % of an acetylene black as an electroconductive material, and 1.5 mass % of a polyvinylidene fluoride (PVdF) as a binder were mixed and slurried in N-methylpyrrolidone solvent using a disperser. This was uniformly coated and dried on both sides of an aluminum foil followed by pressing to provide a positive electrode.

[Production of the Negative Electrode]

94 mass parts of a graphite powder as the negative electrode active material and 6 mass parts PVdF were mixed and N-methylpyrrolidone was added and a slurry was prepared and this slurry was coated/dried on one side of a copper current collector to obtain a negative electrode.

[Production of a Non-Aqueous Electrolyte Battery]

The above-described positive electrode, negative electrode, and a polyethylene separator were sequentially stacked, in the order of negative electrode, separator, positive electrode, separator, and negative electrode, to produce a battery element. The thusly obtained battery element was packaged with a cylindorical aluminum laminate film; a prescribed electrolyte solution was introduced; and vacuum sealing was then performed to produce a sheet-form non-aqueous electrolyte secondary battery. In addition, in order to raise the intimacy of contact between the electrodes, the sheet-form battery was sandwiched by glass plates and pressure was applied.

[Evaluation of the Initial Capacity]

At 25° C., the non-aqueous electrolyte battery was subjected to CCCV charging (0.05 C cut off) to 4.1 V at a current corresponding to 0.2 C and was thereafter discharged to 3 V at a constant current of 0.2 C. The initial formation was carried out by performing this three times. This was followed by CCCV charging (0.05 C cut off) to 4.2 V at 0.2 C and then by discharging again to 3 V at 0.2 C to determine the initial capacity. Herein, 1 C represents the current value for discharge of the reference capacity of the battery over 1 hour. For instance, 0.2 C represents a current value that is ⅕ of 1 C.

[Evaluation of High-Temperature Storage Characteristic]

After the non-aqueous electrolyte battery had been subjected to the initial capacity evaluation, it was again CCCV charged (0.05 C cut off) to 4.2 V followed by high-temperature storage at 85° C. for 48 hours. After sufficient cooling of the battery, the mass of the latter was measured through immersion in an ethanol bath to determine the amount of storage gas generated on the basis of changes in mass before and after storage. The result was taken as the amount of storage gas. Next, the battery was discharged down to 3V at 0.2 C at a temperature of 25° C., and the residual capacity after the high-temperature storage characteristic test was measured. The proportion of the residual capacity with respect to the initial discharge capacity was determined and was taken as the residual capacity (%) after high-temperature storage.

CCCV charging (0.05 cut off) to 4.2 V was again carried out; discharge to 3 V at 0.2 C was performed and the 0.2 C discharge capacity after the high-temperature storage characteristics test was measured; and the proportion of the recovered 0.2 C discharge capacity with respect to the initial capacity was determined and this was taken to be the recovered capacity (%) after high-temperature storage.

The evaluation of the high-temperature storage characteristics was performed using 48 hours at 85° C. and the non-aqueous electrolyte battery fabricated as described above. The evaluation results are given in Table 7.

Comparative Example 7-1

A non-aqueous electrolyte battery was fabricated operating as in Example 7-1, with the exception that the electrolyte solution was prepared as follows: while operating as in Example 7-1 under a dry argon atmosphere, thoroughly dried LiPF$_6$ was dissolved to provide a concentration of 1.0 mole/L in a mixture of EC and EMC (30:70 volume ratio). The initial capacity and high-temperature storage characteristics (85° C., 48 hours) were evaluated. The evaluation results are given in Table 7.

Comparative Example 7-2

A non-aqueous electrolyte battery was fabricated operating as in Example 7-1, but using an electrolyte solution provided by omitting the HMI from the electrolyte solution of Example 7-1, and the initial capacity and high-temperature storage characteristics (85° C., 48 hours) were evaluated. The evaluation results are given in Table 7.

Comparative Example 7-3

A non-aqueous electrolyte battery was fabricated operating as in Comparative Example 7-1, with the exception that the electrolyte solution was prepared as follows: while operating as in Comparative Example 7-1 under a dry argon atmosphere, 0.5 mass % HMI, as the content in the non-aqueous electrolyte solution, was mixed into a mixture of EC and EMC (30:70 volume ratio) and thoroughly dried LiPF$_6$ was then dissolved therein so as to provide a concentration of 1.0 mole/L. The initial capacity and high-temperature storage characteristics (85° C., 48 hours) were evaluated. The evaluation results are given in Table 7.

TABLE 7

| | EtPFPN content (mass parts) | HMI content (mass parts) | amount of gas generation/ % | residual capacity/ % | recovered capacity/ % |
|---|---|---|---|---|---|
| Example 7-1 | 12 | 0.5 | 11.4 | 100.3 | 103.1 |
| Comparative Example 7-1 | 0 | 0 | 100.0 | 100.0 | 100.0 |
| Comparative Example 7-2 | 12 | 0 | 68.0 | 98.4 | 101.5 |
| Comparative Example 7-3 | 0 | 0.5 | 47.4 | 92.8 | 95.4 |

* Relative values using Comparative Example 7-1 as 100%

Table 7 demonstrates that, when the non-aqueous electrolyte solution of Example 7-1 according to the second present invention is used, the amount of gas generation during storage is less than in the absence of the compound with general formula (6) and the compound having at least two isocyanate groups per molecule (Comparative Example 7-1) and the residual/recovered capacities after high-temperature storage are better. In addition, the residual capacity after high-temperature storage declines when the compound with general formula (6) is incorporated by itself (Comparative Example 7-2²). Moreover, while an inhibitory effect on gas generation during storage is seen in the case of the addition of only the compound having at least two isocyanate groups per molecule (Comparative Example 7-3), the residual/recovered capacities after high-temperature storage are reduced and as a result this case is unsatisfactory.

Examples 8-1 to 8-6 and Comparative Examples 8-1 to 8-6

Example 8-1

[Production of the Non-Aqueous Electrolyte Solution]

While operating under a dry argon atmosphere, 0.5 masse HMI and 0.5 mass % LiN(SO2F)$_2$ (also referred to below as LiFSI), as the contents in the non-aqueous electrolyte solution, were mixed into a mixture of EC, DMC, and EMC (30:30:40 volume ratio) and an electrolyte solution was then prepared by dissolving thoroughly dried LiPF$_6$ therein so as to provide a concentration of 1.0 mole/L.

[Production of the Positive Electrode]

90 mass parts lithium nickel manganese cobaltate (LiNi$_{1/3}$Mn$_{1/3}$Co$_{1/3}$O$_2$) was used as the positive electrode active material and was mixed with 7 mass parts of a carbon black as an electroconductive material and 3 mass parts of a polyvinylidene fluoride as a binder; N-methyl-2-pyrrolidone was added and conversion into a slurry was carried out; this was uniformly coated and dried on both sides of a 15 μm-thick aluminum foil; and the positive electrode was then obtained by pressing so as to bring the density of the positive electrode active material layer to 2.6 g·cm$^{-3}$.

[Production of the Negative Electrode]

A water-based dispersion of sodium carboxymethyl cellulose (1 mass concentration of the sodium carboxymethyl cellulose) as a thickener and a water-based dispersion of a styrene-butadiene rubber (50 mass % concentration of the styrene-butadiene rubber) as a binder were added to a graphite that had a Raman R value—defined as the ratio of the peak intensity at 1360 cm$^{-1}$ to the peak intensity at 1580 cm$^{-1}$ in argon ion laser Raman spectroscopy—of 0.33, and a slurry was prepared by mixing with a disperser. The obtained slurry was uniformly coated and dried on one side of a 12 μm-thick copper foil, and a negative electrode was then obtained by pressing so as to bring the density of the negative electrode active material layer to 1.4 g·cm$^{-3}$. The fabrication was carried out to provide a graphite:sodium carboxymethyl cellulose:styrene-butadiene rubber mass ratio=98:1:1 in the negative electrode after drying.

<Production of the Non-Aqueous Electrolyte Battery>

The above-described positive electrode, negative electrode, and a polyethylene separator were sequentially stacked, in the order of negative electrode, separator and positive electrode, to produce a battery element. The battery element was inserted into a bag comprising a laminate film in which aluminum (thickness 40 μm) was covered on both sides by a resin layer, while causing the terminals of the positive electrode and the negative electrode to be disposed protrusively. Thereafter, the non-aqueous electrolyte solution was poured into a bag which was then vacuum-sealed to prepare a sheet-like non-aqueous electrolyte battery. Further, in order to increase adhesion between the electrodes, the sheet-like battery was sandwiched between glass plates so that pressure was applied thereto.

[Initial Formation]

In a 25° C. thermostat, the sheet-form non-aqueous electrolyte battery was CCCV charged to 4.1 V at 0.2 C and then discharged to 3.0 V at 0.2 C. This was carried out five times to perform the initial formation. Herein, 1 C represents the current value for discharge of the reference capacity of the battery over 1 hour. For instance, 0.2 C represents a current value that is ⅕ of 1 C.

[Cycle Characteristic Evaluation]

After the initial formation had been performed, the non-aqueous electrolyte battery was placed in a 60° C. thermostat and 500 cycles were run where 1 cycle was the process of constant-current charging to 4.1 V at 2 C followed by constant-current discharge to 3.0 V at 2 C. The capacity retention rate at the 500th cycle was determined based on the expression (500th cycle discharge capacity)/(1st cycle discharge capacity)×100.

The cycle characteristics were evaluated using this non-aqueous electrolyte battery. The evaluation results are given in Table 8.

Example 8-2

A non-aqueous electrolyte battery was fabricated operating as in Example 8-1, with the exception that LiSO$_2$F was used in place of the LiFSI in the electrolyte solution of Example 8-1, and the cycle characteristics were evaluated. The evaluation results are given in Table 8.

Example 8-3

A non-aqueous electrolyte battery was fabricated operating as in Example 8-1, with the exception that tris(trimethylsilyl) borate (also referred to below as TMSB) was used in place of the LiFSI in the electrolyte solution of Example 8-1, and the cycle characteristics were evaluated. The evaluation results are given in Table 8.

Example 8-4

A non-aqueous electrolyte battery was fabricated operating as in Example 8-1, with the exception that Duranate TPA-100 (from Asahi Kasei Chemicals Corporation, also referred to below as TPA-100), which has the basic structure given by formula (8-2) above, was used in place of the HMI in the electrolyte solution of Example 8-1, and the cycle characteristics were evaluated. The evaluation results are given in Table 8.

Example 8-5

A non-aqueous electrolyte battery was fabricated operating as in Example 8-4, with the exception that LiSO$_3$F was used in place of the LiFSI in the electrolyte solution of Example 8-4, and the cycle characteristics were evaluated. The evaluation results are given in Table 8.

Example 8-6

A non-aqueous electrolyte battery was fabricated operating as in Example 8-4, with the exception that TMSB was used in place of the LiFSI in the electrolyte solution of Example 8-4, and the cycle characteristics were evaluated. The evaluation results are given in Table 8.

Comparative Example 8-1

A non-aqueous electrolyte battery was fabricated operating as in Example 8-1, but using an electrolyte solution provided by omitting the HMI and LiFSI from the electrolyte solution of Example 8-1, and the cycle characteristics were evaluated. The evaluation results are given in Table 8.

Comparative Example 8-2

A non-aqueous electrolyte battery was fabricated operating as in Example 8-1, but using an electrolyte solution provided by omitting the LiFSI from the electrolyte solution of Example 8-1, and the cycle characteristics were evaluated. The evaluation results are given in Table 8.

Comparative Example 8-3

A non-aqueous electrolyte battery was fabricated operating as in Example 8-4, but using an electrolyte solution provided by omitting the LiFSI from the electrolyte solution of Example 8-4, and the cycle characteristics were evaluated. The evaluation results are given in Table 8.

Comparative Example 8-4

A non-aqueous electrolyte battery was fabricated operating as in Example 8-1, but using an electrolyte solution provided by omitting the HMI from the electrolyte solution of Example 8-1, and the cycle characteristics were evaluated. The evaluation results are given in Table 8.

Comparative Example 8-5

A non-aqueous electrolyte battery was fabricated operating as in Example 8-2, but using an electrolyte solution provided by omitting the HMI from the electrolyte solution of Example 8-2, and the cycle characteristics were evaluated. The evaluation results are given in Table 8.

Comparative Example 8-6

A non-aqueous electrolyte battery was fabricated operating as in Example 8-3, but using an electrolyte solution provided by omitting the HMI from the electrolyte solution of Example 8-3, and the cycle characteristics were evaluated. The evaluation results are given in Table 8.

TABLE 8

| | additive 1 | | additive 2 | | capacity retention rate at the 500th cycle/% |
|---|---|---|---|---|---|
| | name | mass parts | name | mass parts | |
| Example 8-1 | HMI | 0.5 | LiFSI | 0.5 | 108 |
| Example 8-2 | HMI | 0.5 | LiSO$_3$F | 0.5 | 106 |
| Example 8-3 | HMI | 0.5 | TMSB | 0.5 | 108 |
| Example 8-4 | TPA-100 | 0.5 | LiFSI | 0.5 | 108 |
| Example 8-5 | TPA-100 | 0.5 | LiSO$_3$F | 0.5 | 107 |
| Example 8-6 | TPA-100 | 0.5 | TMSB | 0.5 | 108 |
| Comparative Example 8-1 | none | 0 | none | 0 | 100 |
| Comparative Example 8-2 | HMI | 0.5 | none | 0 | 103 |
| Comparative Example 8-3 | TPA-100 | 0.5 | none | 0 | 105 |
| Comparative Example 8-4 | none | 0 | LiFSI | 0.5 | 102 |
| Comparative Example 8-5 | none | 0 | LiSO$_3$F | 0.5 | 101 |
| Comparative Example 8-6 | none | 0 | TMSB | 0.5 | 96 |

* Relative values using Comparative Example 8-1 as 100%

Table 8 demonstrates that, when the non-aqueous electrolyte solutions of Examples 8-1 to 8-6 according to the second present invention are used, the capacity retention rate after 500 cycles is better than in the absence of the compound with general formula (2), (3), or (4) and the compound having at least two isocyanate groups per molecule (Comparative Example 8-1). Moreover, it is shown that, while some improvement in the cycle capacity retention rate is seen for the addition of a compound with general formula (2), (3), or (4) by itself or for the addition of only the compound having at least two isocyanate groups per molecule (Comparative Examples 8-2 to 8-6), the effect is still inadequate.

Examples 9-1 to 9-4 and Comparative Examples 9-1 to 9-5

Example 9-1

A non-aqueous electrolyte battery was fabricated operating as in Example 8-1, with the exception that lithium bis(oxalato)borate (also referred to below as LiBOB) was used in place of the LiFSI in the electrolyte solution of Example 8-1, and the cycle characteristics were evaluated. The evaluation results are given in Table 9.

Example 9-2

A non-aqueous electrolyte battery was fabricated operating as in Example 9-1, but using 1 mass % LiBOB instead of the 0.5 mass % LiBOB in the electrolyte solution of Example 9-1, and the cycle characteristics were evaluated. The evaluation results are given in Table 9.

Example 9-3

A non-aqueous electrolyte battery was fabricated operating as in Example 9-1, but using 1.5 mass % LiBOB instead of the 0.5 mass % LiBOB in the electrolyte solution of Example 9-1, and the cycle characteristics were evaluated. The evaluation results are given in Table 9.

Example 9-4

A non-aqueous electrolyte battery was fabricated operating as in Example 9-1, but using TPA-100 in place of the HMI in the electrolyte solution of Example 9-1, and the cycle characteristics were evaluated. The evaluation results are given in Table 9.

Comparative Example 9-1

A non-aqueous electrolyte battery was fabricated operating as in Example 9-1, but using an electrolyte not containing the HMI and LiBOB, and the cycle characteristics were evaluated. The evaluation results are given in Table 9.

Comparative Example 9-2

A non-aqueous electrolyte battery was fabricated operating as in Example 9-1, but using an electrolyte solution provided by omitting the LiBOB from the electrolyte solution of Example 9-1, and the cycle characteristics were evaluated. The evaluation results are given in Table 9.

Comparative Example 9-3

A non-aqueous electrolyte battery was fabricated operating as in Example 9-4, but using an electrolyte solution provided by omitting the LiBOB from the electrolyte solution of Example 9-4, and the cycle characteristics were evaluated. The evaluation results are given in Table 9.

Comparative Example 9-4

A non-aqueous electrolyte battery was fabricated operating as in Example 9-1, but using an electrolyte solution provided by omitting the HMI from the electrolyte solution of Example 9-1, and the cycle characteristics were evaluated. The evaluation results are given in Table 9.

Comparative Example 9-5

A non-aqueous electrolyte battery was fabricated operating as in Example 9-1, but using 2.5 mass % LiBOB instead of the 0.5 mass % LiBOB in the electrolyte solution of Example 9-1, and the cycle characteristics were evaluated. The evaluation results are given in Table 9.

TABLE 9

| | additive 1 | | additive 2 | | capacity retention rate/% | |
|---|---|---|---|---|---|---|
| | name | mass parts | name | mass parts | 50th cycle | 500th cycle |
| Example 9-1 | HMI | 0.5 | LiBOB | 0.5 | 102 | 113 |
| Example 9-2 | HMI | 0.5 | LiBOB | 1 | 102 | 114 |
| Example 9-3 | HMI | 0.5 | LiBOB | 1.5 | 102 | 118 |
| Example 9-4 | TPA-100 | 0.5 | LiBOB | 0.5 | 102 | 113 |
| Comparative Example 9-1 | none | 0 | none | 0 | 100 | 100 |
| Comparative Example 9-2 | HMI | 0.5 | none | 0 | 102 | 103 |
| Comparative Example 9-3 | TPA-100 | 0.5 | none | 0 | 102 | 105 |
| Comparative Example 9-4 | none | 0 | LiBOB | 0.5 | 101 | 103 |
| Comparative Example 9-5 | HMI | 0.5 | LiBOB | 2.5 | 99 | 117 |

* Relative values using Comparative Example 9-1 as 100%

Table 9 demonstrates that, when the non-aqueous electrolyte solutions of Examples 9-1 to 9-4 according to the third present invention are used, the capacity retention rate after 500 cycles is better than in the absence of the compound with general formula (7) and the compound having at least two isocyanate groups per molecule (Comparative Example 9-1). Moreover, it is shown that, while an improvement in the cycle capacity retention rate is seen for the addition of a compound with general formula (7) by itself or for the addition of only the compound having at least two isocyanate groups per molecule (Comparative Examples 9-2 to 9-4), the effect is still inadequate. In addition, when the content of the compound with general formula (7) in the non-aqueous electrolyte solution exceeds 1.5 mass % (Comparative Example 9-5), there is little improvement in the cycle capacity retention rate, which as a consequence is inadequate in terms of battery performance. The cause of this is thought to be as follows. A substantial improvement in the capacity retention rate is obtained, in particular, according to the present invention, in the combination of LiBOB and a compound having two isocyanate groups. This occurs because the composite film from these compounds that is formed on the negative electrode exhibits a higher inhibitory action on the electrochemical degradation reactions of the solvent that are a cause of capacity fade. However, a characteristic feature of this composite film is its high reaction resistance with respect to Li de-insertion, and a trend of a progressive increase in this resistance appears in particular when the LiBOB addition exceeds 1.5 mass %. As a result, secondary reactions, e.g., Li precipitation and so forth, are produced and a sharp decline in the capacity is induced in particular during the initial cycling (up to 50 cycles). In addition, the precipitated Li, having a dendritic configuration, has a large surface area and the triggering of its abnormal reactions puts the battery at risk for rupture and fire. Accordingly, when viewed in terms of safety and the stability of the discharge capacity across the entire cycle run, the amount of LiBOB addition is preferably not more than 1.5 mass %.

Example 10-1, Comparative Examples 10-1 and 10-2, and Reference Examples 10-1 to 10-3

Example 10-1

[Production of the Non-Aqueous Electrolyte Solution]
While operating under a dry argon atmosphere, 0.5 mass % HMI and 0.5 mass % lithium difluorophosphate ($LiPO_2F_2$), as the contents in the non-aqueous electrolyte solution, were mixed into a mixture of EC and DMC (30:70 volume ratio) and an electrolyte solution was then prepared by dissolving thoroughly dried $LiPF_4$ therein so as to provide a concentration of 1.0 mole/L.

[Production of the Positive Electrode]
97 mass % lithium cobaltate ($LiCoO_2$) as the positive electrode active material, 1.5 mass % of an acetylene black as an electroconductive material, and 1.5 mass % of a polyvinylidene fluoride (PVdF) as a binder were mixed and slurried in N-methylpyrrolidone solvent using a disperser. This was uniformly coated/dried/pressed on both sides of an aluminum foil. Punching into a disk with a diameter of 12.5 mm then gave a positive electrode for a non-aqueous electrolyte battery (coin type).

[Production of the Negative Electrode]
<<The Carbon Negative Electrode>>
94 mass parts of a graphite powder as the negative electrode active material and 6 mass parts PVdF were mixed and N-methylpyrrolidone was added and a slurry was prepared and this slurry was coated/dried/pressed on one side of a copper current collector. Punching into a disk with a diameter of 12.5 mm then gave a negative electrode for a non-aqueous electrolyte battery (coin type). This is designated as the carbon negative electrode in the following.

[Production of the Non-Aqueous Electrolyte Battery (Coin Type)]
The positive electrode and negative electrode described above and the non-aqueous electrolyte solution prepared in the particular example or comparative example were used to fabricate a coin-type cell using the following procedure. Thus, the positive electrode was placed in a stainless steel can that also functioned as a positive electrode current collector and the negative electrode was mounted thereon with a polyethylene separator impregnated with the electrolyte solution interposed therebetween. The coin-type cell was produced by sealing by crimping this can across an interposed insulating gasket with a sealing plate that also functioned as a negative electrode current collector.

[Evaluation of the Rate Characteristic]
At 25° C., the non-aqueous electrolyte battery (coin type) was CCCV charged (0.05 C cut off) to 4.1 V at a current corresponding to 0.2 C and was then discharged to 3 V at a constant current of 0.2 C. Then, CCCV charging (0.05 C cut off) was performed to 4.2 V at 0.2 C followed by discharge to 3 V at 0.2 C. CCCV charging (0.05 C cut off) was again performed to 4.2 V at 0.2 C followed by discharge to 3 V at 0.2 C to determine the 0.2 C capacity. CCCV charging (0.05 C cut off) was again performed to 4.2 V at 0.2 C followed by discharge to 3 V at 1 C to determine the 1 C capacity. The rate characteristic was determined using the formula (1 C capacity)/(0.2 C capacity)×100. Here, 1 C represents the current value that discharges the reference capacity of the battery in 1 hour, and, for example, 0.2 C represents one-fifth of this current value. The rate characteristic was evaluated using this non-aqueous electrolyte battery. The evaluation results are given in Table 10.

Comparative Example 10-1

A non-aqueous electrolyte battery (coin type) was fabricated operating as in Example 10-1, but using an electrolyte solution provided by omitting the LiPO$_2$F2 from the electrolyte solution of Example 10-1, and the rate characteristic was evaluated. The evaluation results are given in Table 10.

Comparative Example 10-2

A non-aqueous electrolyte battery (coin type) was fabricated operating as in Example 10-1, but using an electrolyte solution provided by omitting the HMI and LiPO$_2$F2 from the electrolyte solution of Example 10-1, and the rate characteristic was evaluated. The evaluation results are given in Table 10.

Reference Example 10-1

[Production of the Negative Electrode]
<<The Si Negative Electrode>>

A binder, graphite powder, and silicon powder as the negative electrode active material were mixed and N-methylpyrrolidone was added to this and a slurry was prepared and was coated/dried/pressed on one side of a copper current collector. Punching into a disk with a diameter of 12.5 mm then gave a negative electrode for a non-aqueous electrolyte battery (coin type). This is designated as the Si negative electrode in the following.

Production of the non-aqueous electrolyte solution, negative electrode, and non-aqueous electrolyte battery (coin type) was performed using the same methods as in Example 10-1. The rate characteristic was evaluated using this non-aqueous electrolyte battery. The evaluation results are given in Table 10.

Reference Example 10-2

A non-aqueous electrolyte battery (coin type) was fabricated operating as in Reference Example 10-1, but using an electrolyte solution provided by omitting the LiPO$_2$F$_2$ from the electrolyte solution of Reference Example 10-1, and the rate characteristic was evaluated. The evaluation results are given in Table 10.

Reference Example 10-3

A non-aqueous electrolyte battery (coin type) was fabricated operating as in Reference Example 10-1, but using an electrolyte solution provided by omitting the HMI and LiPO$_2$F$_2$ from the electrolyte solution of Reference Example 10-1, and the rate characteristic was evaluated. The evaluation results are given in Table 10.

TABLE 10

| | negative electrode | HMI content (mass parts) | LiPO$_2$F$_2$ content (mass parts) | 0.2 C capacity/% | rate chracterisitc/% | improvement rate/% |
|---|---|---|---|---|---|---|
| Example 10-1 | carbon | 0.5 | 0.5 | 101.8 | 105.3 | +5.3 |
| Comparative Example 10-1 | carbon | 0.5 | 0 | 95.6 | 89.0 | −11.0 |
| Comparative Example 10-2 | carbon | 0 | 0 | 100 | 100 | — |
| Reference Example 10-1 | Si | 0.5 | 0.5 | 61.5 | 101.5 | +1.5 |
| Reference Example 10-2 | Si | 0.5 | 0 | 41.0 | 94.5 | −5.5 |
| Reference Example 10-3 | Si | 0 | 0 | 100 | 100 | — |

* Example 10-1 and Comparative Examples 10-1 and 10-2 employ relative values that use Comparative Example 10-2 as 100%, while Reference Examples 10-1 to 10-3 employ relative values that use Reference Example 3 as 100%. In addition, the improvement rate given in Example 10-1 and Comparative Example 10-1 is the increment or decrement relative to the rate characteristic value in Comparative Example 10-2, while the improvement rate given in Reference Examples 10-1 and 10-2 is the increment or decrement relative to the rate characteristic value in Reference Example 10-3.

Table 10 demonstrates that, when the non-aqueous electrolyte solution of Example 10-1 according to the fourth present invention is used, the rate characteristic is better than in the absence of the monofluorophosphate salt or difluorophosphate salt and the compound having at least two isocyanate groups per molecule (Comparative Example 10-2). Moreover, the addition of the compound having at least two isocyanate groups per molecule by itself (Comparative Example 10-1) provides an unsatisfactory battery performance due to a reduced rate characteristic. When Si was used in the negative electrode in place of the use of carbon (Reference Examples 10-1 to 10-3), an improvement in the characteristic is seen for the addition of the difluorophosphate salt and compound having at least two isocyanate groups per molecule. However, the improvement rate here is inferior to that for the use of carbon in the negative electrode (Example 10-1 and Comparative Examples 10-1 and 10-2) and as a consequence the battery performance is unsatisfactory. The cause of this is thought to be as follows. Difluorophosphate salts generally form a film having a high Li affinity on the negative electrode. On the other hand, compounds having at least two isocyanate groups characteristically react with negative electrode surface functional groups in addition to having a crosslinking action on the film. When carbon is used for the negative electrode, a film with a high Li affinity is formed over the entire negative electrode surface by the crosslinking, by the compound having at least two isocyanate groups, of the film having a high Li affinity that the difluorophosphate salt forms. This results in a substantial improvement in the rate characteristic. When, on the other hand, Si is used for the negative electrode, the majority of the compound having at least two isocyanate groups reacts with the surface functional groups of the Si active material and is thereby consumed, and as a consequence the manifestation of the film-crosslinking action for the difluorophosphate salt is impaired. This results in an inadequate improvement in the rate characteristic. Thus, viewed in terms of the improvement in the rate characteristic, the use of carbon for the negative electrode is preferred when the non-aqueous electrolyte secondary battery is fabricated using an electrolyte solution to which a difluorophosphate salt and a compound having at least two isocyanate groups have been added.

Examples 11-1 to 11-7 and Comparative Examples 11-1 to 11-8

Example 11-1

A non-aqueous electrolyte battery was fabricated operating as in Example 8-1, with the exception that $LiPO_2F_2$ and Duranate D101 (from Asahi Kasei Chemicals Corporation, also referred to below as D101), which has the basic structure given by formula (8-4) above, were used in place of the HMI and $LiN(SO_2F)_2$ in the electrolyte solution of Example 8-1, and the cycle characteristics were evaluated. The evaluation results are given in Table 11.

Example 11-2

A non-aqueous electrolyte battery was fabricated operating as in Example 11-1, with the exception that 0.3 masse D101 was used in place of the 0.5 mass % D101 in the electrolyte solution of Example 11-1, and the cycle characteristics were evaluated. The results of the evaluations are given in Table 11. The evaluation results are given in Table 11.

Example 11-3

A non-aqueous electrolyte battery was fabricated operating as in Example 11-1, with the exception that 1 masse D101 was used in place of the 0.5 mass % D101 in the electrolyte solution of Example 11-1, and the cycle characteristics were evaluated. The evaluation results are given in Table 11.

Example 11-4

A non-aqueous electrolyte battery was fabricated operating as in Example 11-1, with the exception that TPA-100 was used in place of the D101 in the electrolyte solution of Example 11-1, and the cycle characteristics were evaluated. The evaluation results are given in Table 11.

Example 11-5

A non-aqueous electrolyte battery was fabricated operating as in Example 11-1, with the exception that tetramethylene diisocyanate (also referred to below as TMI) was used in place of the D101 in the electrolyte solution of Example 11-1, and the cycle characteristics were evaluated. The evaluation results are given in Table 11.

Example 11-6

A non-aqueous electrolyte battery was fabricated operating as in Example 11-1, with the exception that HMI was used in place of the D101 in the electrolyte solution of Example 11-1, and the cycle characteristics were evaluated. The evaluation results are given in Table 11.

Example 11-7

A non-aqueous electrolyte battery was fabricated operating as in Example 11-1, with the exception that dodecamethylene diisocyanate (also referred to below as DDMI) was used in place of the D101 in the electrolyte solution of Example 11-1, and the cycle characteristics were evaluated. The evaluation results are given in Table 11.

Comparative Example 11-1

A non-aqueous electrolyte battery was fabricated operating as in Example 11-1, but using an electrolyte solution provided by omitting the D101 and $LiPO_2F_2$ from the electrolyte solution of Example 11-1, and the cycle characteristics were evaluated. The evaluation results are given in Table 11.

Comparative Example 11-2

A non-aqueous electrolyte battery was fabricated operating as in Example 11-2, but using an electrolyte solution provided by omitting the $LiPO_2F_2$ from the electrolyte solution of Example 11-2, and the cycle characteristics were evaluated. The evaluation results are given in Table 11.

Comparative Example 11-3

A non-aqueous electrolyte battery was fabricated operating as in Example 11-1, but using an electrolyte solution provided by omitting the $LiPO_2F_2$ from the electrolyte solution of Example 11-1, and the cycle characteristics were evaluated. The evaluation results are given in Table 11.

Comparative Example 11-4

A non-aqueous electrolyte battery was fabricated operating as in Example 11-4, but using an electrolyte solution provided by omitting the $LiPO_2F_2$ from the electrolyte solution of Example 11-4, and the cycle characteristics were evaluated. The evaluation results are given in Table 11.

Comparative Example 11-5

A non-aqueous electrolyte battery was fabricated operating as in Example 11-5, but using an electrolyte solution provided by omitting the $LiPO_2F_2$ from the electrolyte solution of Example 11-5, and the cycle characteristics were evaluated. The evaluation results are given in Table 11.

Comparative Example 11-6

A non-aqueous electrolyte battery was fabricated operating as in Example 11-6, but using an electrolyte solution provided by omitting the $LiPO_2F_2$ from the electrolyte solution of Example 11-6, and the cycle characteristics were evaluated. The evaluation results are given in Table 11.

Comparative Example 11-7

A non-aqueous electrolyte battery was fabricated operating as in Example 11-7, but using an electrolyte solution provided by omitting the $LiPO_2F_2$ from the electrolyte solution of Example 11-7, and the cycle characteristics were evaluated. The evaluation results are given in Table 11.

Comparative Example 11-8

A non-aqueous electrolyte battery was fabricated operating as in Example 11-1, but using an electrolyte solution provided by omitting the D101 from the electrolyte solution of Example 11-1, and the cycle characteristics were evaluated. The evaluation results are given in Table 11.

TABLE 11

| | additive 1 | | compound 2 | | capacity retention rate at the 500th cycle/% |
|---|---|---|---|---|---|
| | name | mass parts | name | mass parts | |
| Example 11-7 | D101 | 0.5 | LiPO$_2$F$_2$ | 0.5 | 105 |
| Example 11-2 | D101 | 0.3 | LiPO$_2$F$_2$ | 0.5 | 106 |
| Example 11-3 | D101 | 1.0 | LiPO$_2$F$_2$ | 0.5 | 107 |
| Example 11-4 | TPA-100 | 0.5 | LiPO$_2$F$_2$ | 0.5 | 108 |
| Example 11-5 | TMI | 0.5 | LiPO$_2$F$_2$ | 0.5 | 106 |
| Example 11-6 | HMI | 0.5 | LiPO$_2$F$_2$ | 0.5 | 109 |
| Example 11-7 | DDMI | 0.5 | LiPO$_2$F$_2$ | 0.5 | 106 |
| Comparative Example 11-1 | none | 0 | none | 0 | 100 |
| Comparative Example 11-1 | D101 | 0.3 | none | 0 | 103 |
| Comparative Example 11-2 | D101 | 0.5 | none | 0 | 103 |
| Comparative Example 11-3 | TPA-100 | 0.5 | none | 0 | 105 |
| Comparative Example 11-4 | TMI | 0.5 | none | 0 | 104 |
| Comparative Example 11-5 | HMI | 0.5 | none | 0 | 106 |
| Comparative Example 11-6 | DDMI | 0.5 | none | 0 | 103 |
| Comparative Example 11-7 | none | 0 | LiPO$_2$F$_2$ | 0.5 | 100 |

\* Relative values using Comparative Example 11-1 as 100%

Table 11 demonstrates that, when the non-aqueous electrolyte solutions of Examples 11-1 to 11-7 according to the fourth present invention are used, the capacity retention rate after 500 cycles is better than in the absence of the monofluorophosphate salt or difluorophosphate salt and the compound having at least two isocyanate groups per molecule (Comparative Example 11-1). Moreover, it is shown that, while some improvement in the cycle capacity retention rate is seen for the addition of a monofluorophosphate salt or difluorophosphate salt by itself and for the addition of only the compound having at least two isocyanate groups per molecule (Comparative Examples 11-2 to 11-8), the effect is still inadequate.

INDUSTRIAL APPLICABILITY

The non-aqueous electrolyte solution of the present invention can improve the capacity deterioration and gas generation associated with the high-temperature storage of non-aqueous electrolyte batteries. As a result, the non-aqueous electrolyte solution of the present invention, and the non-aqueous electrolyte battery that uses that non-aqueous electrolyte solution, can be used in various known applications. Specific examples include, for instance, notebook computers, computer pens, mobile PCs, e-book players, mobile phones, portable fax machines, portable copiers, mobile printers, stereo headphones, video movies, LCD TVs, handy cleaners, portable CDs, Mini Discs, walkie-talkies, electronic organizers, calculators, memory cards, portable tape recorders, radios, back-up power supplies, motors, automobiles, motorcycles, mopeds, bicycles, lighting fixtures, toys, gaming devices, clocks, electric tools, strobes, cameras, power sources for load leveling, and power sources for natural energy storage.

The invention has been described in detail and with reference to specific embodiments thereof, it will be apparent to one skilled in the art that various changes and modifications can be made therein without departing from the spirit and scope thereof.

The invention claimed is:

1. A non-aqueous electrolyte solution for a non-aqueous electrolyte battery that has a positive electrode and a negative electrode that are capable of the absorbing and releasing of a metal ion, the non-aqueous electrolyte solution comprising:
   an electrolyte;
   a non-aqueous solvent;
   (A) a compound having at least two isocyanate groups per molecule; and
   (B) a compound of formula (3);

$$\text{LiC}_n\text{F}_{2n+1}\text{SO}_3 \qquad (3)$$

wherein n is an integer from 0 to 4.

2. The non-aqueous electrolyte solution according to claim 1, wherein the non-aqueous electrolyte solution contains the compound of formula (3) at 0.01 mass % or more and 5 mass % or less.

3. The non-aqueous electrolyte solution according to claim 2, wherein the non-aqueous electrolyte solution contains the compound of formula (3) at 0.05 mass % or more and 4 mass % or less.

4. The non-aqueous electrolyte solution according to claim 1, wherein the compound having at least two isocyanate groups per molecule comprises at least one compound selected from the group consisting of hexamethylene diisocyanate, 1,3-bis(isocyanatomethyl) cyclohexane, dicyclohexylmethane-4,4'-diisocyanate, bicyclo[2.2.1]heptan-2,5-diylbis(methyl isocyanate), bicyclo[2.2.1]heptan-2,6-diylbis(methyl isocyanate), isophorone diisocyanate, 2,2,4-trimethylhexamethylene diisocyanate, 2,4,4-trimethylhexamethylene diisocyanate, and polyisocyanate compounds derived therefrom.

5. The non-aqueous electrolyte solution according to claim 4, wherein the compound having at least two isocyanate groups per molecule comprises at least one compound selected from the group consisting of hexamethylene diisocyanate, and 1,3-bis(isocyanatomethyl) cyclohexane.

6. The non-aqueous electrolyte solution according to claim 1, further comprising at least one compound selected from the group consisting of fluorine atom-containing cyclic carbonates, cyclic carbonates having a carbon-carbon unsaturated bond, monofluorophosphate salts, and difluorophosphate salts.

7. The non-aqueous electrolyte solution according to claim 6, wherein a fluorine atom-containing cyclic carbonate is present and the fluorine atom-containing cyclic carbonate comprises at least one compound selected from the group consisting of monofluoroethylene carbonate, 4,4-difluoroethylene carbonate, and 4,5-difluoroethylene carbonate, and/or a cyclic carbonate having a carbon-carbon unsaturated bond is present and the cyclic carbonate having a carbon-carbon unsaturated bond comprises at least one compound selected from the group consisting of vinylene carbonate, vinylethylene carbonate, and ethynylethylene carbonate.

8. The non-aqueous electrolyte solution according to claim 1, wherein a weight ratio between the compound having at least two isocyanate groups per molecule and the compound of formula (3) is in a range from 1:500 to 300:1.

9. A non-aqueous electrolyte secondary battery, comprising:
   the non-aqueous electrolyte solution of claim 1; and
   a positive electrode and a negative electrode that are capable of the absorbing and releasing of a lithium ion.

* * * * *